United States Patent
Robbins et al.

(10) Patent No.: US 12,475,973 B2
(45) Date of Patent: Nov. 18, 2025

(54) SYSTEM AND METHOD FOR IDENTIFYING ANALYTES IN ASSAY USING NORMALIZED Tm VALUES

(71) Applicant: BIOFIRE DIAGNOSTICS, LLC, Salt Lake City, UT (US)

(72) Inventors: Thomas Charles Robbins, Salt Lake City, UT (US); Theodore Allan Wilson, Salt Lake City, UT (US); Charles Benjamin Cox, Sandy, UT (US); Jay Jones, Salt Lake City, UT (US); Benjamin William Galvin, Salt Lake City, UT (US); Amber Cooper Kiser, Taylorsville, UT (US)

(73) Assignee: BIOFIRE DIAGNOSTICS, LLC, Salt Lake City, UT (US)

( * ) Notice: Subject to any disclaimer, the term of this patent is extended or adjusted under 35 U.S.C. 154(b) by 237 days.

(21) Appl. No.: 17/781,083

(22) PCT Filed: Dec. 3, 2020

(86) PCT No.: PCT/US2020/063171
§ 371 (c)(1),
(2) Date: May 31, 2022

(87) PCT Pub. No.: WO2021/113554
PCT Pub. Date: Jun. 10, 2021

(65) Prior Publication Data
US 2023/0005571 A1 Jan. 5, 2023

Related U.S. Application Data

(60) Provisional application No. 62/942,900, filed on Dec. 3, 2019.

(51) Int. Cl.
*C12Q 1/686* (2018.01)
*G16B 30/00* (2019.01)
*G16B 40/10* (2019.01)

(52) U.S. Cl.
CPC ............ *G16B 30/00* (2019.02); *C12Q 1/686* (2013.01); *G16B 40/10* (2019.02)

(58) Field of Classification Search
CPC ............ C12Q 1/686; C12Q 2527/107; C12Q 2537/143; C12Q 2545/113; C12Q 2563/107; G16B 40/10
See application file for complete search history.

(56) References Cited

U.S. PATENT DOCUMENTS

| | | | |
|---|---|---|---|
| 8,323,898 B2 | 12/2012 | Niimi et al. | |
| 10,053,726 B2* | 8/2018 | Rasmussen | C12Q 1/686 |
| 2014/0234845 A1* | 8/2014 | Poritz | C12Q 1/686 |
| | | | 435/6.12 |
| 2015/0232916 A1* | 8/2015 | Rasmussen | C12Q 1/689 |
| | | | 702/19 |
| 2016/0217252 A1 | 7/2016 | Robbins et al. | |
| 2019/0226008 A1* | 7/2019 | Whitman | C12Q 1/6851 |

FOREIGN PATENT DOCUMENTS

| | | | | |
|---|---|---|---|---|
| WO | WO-2007097323 A1 | | 8/2007 | |
| WO | WO-2010066033 A1 * | | 6/2010 | ............ G16H 40/67 |
| WO | WO-2012031050 A1 * | | 3/2012 | ............ B01L 3/5027 |
| WO | WO-2018119443 A1 * | | 6/2018 | ............ C12Q 1/686 |
| WO | WO-2019/018099 A1 | | 1/2019 | |
| WO | WO-2019/152336 A1 | | 8/2019 | |

OTHER PUBLICATIONS

European Patent Application No. 20896959.2, Extended European Search Report, mailed Jan. 16, 2023.
Poritz et al., FilmArray, an automated nested multiplex PCR system for multi-pathogen detection: development and application to respiratory tract infection, PLOS One, 6(10):e26047 (2011).
Sinha et al., A High-Resolution Digital DNA Melting Platform for Robust Sequence Profiling and Enhanced Genotype Discrimination, SLAS Technol., 23(6):580-91 (Dec. 2018).
Azarian et al., Whole-Genome Sequencing for Outbreak Investigations of Methicillin-Resistant *Staphylococcus aureus* in the Neonatal Intensive Care Unit: Time for Routine Practice? Infection Control & Hospital Epidemiology. Jul. 2015, vol. 36, No. 7, pp. 777-785; p. 778, col. 2, para 1; p. 782, col. 2, para 2; p. 783, col. 1, para 4.
International Search Report and Written Opinion for Application No. PCT/US2020/063171 dated Apr. 29, 2021.
Japanese Patent Application No. 2022-531491, Office Action, dated Jan. 7, 2024.

* cited by examiner

*Primary Examiner* — Joseph G. Dauner
(74) *Attorney, Agent, or Firm* — BCF LLP

(57) ABSTRACT

Techniques are provided for generating an array-specific range of Tm values to be used for calling a sample in a given array positive or negative for a target nucleic acid sequence. A sample well in an array is provided with a control sample containing a control nucleic acid sequence. The control sample is amplified by thermal cycling the sample well. A Tm value for the control sample is identified and compared to an expected Tm value for the control nucleic acid sequence to calculate a relationship between the identified control Tm value and the expected control Tm value. By applying this relationship to an expected Tm value for a target nucleic acid sequence, an array-specific range of Tm values for the target nucleic acid sequence is generated and can be used for calling an experimental sample in the same array positive or negative for the target nucleic acid sequence.

10 Claims, 47 Drawing Sheets

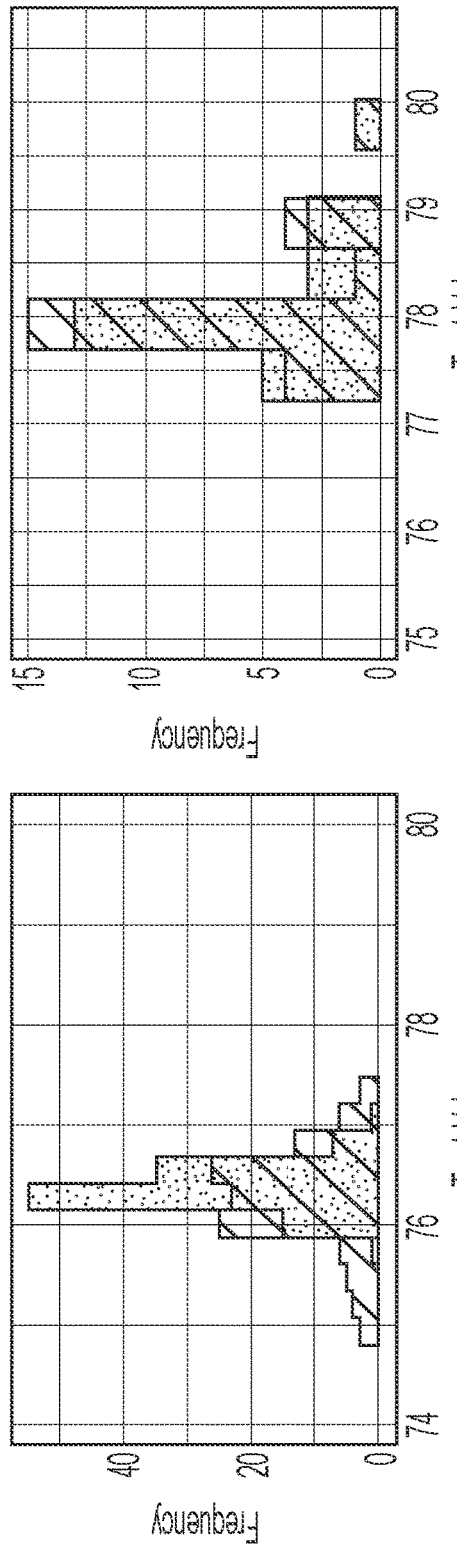
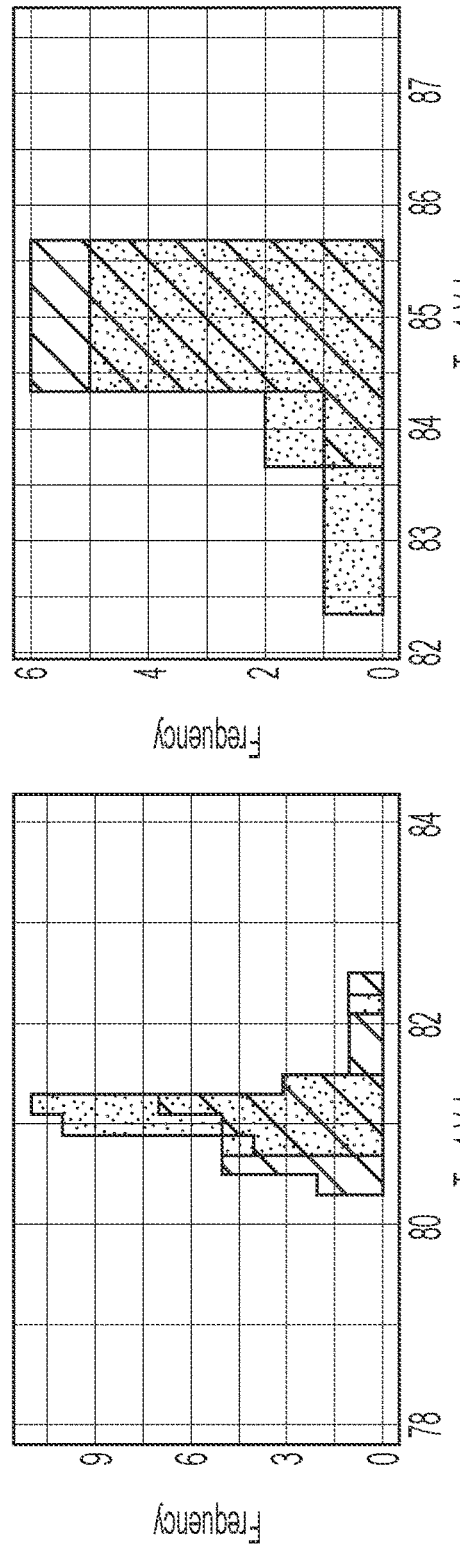
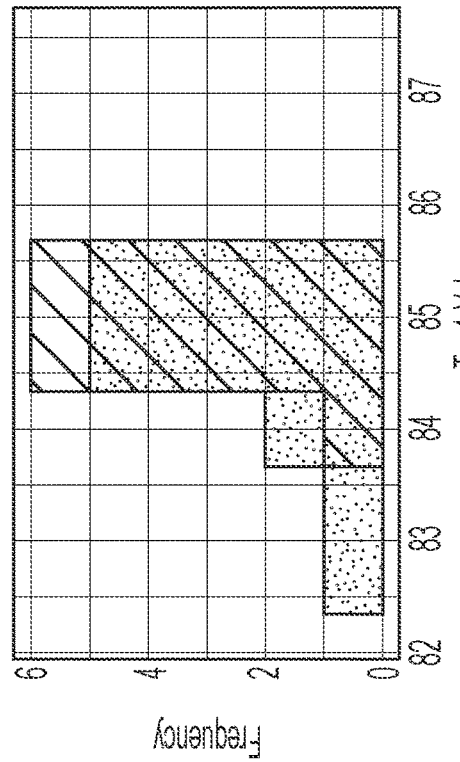
FIG. 18A
FIG. 18B
FIG. 18C
FIG. 18D

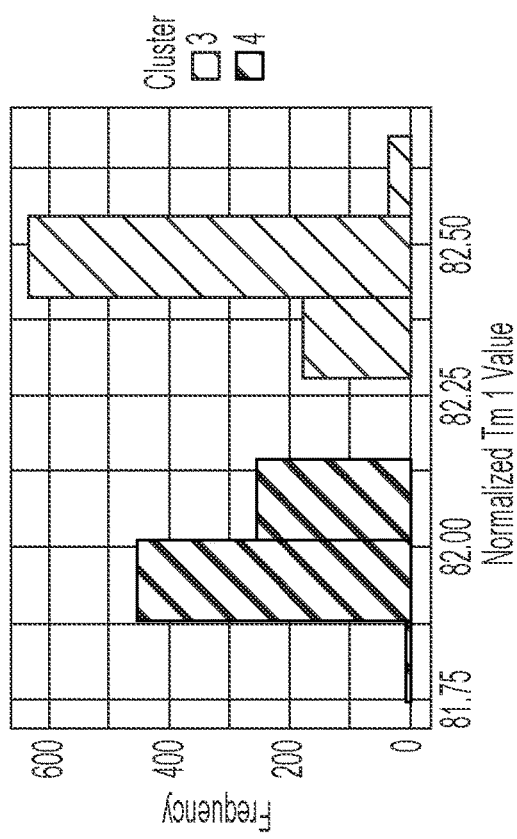
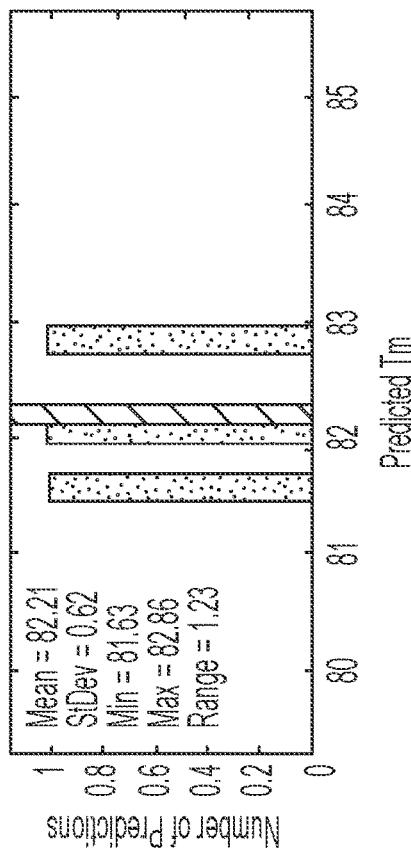
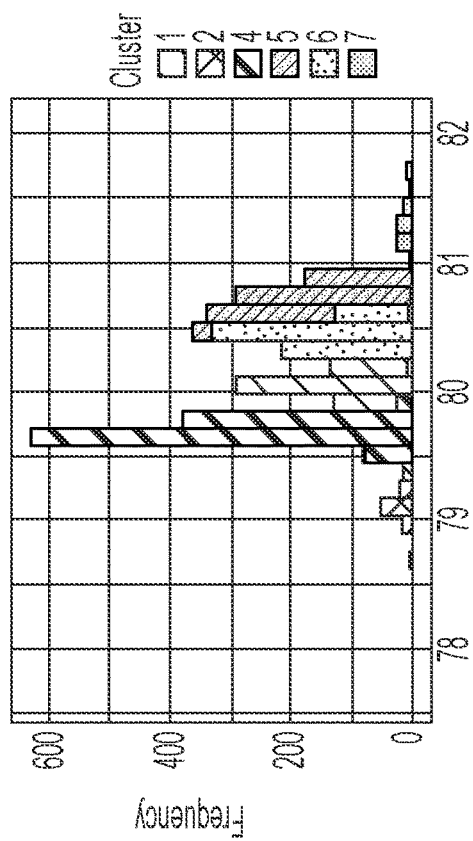
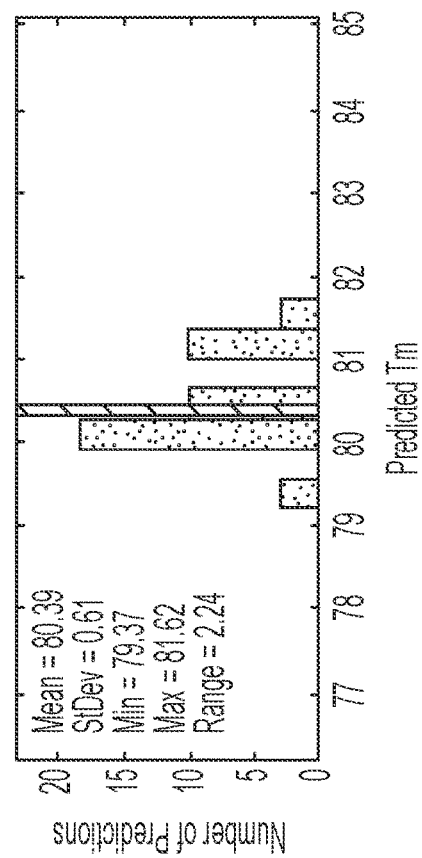
FIG. 24A
FIG. 24B
FIG. 24C
FIG. 24D

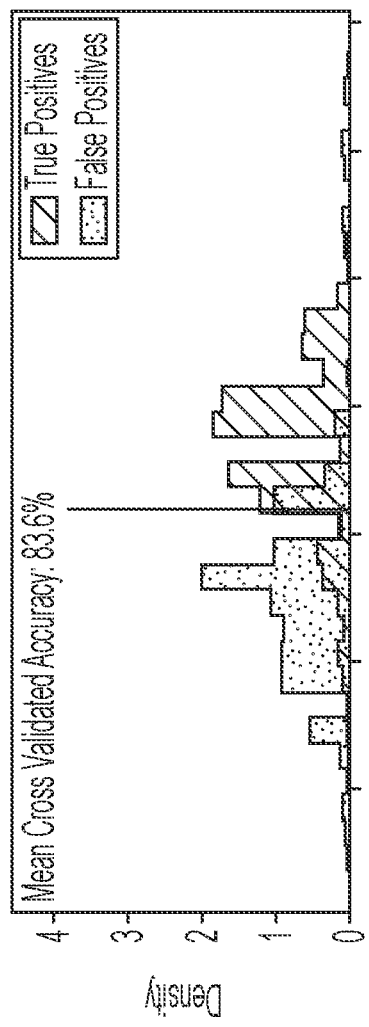
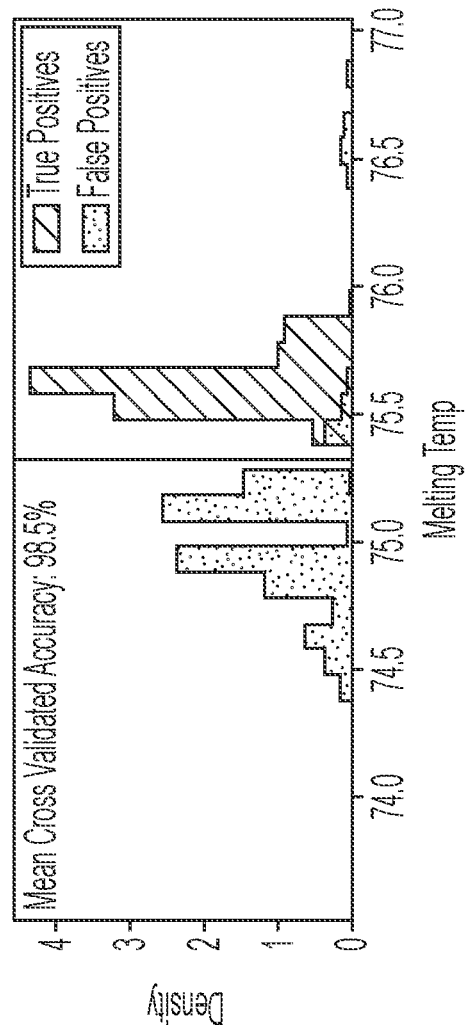
FIG. 30A
FIG. 30B

| Cross-validated Accuracy | Raw Tm | Norm Tm |
|---|---|---|
| Cdiff | 96.7% | 98.0% |
| Crypt 2 | 96.9% | 98.7% |
| ETEC 3 | 83.6% | 98.5% |

FIG. 31

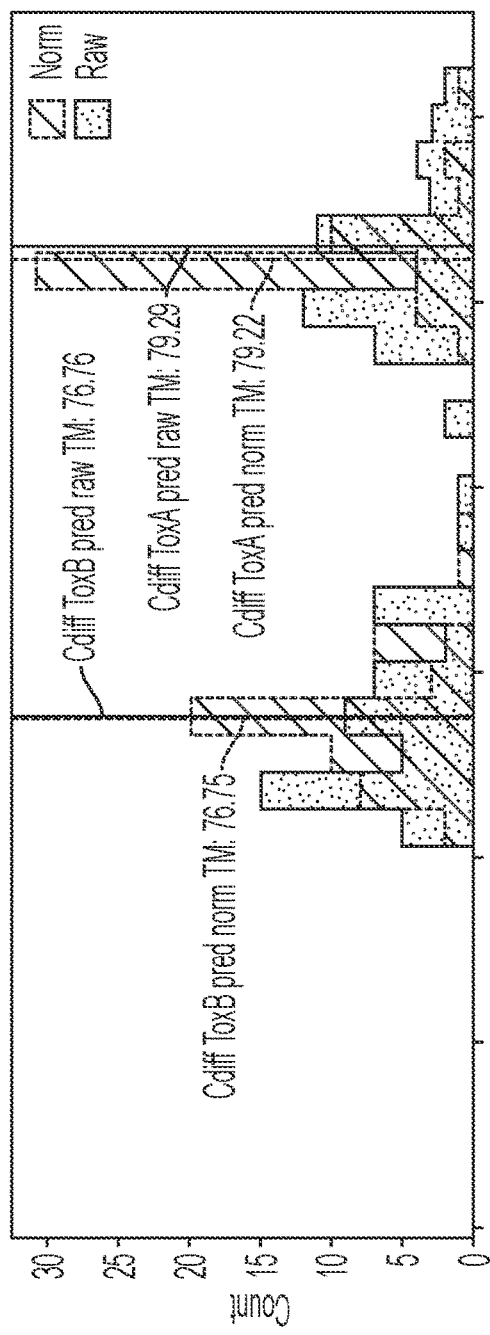
FIG. 39A
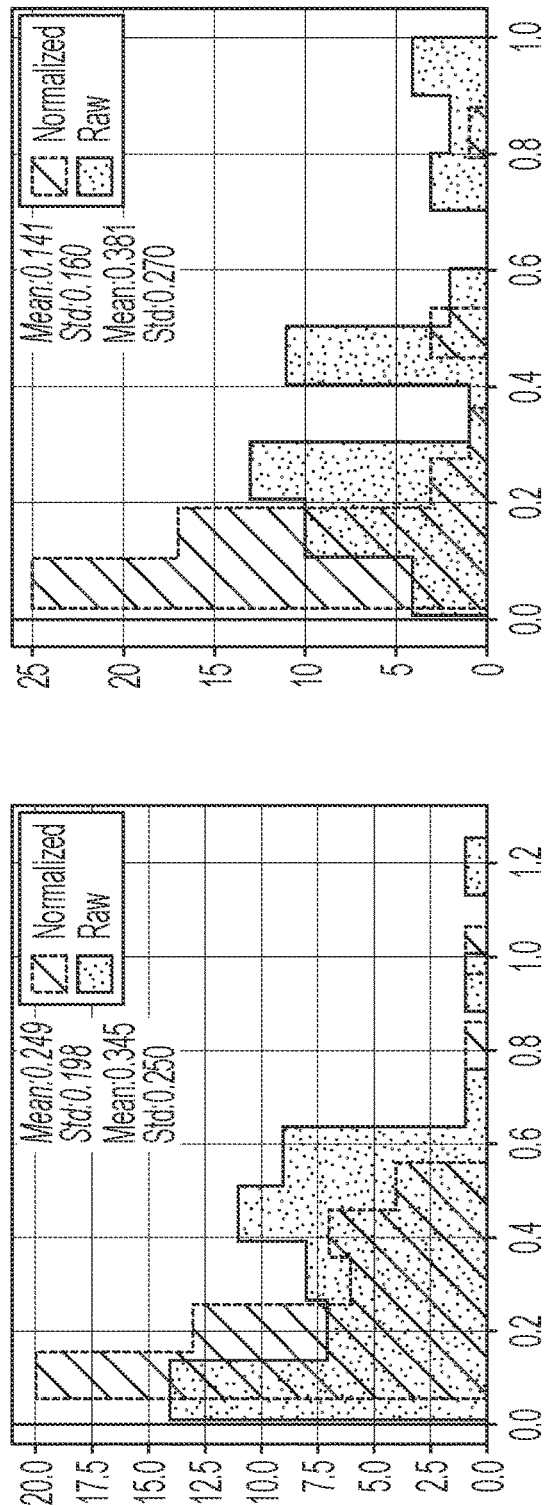
FIG. 39B
FIG. 39C

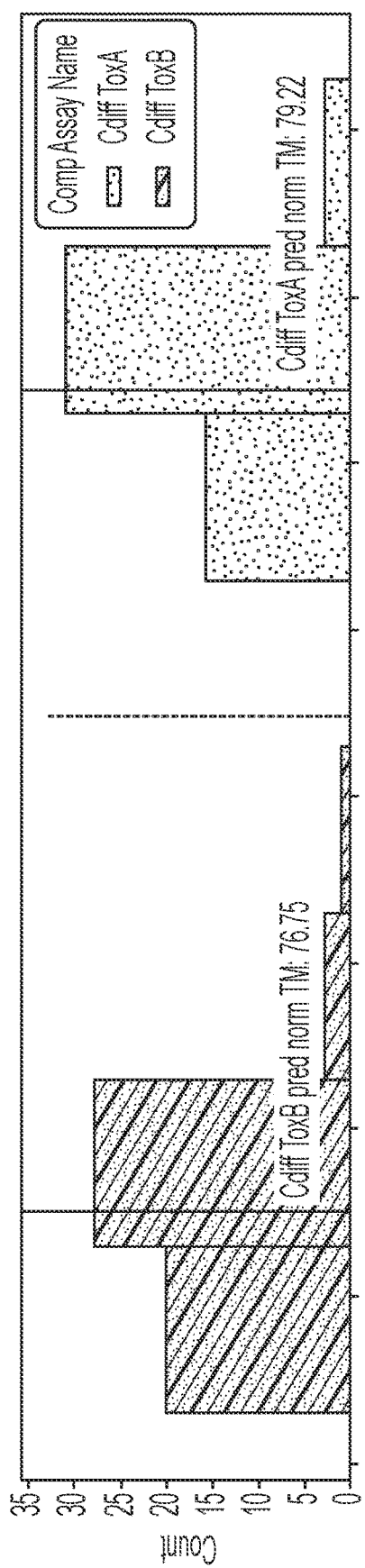
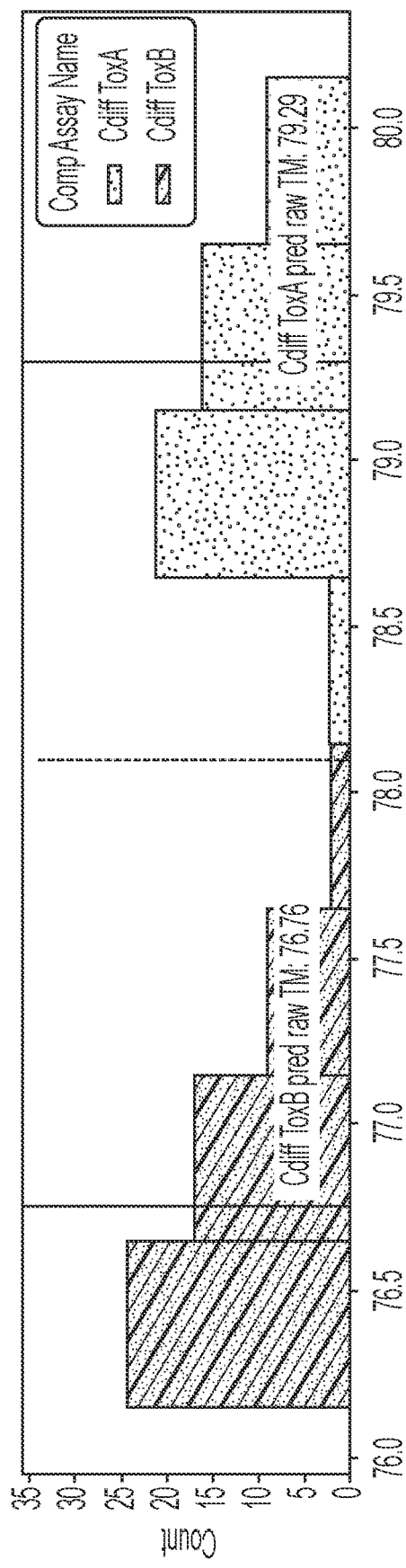
FIG. 42A
FIG. 42B

| Cross-validated Accuracy | Raw Tm | Norm Tm | Cp Norm Tm |
|---|---|---|---|
| FluA-pan1 | 70% | 81% | 89% |
| FluA-pan2 | 100% | 100% | 100% |

FIG. 47

SYSTEM AND METHOD FOR IDENTIFYING ANALYTES IN ASSAY USING NORMALIZED Tm VALUES

CROSS-REFERENCE TO RELATED APPLICATIONS

The present application is a National Stage application of International Application No. PCT/US2020/063171, filed Dec. 3, 2020, which claims priority to U.S. Provisional Patent Application No. 62/942,900, filed Dec. 3, 2019, entitled "SYSTEM AND METHOD FOR IDENTIFYING ANALYTES IN ASSAY USING NORMALIZED TM VALUES," the disclosures of which are incorporated herein by reference in their entirety.

FIELD OF THE DISCLOSURE

The present disclosure generally relates to techniques used in PCR systems and, more particularly, to generating an array-specific range of Tm values to be used for calling a sample positive or negative for a target nucleic acid sequence in a given array.

BACKGROUND

In the United States, Canada, and Western Europe infectious disease accounts for approximately 7% of human mortality, while in developing regions infectious disease accounts for over 40% of human mortality. Infectious diseases lead to a variety of clinical manifestations. Among common overt manifestations are fever, pneumonia, meningitis, diarrhea, and diarrhea containing blood. While the physical manifestations suggest some pathogens and eliminate others as the etiological agent, a variety of potential causative agents remain, and clear diagnosis often requires a variety of assays to be performed. Traditional microbiology techniques for diagnosing pathogens can take days or weeks, often delaying a proper course of treatment.

In recent years, the polymerase chain reaction (PCR) has become a method of choice for rapid diagnosis of infectious agents. PCR can be a rapid, sensitive, and specific tool to diagnose infectious disease. A challenge to using PCR as a primary means of diagnosis is the variety of possible causative organisms and the low levels of organism present in some pathological specimens. It is often impractical to run large panels of PCR assays, one for each possible causative organism, most of which are expected to be negative. The problem is exacerbated when pathogen nucleic acid is at low concentration and requires a large volume of sample to gather adequate reaction templates. In some cases, there is inadequate sample to assay for all possible etiological agents. A solution is to run "multiplex PCR" wherein the sample is concurrently assayed for multiple targets in a single reaction. While multiplex PCR has proven to be valuable in some systems, shortcomings exist concerning robustness of high level multiplex reactions and difficulties for clear analysis of multiple products. To solve these problems, the assay may be subsequently divided into multiple secondary PCRs. Nesting secondary reactions within the primary product often increases robustness. However, this further handling can be expensive and may lead to contamination or other problems.

Fully integrated multiplex PCR systems integrating sample preparation, amplification, detection, and analysis are user friendly and are particularly well adapted for the diagnostic market and for syndromic approaches. The FilmArray® (BioFire Diagnostics, LLC, Salt Lake City, UT) is such a system, a user friendly, highly multiplexed PCR system developed for the diagnostic market. The single sample instrument accepts a disposable "pouch" that integrates sample preparation and nested multiplex PCR. Integrated sample preparation provides ease-of-use, while the highly multiplexed PCR provides both the sensitivity of PCR and the ability to test for up to 30 different organisms simultaneously. This system is well suited to pathogen identification where a number of different pathogens all manifest similar clinical symptoms. Current available diagnostic panels include a respiratory panel for upper respiratory infections, a blood culture panel for blood stream infections, a gastrointestinal panel for GI infections, and a meningitis panel for cerebrospinal fluid infections. Other panels are in development.

Generally speaking, the temperature at which DNA strands denature depends on the sequence characteristics of the DNA. Accordingly, in many PCR systems, a range of Tm (the temperature at which half of the nucleic acid has melted) values are used to call a positive or a negative for an assay. If an identified Tm for a sample falls outside of the range of Tm values for a particular nucleic acid sequence, the sample is called negative for that nucleic acid sequence, but if the identified Tm for the sample falls within the range of Tm values for the nucleic acid sequence, the sample is called positive for that nucleic acid sequence.

In some cases, this range of Tm values can be fairly broad and still be useful in distinguishing between DNA associated with different pathogen species, because different pathogen species typically have quite different Tm values. However, the Tm values for the DNA of related pathogens may vary only slightly. Consequently, when a Tm window is too broad, it may be difficult to distinguish between closely related pathogens due to overlap in Tm value ranges for each pathogen. For instance, some assays amplify nucleic acids multiple strains of a given pathogen, and some assays can amplify similar pathogen species, both of which may fall into the overly broad Tm window. Accordingly, narrowing the range of Tm values used to identify a particular nucleic acid sequence could lead to greater specificity and sensitivity when distinguishing between related species. However, up to this point, these ranges of Tm values used to identify nucleic acid sequences have been difficult to narrow, because the melting temperature of a given nucleic acid sequence may vary between pouch runs due to subtle differences in pouch chemistry concentrations, amount of amplicon, instrument characteristics, etc. In other words, when this range of Tm values is too narrow, there is a risk of not identifying a target nucleic acid sequence even when it is present due to variations in its melting temperature between pouch runs.

SUMMARY

In one aspect of the present disclosure, a method for generating an array-specific range of Tm values to be used for calling a sample positive or negative for a target nucleic acid sequence in a given array is provided, the method comprising: providing, in an array, a control sample well with a control sample containing a control nucleic acid sequence, primers configured for amplifying the control nucleic acid sequence, a fluorescent dye, and components for amplification; amplifying the control sample by thermal cycling the control sample well; measuring, by an optical system, fluorescent data during or subsequent to the amplification of the control sample; generating, by a processor, a control melting curve using the fluorescent data; identifying, by the processor, based on the control melting curve, a Tm value for the control sample; comparing, by the processor, the identified Tm value for the control sample to an expected Tm value for the control nucleic acid sequence; calculating, by the processor, based on the comparing, a relationship between the identified Tm value for the control sample and the expected Tm value for the control nucleic acid sequence; and generating, by the processor, the array-specific range of Tm values for the target nucleic acid sequence by applying the calculated relationship between the expected Tm value for the control nucleic acid sequence and the identified Tm value for the control sample to a pre-determined range of Tm values for the target nucleic acid sequence In another aspect of the present disclosure, a system for generating an array-specific range of Tm values to be used for calling a sample positive or negative for a target nucleic acid sequence in a given array is provided, the system comprising: an array housing a plurality of sample wells, including a control sample well configured to house a control sample containing a control nucleic acid sequence; one or more temperature controlling devices configured to amplify the control sample by thermal cycling the control sample well; an optical system configured to detect an amount of fluorescence emitted by the control sample; and a controller configured to: receive, from the optical system, data indicative of the amount of fluorescence emitted by the control sample during or subsequent to the amplification; generate a control melting curve using the data indicative of the amount of fluorescence emitted by the control sample during or subsequent to the amplification; identify, based on the control melting curve, a Tm value for the control sample; compare the identified Tm value for the control sample to an expected Tm value for the control nucleic acid sequence; calculate, based on the comparing, a relationship between the identified Tm value for the control sample and the expected Tm value for the control nucleic acid sequence; and generate the array-specific range of Tm values for the target nucleic acid sequence by applying the calculated relationship between the expected Tm value for the control nucleic acid sequence and the identified Tm value for the control sample to a pre-determined range of Tm values for the target nucleic acid sequence.

In still another aspect of the present disclosure, a computing device for generating an array-specific range of Tm values to be used for calling a sample positive or negative for a target nucleic acid sequence in a given array is provided, the system comprising: one or more processors; and a non-transitory computer-readable memory coupled to the one or more processors and storing thereon instructions that, when executed by the one or more processors, cause the computing device to: provide control signals to a temperature controlling device to amplify a control sample containing a control nucleic acid sequence by thermal cycling a control sample well housing the control sample, wherein the control sample well is housed in an array; receive, from an optical system, data indicative of the amount of fluorescence emitted by the control sample during or subsequent to the amplification; generate a control melting curve using the data indicative of the amount of fluorescence emitted by the control sample during or subsequent to the amplification; identify, based on the control melting curve, a Tm value for the control sample; compare the identified Tm value for the control sample to an expected Tm value for the control nucleic acid sequence; calculate, based on the comparing, a relationship between the identified Tm value for the control sample and the expected Tm value for the control nucleic acid sequence; and generate the array-specific range of Tm values for the target nucleic acid sequence by applying the calculated relationship between the expected Tm value for the control nucleic acid sequence and the identified Tm value for the control sample to a pre-determined range of Tm values for the target nucleic acid sequence.

In another aspect of the present disclosure, a method for training an algorithm to identify a nucleic acid sequence associated with a sample in an array is provided, the method comprising: (i) providing, in an array, a control sample well with a control sample containing a control nucleic acid sequence, primers configured for amplifying the control nucleic acid sequence, a fluorescent dye, and components for amplification; (ii) amplifying the control sample by thermal cycling the control sample well; (iii) measuring, by an optical system, fluorescent data during or subsequent to the amplification; (iv) generating, by a processor, a control melting curve using the fluorescent data; (v) identifying, by the processor, based on the control melting curve, a Tm value for the control sample; (vi) repeating steps (i)-(iv) for a plurality of samples containing a respective plurality of known target nucleic acid sequences; (vii) storing, by the processor, the identified Tm values for each known sample as training data; and (viii) training, by the processor, an algorithm, using the training data, to predict a nucleic acid sequence contained in a sample based on the Tm value for the sample.

In still another aspect of the present disclosure, a method for decreasing concentration effects on Tm is provided, the method comprising: providing, in an array, a sample well with an experimental sample containing a target nucleic acid sequence, primers configured for amplifying the target nucleic acid sequence, a fluorescent dye, and components for amplification; amplifying the target nucleic acid by thermal cycling the control sample well; measuring, by an optical system, fluorescent data to generate a Cp and Tm of the target nucleic acid; obtaining, by the processor, a general relationship between Cp and Tm for the target nucleic acid sequence; obtaining, by the processor, a reference Cp value for the target nucleic acid sequence; calculating, by the processor, a first estimated Tm for the target nucleic acid sequence by applying the general relationship to the reference Cp value; identifying, by the processor, an observed Cp value for the experimental sample in the array; calculating, by the processor, a second estimated Tm for the target nucleic acid sequence by applying the general relationship to the observed Cp value; calculating, by the processor, an array-specific relationship between Cp and Tm for the target nucleic acid sequence by comparing the first estimated Tm to the second estimated Tm for the target nucleic acid sequence; and generating, by the processor, a Cp-normalized array-specific range of Tm values for the target nucleic acid sequence by applying the array-specific relationship between Cp and Tm for the target nucleic acid sequence to a pre-determined range of Tm values for the experimental sample.

In another aspect of the present disclosure, a method for generating an array-specific range of Tm values to be used for calling a sample positive or negative for a target nucleic acid sequence in a given array is provided, the method comprising: providing, in an array, a control sample well with a control sample containing a control nucleic acid sequence, primers configured for amplifying the control nucleic acid sequence, a fluorescent dye, and components for amplification; amplifying the control sample by thermal cycling the control sample well; measuring, by an optical system, fluorescent data during or subsequent to the amplification of the control sample; generating, by a processor, a control melting curve using the fluorescent data; identifying, by the processor, based on the control melting curve, a Tm value for the control sample; comparing, by the processor, the identified Tm value for the control sample to an expected Tm value for the control nucleic acid sequence; and calculating, by the processor, based on the comparing, a relationship between the identified Tm value for the control sample and the pre-determined Tm value for the control nucleic acid sequence.

Additional features and advantages of the embodiments of the invention will be set forth in the description which follows or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 18A illustrates a histogram of non-normalized Tm values for Ehist overlaid with a histogram of normalized Tm values for Ehist normalized (dependent on a linear model) by a yeast control, from LoD data;

FIG. 18B illustrates a histogram of non-normalized Tm values for Hinfluenzae2 overlaid with a histogram of normalized Tm values for Hinfluenzae2 normalized (dependent on a linear model) by a yeast control, from LoD data;

FIG. 18C illustrates a histogram of non-normalized Tm values for Cparapsilosis overlaid with a histogram of Tm values for Cparapsilosis normalized (dependent on a linear model) by a yeast control, from LoD data;

FIG. 18D illustrates a histogram of non-normalized Tm values overlaid with a histogram of Tm values for Ckrusei normalized (dependent on a linear model) by a yeast control, from LoD data;

FIG. 24A illustrates clustered Tm values for Ecoli3;

FIG. 24B shows a histogram of clustered Tm values for Ecoli3 normalized by a yeast control.

FIG. 24C illustrates clustered Tm values for RSV;

FIG. 24D shows a histogram of clustered Tm values for RSV normalized by a yeast, control;

FIGS. 30A and 30B illustrate distributions of true and false positives for ETEC 3, with raw Tms displayed in FIG. 30A and normalized Tms displayed in FIG. 30B;

FIG. 31 is a table illustrating the cross-validated accuracy improvements for Cdiff, Crypt2, and ETEC 3 with Tm normalization;

FIG. 39A is a histogram illustrating distributions of Cdiff ToxA raw Tm values, Cdiff ToxA normalized Tm values, Cdiff ToxB raw Tm values, and Cdiff ToxB normalized Tm values;

FIG. 39B illustrates the difference distribution for normalized Tm values compared to raw Tm values for Cdiff ToxB;

FIG. 39C illustrates the difference distribution for normalized Tm values compared to raw Tm values for Cdiff ToxA;

FIG. 40A illustrates normalized Tm distributions for Adeno F 40 and Adeno F 41, while

FIG. 41A illustrates normalized Tm distributions for Campy 2 ups and Campy 2 coli, while

FIG. 42A illustrates normalized Tm distributions for Cdiff ToxA and Cdiff ToxB, while FIG. 42B illustrates raw Tm distributions for Cdiff ToxA and Cdiff ToxB;

FIG. 47 illustrates the cross-validated accuracy results for raw, Tm-normalized, and Cp-normalized Tm distributions for FluA-pan1 and FluA-pan2 assays.

DETAILED DESCRIPTION

Figure 1:
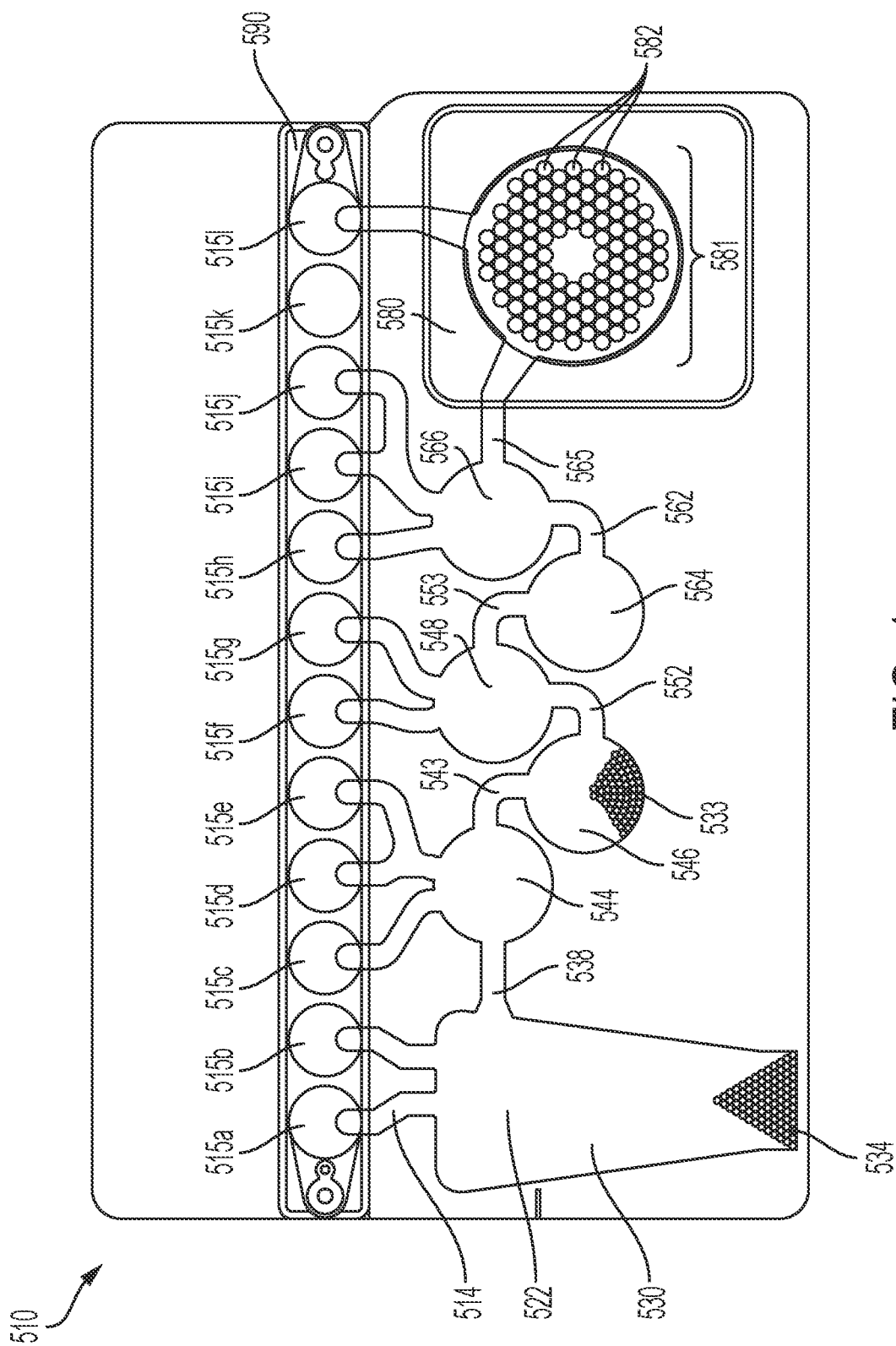
FIG. 1 shows a flexible pouch according to one embodiment of the present invention.

The present disclosure provides techniques for generating a normalized, array-specific range of Tm values for a target nucleic acid sequence and calling a sample positive or negative for the target nucleic acid sequence by comparing an identified Tm for the sample to the normalized, array-specific range of Tm values for the target nucleic acid sequence. Advantageously, the normalized, array-specific range of Tm values for a target nucleic acid sequence will generally be narrower than the reference range of Tm values that is currently used to call samples positive or negative for the target nucleic acid. Accordingly, narrowing the range of Tm values used to identify a particular nucleic acid sequence leads to greater specificity and sensitivity when distinguishing between related species. That is, when the ranges of Tm values used to call samples positive or negative for each target nucleic acid are narrower, it is easier to distinguish between related pathogens that have similar ranges of Tm values, and more accurately call the sample positive or negative only for a specific target nucleic acid sequence (and not related target nucleic acid sequences that have similar ranges Tm values). Moreover, the techniques discussed herein may be easily implemented into existing systems, because no modification of the pouch or array is required.

Example embodiments are described below with reference to the accompanying drawings. Many different forms and embodiments are possible without deviating from the spirit and teachings of this disclosure and so the disclosure should not be construed as limited to the example embodiments set forth herein. Rather, these example embodiments are provided so that this disclosure will be thorough and complete, and will convey the scope of the disclosure to those skilled in the art. In the drawings, the sizes and relative sizes of layers and regions may be exaggerated for clarity. Like reference numbers refer to like elements throughout the description.

Unless defined otherwise, all terms (including technical and scientific terms) used herein have the same meaning as commonly understood by one of ordinary skill in the art to which the present disclosure pertains. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. While a number of methods and materials similar or equivalent to those described herein can be used in the practice of the present disclosure, only certain exemplary materials and methods are described herein.

All publications, patent applications, patents or other references mentioned herein are incorporated by reference in their entirety. In case of a conflict in terminology, the present specification is controlling.

Various aspects of the present disclosure, including devices, systems, methods, etc., may be illustrated with reference to one or more exemplary implementations. As used herein, the terms "exemplary" and "illustrative" mean "serving as an example, instance, or illustration," and should not necessarily be construed as preferred or advantageous over other implementations disclosed herein. In addition, reference to an "implementation" or "embodiment" of the present disclosure or invention includes a specific reference to one or more embodiments thereof, and vice versa, and is intended to provide illustrative examples without limiting the scope of the invention, which is indicated by the appended claims rather than by the following description.

It will be noted that, as used in this specification and the appended claims, the singular forms "a," "an," and "the" include plural referents unless the content clearly dictates otherwise. Thus, for example, reference to "a tile" includes one, two, or more tiles. Similarly, reference to a plurality of referents should be interpreted as comprising a single referent and/or a plurality of referents unless the content and/or context clearly dictate otherwise. Thus, reference to "tiles" does not necessarily require a plurality of such tiles. Instead, it will be appreciated that independent of conjugation; one or more tiles are contemplated herein.

As used throughout this application the words "can" and "may" are used in a permissive sense (i.e., meaning having the potential to), rather than the mandatory sense (i.e., meaning must). Additionally, the terms "including," "having," "involving," "containing," "characterized by," variants thereof (e.g., "includes," "has," "involves," "contains," etc.), and similar terms as used herein, including the claims, shall be inclusive and/or open-ended, shall have the same meaning as the word "comprising" and variants thereof (e.g., "comprise" and "comprises"), and do not exclude additional, un-recited elements or method steps, illustratively.

As used herein, directional and/or arbitrary terms, such as "top," "bottom," "left," "right," "up," "down," "upper," "lower," "inner," "outer," "internal," "external," "interior," "exterior," "proximal," "distal," "forward," "reverse," and the like can be used solely to indicate relative directions and/or orientations and may not be otherwise intended to limit the scope of the disclosure, including the specification, invention, and/or claims.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present.

Example embodiments of the present inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the present inventive concepts should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of example embodiments.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 5%. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

The word "or" as used herein means any one member of a particular list and also includes any combination of members of that list.

By "sample" is meant an animal; a tissue or organ from an animal; a cell (either within a subject, taken directly from a subject, or a cell maintained in culture or from a cultured cell line); a cell lysate (or lysate fraction) or cell extract; a solution containing one or more molecules derived from a cell, cellular material, or viral material (e.g., a polypeptide or nucleic acid); or a solution containing a non-naturally occurring nucleic acid illustratively a cDNA or next-generation sequencing library, which is assayed as described herein. A sample may also be any body fluid or excretion (for example, but not limited to, blood, urine, stool, saliva, tears, bile, or cerebrospinal fluid) that may or may not contain host or pathogen cells, cell components, or nucleic acids.

The phrase "nucleic acid" as used herein refers to a naturally occurring or synthetic oligonucleotide or polynucleotide, whether DNA or RNA or DNA-RNA hybrid, single-stranded or double-stranded, sense or antisense, which is capable of hybridization to a complementary nucleic acid by Watson-Crick base-pairing. Nucleic acids of the invention can also include nucleotide analogs (e.g., BrdU), modified or treated bases and non-phosphodiester internucleoside linkages (e.g., peptide nucleic acid (PNA) or thiodiester linkages). In particular, nucleic acids can include, without limitation, DNA, cDNA, gDNA, ssDNA, dsDNA, RNA, including all RNA types such as miRNA, mtRNA, rRNA, including coding or non-coding regions, or any combination thereof.

By "probe," "primer," or "oligonucleotide" is meant a single-stranded nucleic acid molecule of defined sequence that can base-pair to a second nucleic acid molecule that contains a complementary sequence (the "target"). The stability of the resulting hybrid depends upon the length, GC content, and the extent of the base-pairing that occurs. The extent of base-pairing is affected by parameters such as the degree of complementarity between the probe and target molecules and the degree of stringency of the hybridization conditions. The degree of hybridization stringency is affected by parameters such as temperature, salt concentration, and the concentration of organic molecules such as formamide, and is determined by methods known to one skilled in the art. Probes, primers, and oligonucleotides may be detectably-labeled, either radioactively, fluorescently, or non-radioactively, by methods well-known to those skilled in the art. dsDNA binding dyes may be used to detect dsDNA. It is understood that a "primer" is specifically configured to be extended by a polymerase, whereas a "probe" or "oligonucleotide" may or may not be so configured. As a probe, the oligonucleotide could be used as part of many fluorescent PCR primer and probe-based chemistries that are known in the art, including those sharing the use of fluorescence quenching and/or fluorescence resonance energy transfer (FRET) configurations, such as 5'nuclease probes (TaqMan® probes), dual hybridization probes (HybProbes®), or Eclipse® probes or molecular beacons, or Amplifluor® assays, such as Scorpions®, LUX® or QZyme® PCR primers, including those with natural or modified bases.

As used herein "dsDNA binding dye" means a detectable agent capable of binding double-stranded DNA. The detectable binding agent may be a fluorescent dye or other chromophore or agent capable of producing a signal, directly or indirectly, when bound to double-stranded DNA wherein the signal is distinguishable from a signal produced when that same agent is in solution or bound to a single-stranded nucleic acid. Illustratively, the DNA binding agent is an intercalating agent or minor groove binder. LCGREEN® Plus (BioFire Defense) is the dsDNA binding dye used in the examples herein, but it is understood that other dsDNA binding dyes may be used. Other moieties and systems capable of detecting the amount of dsDNA, as are known in the art, may be used as well. While reference is made to dsDNA binding dyes, it is understood that any suitable dye may be used herein, with some non-limiting illustrative dyes described in U.S. Pat. No. 7,387,887, herein incorporated by reference. Other signal producing substances may be used for detecting nucleic acid amplification and melting, illustratively enzymes, antibodies, etc., as are known in the art.

By "specifically hybridizes" is meant that a probe, primer, or oligonucleotide recognizes and physically interacts (that is, base-pairs) with a substantially complementary nucleic acid (for example, a sample nucleic acid) under high stringency conditions, and does not substantially base pair with other nucleic acids.

By "high stringency conditions" is meant at about melting temperature (Tm) minus 5° C. (i.e., 5° below the Tm of the nucleic acid). Functionally, high stringency conditions are used to identify nucleic acid sequences having at least 80% sequence identity.

As used herein "Cp" or "crossing point" means the number of cycles or fractional cycles of PCR required to obtain a fluorescence signal above the background fluorescence. Cp may be determined experimentally based on a manually set threshold, although other methods for determining Cp are known in the art. Other points may be used as well, such as using a first, second, or nth order derivative, illustratively as taught in U.S. Pat. No. 6,303,305, herein incorporated by reference in its entirety. Other points may be used as well, as are known in the art, and any such point may be substituted for Cp (also known as Ct or crossing threshold) in any of the methods discussed herein.

As used herein "Tm" is the temperature at which one-half of the DNA duplex will dissociate to become single stranded. In amplification systems, Tm is usually measured subsequent to amplification, although techniques are known for measuring Tm during amplification.

As used herein "LoD" or "limit of detection" means the lowest quantity of a substance that can be distinguished from the absence of that substance within an accepted confidence level.

While PCR is the amplification method used in the examples herein, it is understood that any amplification method that uses a primer followed by a melting curve may be suitable. Such suitable procedures include polymerase chain reaction (PCR) of any type (single-step, two-steps, or others); strand displacement amplification (SDA); nucleic acid sequence-based amplification (NASBA); cascade rolling circle amplification (CRCA), loop-mediated isothermal amplification of DNA (LAMP); isothermal and chimeric primer-initiated amplification of nucleic acids (ICAN); target based-helicase dependent amplification (HDA); transcription-mediated amplification (TMA), next generation sequencing techniques, and the like. Therefore, when the term PCR is used, it should be understood to include other alternative amplification methods, including amino acid quantification methods. It is also understood that the methods included herein may be used for other biological and chemical processes that involve thermal cycling followed by melting curve analysis. For amplification methods without discrete cycles, reaction time may be used where measurements are made in cycles or Cp, and additional reaction time may be added where additional PCR cycles are added in the embodiments described herein. It is understood that protocols may need to be adjusted accordingly.

While various examples herein reference human targets and human pathogens, these examples are illustrative only. Methods, kits, and devices described herein may be used to detect and sequence a wide variety of nucleic acid sequences from a wide variety of samples, including, human, veterinary, industrial, and environmental.

It is also understood that various implementations described herein can be used in combination with any other implementation described or disclosed, without departing from the scope of the present disclosure. Therefore, products, members, elements, devices, apparatus, systems, methods, processes, compositions, and/or kits according to certain implementations of the present disclosure can include, incorporate, or otherwise comprise properties, features, components, members, elements, steps, and/or the like described in other implementations (including systems, methods, apparatus, and/or the like) disclosed herein without departing from the scope of the present disclosure. Thus, reference to a specific feature in relation to one implementation should not be construed as being limited to applications only within said implementation.

The headings used herein are for organizational purposes only and are not meant to be used to limit the scope of the description or the claims. To facilitate understanding, like reference numerals have been used, where possible, to designate like elements common to the figures. Furthermore, where possible, like numbering of elements have been used in various figures. Furthermore, alternative configurations of a particular element may each include separate letters appended to the element number.

Various embodiments disclosed herein use a self-contained nucleic acid analysis pouch to assay a sample for the presence of various biological substances, illustratively antigens and nucleic acid sequences, illustratively in a single closed system. Such systems, including pouches and instruments for use with the pouches, are disclosed in more detail in U.S. Pat. Nos. 8,394,608; and 8,895,295; and U.S. Patent Application No. 2014-0283945, herein incorporated by reference. However, it is understood that such instruments and pouches are illustrative only, and the nucleic acid preparation and amplification reactions discussed herein may be performed in any of a variety of open or closed system sample vessels as are known in the art, including 96-well plates, plates of other configurations, arrays, carousels, and the like, using a variety of nucleic acid purification and amplification systems, as are known in the art. While the terms "sample well", "amplification well", "amplification container", or the like are used herein, these terms are meant to encompass wells, tubes, blisters, and various other reaction containers, as are used in these amplification systems. The term "array" as used herein, unless the term is otherwise qualified, is a plurality of sample wells wherein the contents are intended to be amplified together in the same instrument, regardless of whether the sample wells are in an open or closed system. It is understood that the high-density array of a pouch is only one illustrative example of an array. Illustratively, the array may include one or more sample wells each containing a control material and one or more sample wells each containing a target nucleic acid. Such amplification systems may include a single multiplex step in an amplification container and may optionally include a plurality of second-stage (or "PCR2") individual or lower-order multiplex reactions in a plurality of individual reaction wells. In one embodiment, the pouch is used to assay for multiple pathogens. The pouch may include one or more blisters used as sample wells, illustratively in a closed system. Illustratively, various steps may be performed in the optionally disposable pouch, including nucleic acid preparation, primary large volume multiplex PCR, dilution of primary amplification product, and secondary PCR, culminating with optional real-time detection or post-amplification analysis such as melting-curve analysis. Further, it is understood that while the various steps may be performed in pouches of the present invention, one or more of the steps may be omitted for certain uses, and the pouch configuration may be altered accordingly.

FIG. 1 shows an illustrative pouch 510 that may be used in various embodiments, or may be reconfigured for various embodiments. Pouch 510 is similar to FIG. 15 of U.S. Pat. No. 8,895,295, with like items numbered the same. Fitment 590 is provided with entry channels 515a through 515l, which also serve as reagent reservoirs or waste reservoirs. Illustratively, reagents may be freeze dried in fitment 590 and rehydrated prior to use. Blisters 522, 544, 546, 548, 564, and 566 with their respective channels 514, 538, 543, 552, 553, 562, and 565 are similar to blisters of the same number of FIG. 15 of U.S. Pat. No. 8,895,295. Second-stage reaction zone 580 of FIG. 1 is similar to that of U.S. Pat. No. 8,895,295, but the second-stage wells 582 of high density array 581 are arranged in a somewhat different pattern. The more circular pattern of high density array 581 of FIG. 1 eliminates wells in corners and may result in more uniform filling of second-stage wells 582. As shown, the high density array 581 is provided with 102 second-stage wells 582. Pouch 510 is suitable for use in the FilmArray® instrument (BioFire Diagnostics, LLC, Salt Lake City, UT). However, it is understood that the pouch embodiment is illustrative only.

While other containers may be used, illustratively, pouch 510 is formed of two layers of a flexible plastic film or other flexible material such as polyester, polyethylene terephthalate (PET), polycarbonate, polypropylene, polymethylmethacrylate, and mixtures thereof that can be made by any process known in the art, including extrusion, plasma deposition, and lamination. Metal foils or plastics with aluminum lamination also may be used. Other barrier materials are known in the art that can be sealed together to form the blisters and channels. If plastic film is used, the layers may be bonded together, illustratively by heat sealing. Illustratively, the material has low nucleic acid binding capacity.

For embodiments employing fluorescent monitoring, plastic films that are adequately low in absorbance and auto-fluorescence at the operative wavelengths are preferred. Such material could be identified by testing different plastics, different plasticizers, and composite ratios, as well as different thicknesses of the film. For plastics with aluminum or other foil lamination, the portion of the pouch that is to be read by a fluorescence detection device can be left without the foil. For example, if fluorescence is monitored in second-stage wells 582 of the second-stage reaction zone 580 of pouch 510, then one or both layers at wells 582 would be left without the foil. In the example of PCR, film laminates composed of polyester (Mylar, DuPont, Wilmington DE) of about 0.0048 inch (0.1219 mm) thick and polypropylene films of 0.001-0.003 inch (0.025-0.076 mm) thick perform well. Illustratively, pouch 510 is made of a clear material capable of transmitting approximately 80%-90% of incident light.

In the illustrative embodiment, the materials are moved between blisters by the application of pressure, illustratively pneumatic pressure, upon the blisters and channels. Accordingly, in embodiments employing pressure, the pouch material illustratively is flexible enough to allow the pressure to have the desired effect. The term "flexible" is herein used to describe a physical characteristic of the material of pouch. The term "flexible" is herein defined as readily deformable by the levels of pressure used herein without cracking, breaking, crazing, or the like. For example, thin plastic sheets, such as Saran™ wrap and Ziploc© bags, as well as thin metal foil, such as aluminum foil, are flexible. However, only certain regions of the blisters and channels need be flexible, even in embodiments employing pneumatic pressure. Further, only one side of the blisters and channels need to be flexible, as long as the blisters and channels are readily deformable. Other regions of the pouch 510 may be made of a rigid material or may be reinforced with a rigid material.

Illustratively, a plastic film is used for pouch 510. A sheet of metal, illustratively aluminum, or other suitable material, may be milled or otherwise cut, to create a die having a pattern of raised surfaces. When fitted into a pneumatic press (illustratively A-5302-PDS, Janesville Tool Inc., Milton WI), illustratively regulated at an operating temperature of 195° C., the pneumatic press works like a printing press, melting the sealing surfaces of plastic film only where the die contacts the film. Various components, such as PCR primers (illustratively spotted onto the film and dried), antigen binding substrates, magnetic beads, and zirconium silicate beads may be sealed inside various blisters as the pouch 510 is formed. Reagents for sample processing can be spotted onto the film prior to sealing, either collectively or separately. In one embodiment, nucleotide tri-phosphates (NTPs) are spotted onto the film separately from polymerase and primers, essentially eliminating activity of the polymerase until the reaction is hydrated by an aqueous sample. If the aqueous sample has been heated prior to hydration, this creates the conditions for a true hot-start PCR and reduces or eliminates the need for expensive chemical hot-start components.

Pouch 510 may be used in a manner similar to that described in U.S. Pat. No. 8,895,295. In one illustrative embodiment, a 300 µl mixture comprising the sample to be tested (100 µl) and lysis buffer (200 µl) is injected into an injection port (not shown) in fitment 590 near entry channel 515a, and the sample mixture is drawn into entry channel 515a. Water is also injected into a second injection port (not shown) of the fitment 590 adjacent entry channel 515l, and is distributed via a channel (not shown) provided in fitment 590, thereby hydrating up to eleven different reagents, each of which were previously provided in dry form at entry channels 515b through 515l. These reagents illustratively may include freeze-dried PCR reagents, DNA extraction reagents, wash solutions, immunoassay reagents, or other chemical entities. Illustratively, the reagents are for nucleic acid extraction, first-stage (or "PCR1") multiplex PCR, dilution of the multiplex reaction, and preparation of second-stage PCR reagents, as well as control reactions. In the embodiment shown in FIG. 1, all that need be injected is the sample solution in one injection port and water in the other injection port. After injection, the two injection ports may be sealed. For more information on various configurations of pouch 510 and fitment 590, see U.S. Pat. No. 8,895,295, already incorporated by reference.

After injection, the sample is moved from injection channel 515a to lysis blister 522 via channel 514. Lysis blister 522 is provided with beads or particles 534, such as ceramic beads, and is configured for vortexing via impaction using rotating blades or paddles provided within the FilmArray® instrument. Bead-milling, by shaking or vortexing the sample in the presence of lysing particles such as zirconium silicate (ZS) beads 534, is an effective method to form a lysate. It is understood that, as used herein, terms such as "lyse," "lysing," and "lysate" are not limited to rupturing cells, but that such terms include disruption of non-cellular particles, such as viruses.

Figure 2:
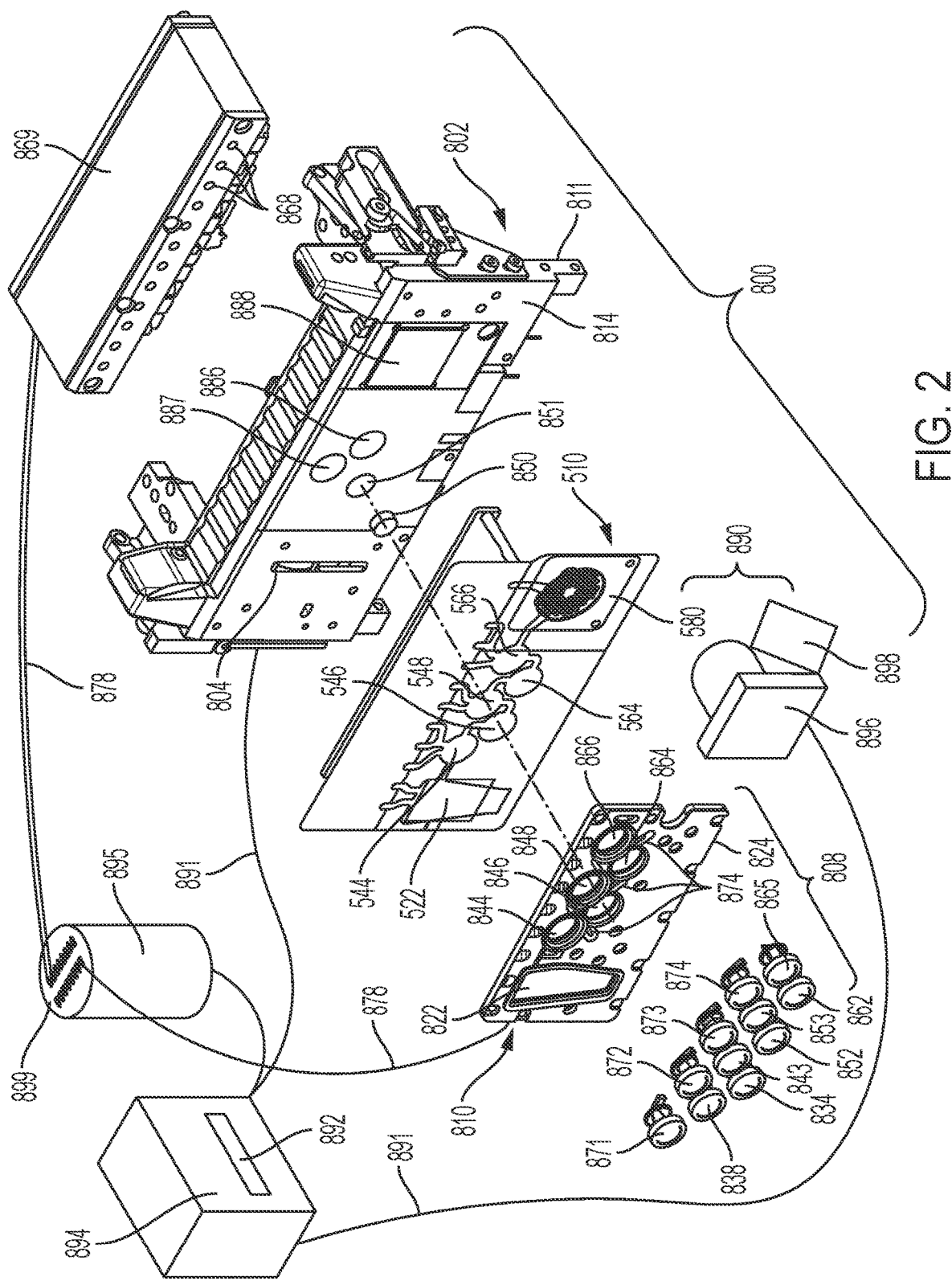
FIG. 2 shows an exploded perspective view of an instrument for use with the pouch of FIG. 1, including the pouch of FIG. 1, according to an example embodiment of the present invention.
Figure 4:
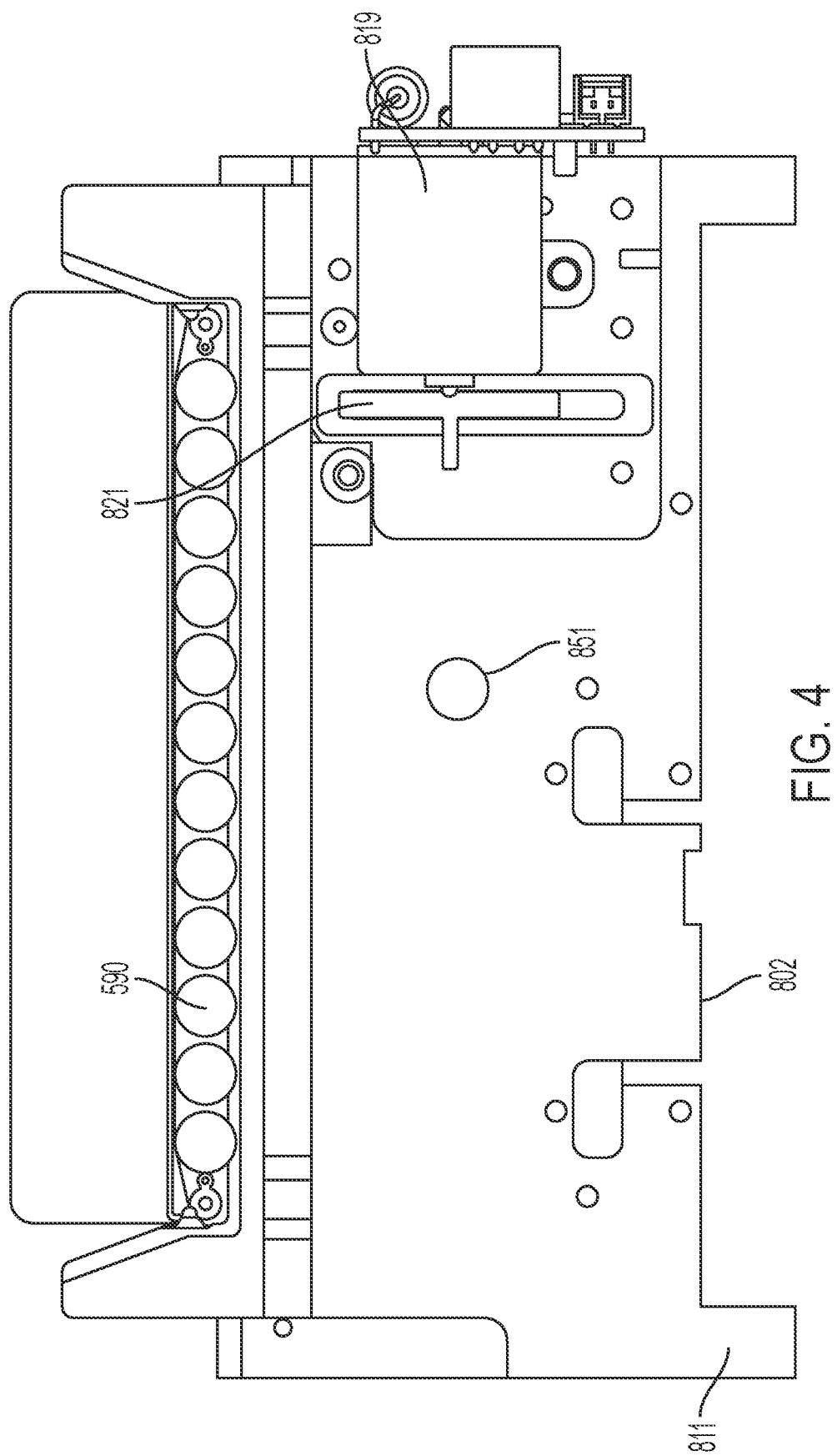
FIG. 4 shows a motor used in one illustrative embodiment of the instrument of FIG. 2.

FIG. 4 shows a bead beating motor 819, comprising blades 821 that may be mounted on a first side 811 of support member 802, of instrument 800 shown in FIG. 2. Blades may extend through slot 804 to contact pouch 510. It is understood, however, that motor 819 may be mounted on other structures of instrument 800. In one illustrative embodiment, motor 819 is a Mabuchi RC-280SA-2865 DC Motor (Chiba, Japan), mounted on support member 802. In one illustrative embodiment, the motor is turned at 5,000 to 25,000 rpm, more illustratively 10,000 to 20,000 rpm, and still more illustratively approximately 15,000 to 18,000 rpm. For the Mabuchi motor, it has been found that 7.2V provides sufficient rpm for lysis. It is understood, however, that the actual speed may be somewhat slower when the blades 821 are impacting pouch 510. Other voltages and speeds may be used for lysis depending on the motor and paddles used. Optionally, controlled small volumes of air may be provided into the bladder 822 adjacent lysis blister 522. It has been found that in some embodiments, partially filling the adjacent bladder with one or more small volumes of air aids in positioning and supporting lysis blister during the lysis process. Alternatively, other structure, illustratively a rigid or compliant gasket or other retaining structure around lysis blister 522, can be used to restrain pouch 510 during lysis. It is also understood that motor 819 is illustrative only, and other devices may be used for milling, shaking, or vortexing the sample.

Once the cells have been adequately lysed, the sample is moved through channel 538, blister 544, and channel 543, to blister 546, where the sample is mixed with a nucleic acid-binding substance, such as silica-coated magnetic beads 533. The mixture is allowed to incubate for an appropriate length of time, illustratively approximately 10 seconds to 10 minutes. A retractable magnet located within the instrument adjacent blister 546 captures the magnetic beads 533 from the solution, forming a pellet against the interior surface of blister 546. The liquid is then moved out of blister 546 and back through blister 544 and into blister 522, which is now used as a waste receptacle. One or more wash buffers from one or more of injection channels 515c to 515e are provided via blister 544 and channel 543 to blister 546. Optionally, the magnet is retracted and the magnetic beads 533 are washed by moving the beads back and forth from blisters 544 and 546 via channel 543. Once the magnetic beads 533 are washed, the magnetic beads 533 are recaptured in blister 546 by activation of the magnet, and the wash solution is then moved to blister 522. This process may be repeated as necessary to wash the lysis buffer and sample debris from the nucleic acid-binding magnetic beads 533.

After washing, elution buffer stored at injection channel 515f is moved to blister 548, and the magnet is retracted. The solution is cycled between blisters 546 and 548 via channel 552, breaking up the pellet of magnetic beads 533 in blister 546 and allowing the captured nucleic acids to dissociate from the beads and come into solution. The magnet is once again activated, capturing the magnetic beads 533 in blister 546, and the eluted nucleic acid solution is moved into blister 548.

First-stage PCR master mix from injection channel 515g is mixed with the nucleic acid sample in blister 548. Optionally, the mixture is mixed by forcing the mixture between 548 and 564 via channel 553. After several cycles of mixing, the solution is contained in blister 564, where a pellet of first-stage PCR primers is provided, at least one set of primers for each target, and first-stage multiplex PCR is performed. If RNA targets are present, a reverse-transcription (RT) step may be performed prior to or simultaneously with the first-stage multiplex PCR. First-stage multiplex PCR temperature cycling in the FilmArray® instrument is illustratively performed for 15-30 cycles, although other levels of amplification may be desirable, depending on the requirements of the specific application. The first-stage PCR master mix may be any of various master mixes, as are known in the art. In one illustrative example, the first-stage PCR master mix may be any of the chemistries disclosed in US2015/0118715, herein incorporated by reference, for use with PCR protocols taking 20 seconds or less per cycle.

After first-stage PCR has proceeded for the desired number of cycles, the sample may be diluted, illustratively by forcing most of the sample back into blister 548, leaving only a small amount in blister 564, and adding second-stage PCR master mix from injection channel 515i. Alternatively, a dilution buffer from 515i may be moved to blister 566 then mixed with the amplified sample in blister 564 by moving the fluids back and forth between blisters 564 and 566. If desired, dilution may be repeated several times, using dilution buffer from injection channels 515*j* and 515*k*, or injection channel 515*k* may be reserved for sequencing or for other post-PCR analysis, and then adding second-stage PCR master mix from injection channel 515*h* to some or all of the diluted amplified sample. It is understood that the level of dilution may be adjusted by altering the number of dilution steps or by altering the percentage of the sample discarded prior to mixing with the dilution buffer or second-stage PCR master mix comprising components for amplification, illustratively a polymerase, dNTPs, and a suitable buffer, although other components may be suitable, particularly for non-PCR amplification methods. If desired, this mixture of the sample and second-stage PCR master mix may be pre-heated in blister 564 prior to movement to second-stage wells 582 for second-stage amplification. Such preheating may obviate the need for a hot-start component (antibody, chemical, or otherwise) in the second-stage PCR mixture.

The illustrative second-stage PCR master mix is incomplete, lacking primer pairs, and each of the 102 second-stage wells 582 is pre-loaded with a specific PCR primer pair (or sometimes multiple pairs of primers). If desired, second-stage PCR master mix may lack other reaction components, and these components may be pre-loaded in the second-stage wells 582 as well. Each primer pair may be similar to or identical to a first-stage PCR primer pair or may be nested within the first-stage primer pair. Movement of the sample from blister 564 to the second-stage wells 582 completes the PCR reaction mixture. Once high density array 581 is filled, the individual second-stage reactions are sealed in their respective second-stage blisters by any number of means, as is known in the art. Illustrative ways of filling and sealing the high density array 581 without cross-contamination are discussed in U.S. Pat. No. 8,895,295, already incorporated by reference. Illustratively, the various reactions in wells 582 of high density array 581 are simultaneously thermal cycled, illustratively with one or more Peltier devices, although other means for thermal cycling are known in the art.

In certain embodiments, second-stage PCR master mix contains the dsDNA binding dye LCGreen® Plus (BioFire Diagnostics, LLC) to generate a signal indicative of amplification. However, it is understood that this dye is illustrative only, and that other signals may be used, including other dsDNA binding dyes and probes that are labeled fluorescently, radioactively, chemiluminescently, enzymatically, or the like, as are known in the art. Alternatively, wells 582 of high density array 581 may be provided without a signal, with results reported through subsequent processing.

Figure 3:
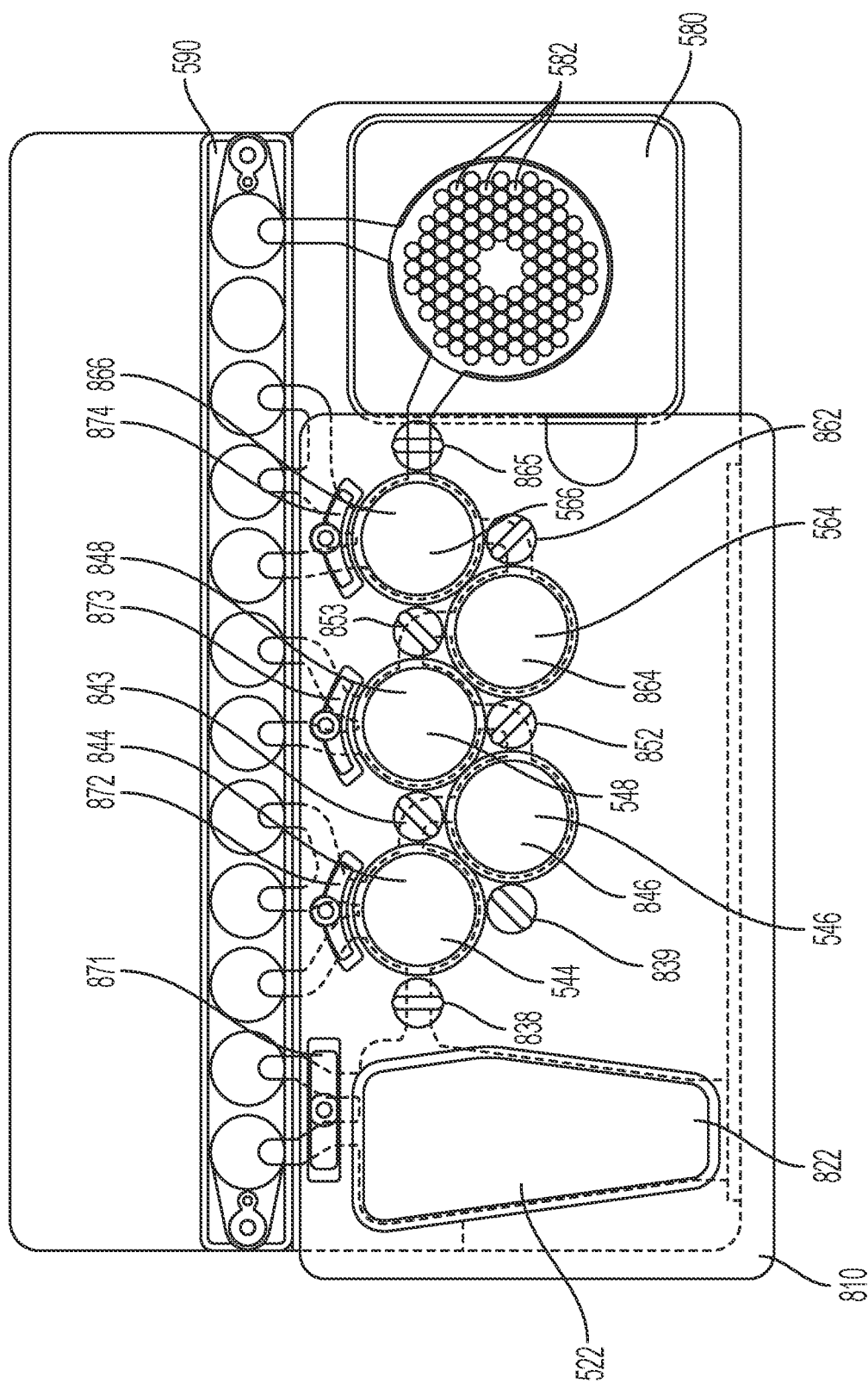
FIG. 3 shows a partial cross-sectional view of the instrument of FIG. 2, including the bladder components of FIG. 2, with the pouch of FIG. 1 shown in dashed lines, according to an example embodiment of the present invention.

When pneumatic pressure is used to move materials within pouch 510, in one embodiment a "bladder" may be employed. The bladder assembly 810, a portion of which is shown in FIGS. 2 and 3, includes a bladder plate 824 housing a plurality of inflatable bladders 822, 844, 846, 848, 864, and 866, each of which may be individually inflatable, illustratively by a compressed gas source. Because the bladder assembly 810 may be subjected to compressed gas and used multiple times, the bladder assembly 810 may be made from tougher or thicker material than the pouch. Alternatively, bladders 822, 844, 846, 848, 864, and 866 may be formed from a series of plates fastened together with gaskets, seals, valves, and pistons. Other arrangements are within the scope of this invention.

Success of the secondary PCR reactions is dependent upon template generated by the multiplex first-stage reaction. Typically, PCR is performed using DNA of high purity. Methods such as phenol extraction or commercial DNA extraction kits provide DNA of high purity. Samples processed through the pouch 510 may require accommodations be made to compensate for a less pure preparation. PCR may be inhibited by components of biological samples, which is a potential obstacle. Illustratively, hot-start PCR, higher concentration of taq polymerase enzyme, adjustments in $MgCl_2$ concentration, adjustments in primer concentration, and addition of adjuvants (such as DMSO, TMSO, or glycerol) optionally may be used to compensate for lower nucleic acid purity. While purity issues are likely to be more of a concern with first-stage amplification and single-stage PCR, it is understood that similar adjustments may be provided in the second-stage amplification as well.

When pouch 510 is placed within the instrument 800, the bladder assembly 810 is pressed against one face of the pouch 510, so that if a particular bladder is inflated, the pressure will force the liquid out of the corresponding blister in the pouch 510. In addition to bladders corresponding too many of the blisters of pouch 510, the bladder assembly 810 may have additional pneumatic actuators, such as bladders or pneumatically-driven pistons, corresponding to various channels of pouch 510. FIGS. 2 and 3 show an illustrative plurality of pistons or hard seals 838, 843, 852, 853, and 865 that correspond to channels 538, 543, 553, and 565 of pouch 510, as well as seals 871, 872, 873, 874 that minimize backflow into fitment 590. When activated, hard seals 838, 843, 852, 853, and 865 form pinch valves to pinch off and close the corresponding channels. To confine liquid within a particular blister of pouch 510, the hard seals are activated over the channels leading to and from the blister, such that the actuators function as pinch valves to pinch the channels shut. Illustratively, to mix two volumes of liquid in different blisters, the pinch valve actuator sealing the connecting channel is activated, and the pneumatic bladders over the blisters are alternately pressurized, forcing the liquid back and forth through the channel connecting the blisters to mix the liquid therein. The pinch valve actuators may be of various shapes and sizes and may be configured to pinch off more than one channel at a time. While pneumatic actuators are discussed herein, it is understood that other ways of providing pressure to the pouch are contemplated, including various electromechanical actuators such as linear stepper motors, motor-driven cams, rigid paddles driven by pneumatic, hydraulic or electromagnetic forces, rollers, rocker-arms, and in some cases, cocked springs. In addition, there are a variety of methods of reversibly or irreversibly closing channels in addition to applying pressure normal to the axis of the channel. These include kinking the bag across the channel, heat-sealing, rolling an actuator, and a variety of physical valves sealed into the channel such as butterfly valves and ball valves. Additionally, small Peltier devices or other temperature regulators may be placed adjacent the channels and set at a temperature sufficient to freeze the fluid, effectively forming a seal. Also, while the design of FIG. 1 is adapted for an automated instrument featuring actuator elements positioned over each of the blisters and channels, it is also contemplated that the actuators could remain stationary, and the pouch 510 could be transitioned in one or two dimensions such that a small number of actuators could be used for several of the processing stations including sample disruption, nucleic-acid capture, first and second-stage PCR, and other applications of the pouch 510 such as immuno-assay and immuno-PCR. Rollers acting on channels and blisters could prove particularly useful in a configuration in which the pouch 510 is translated between stations. Thus, while pneumatic actuators are used in the presently disclosed embodiments, when the term "pneumatic actuator" is used herein, it is understood that other actuators and other ways of providing pressure may be used, depending on the configuration of the pouch and the instrument.

Other prior art instruments teach PCR within a sealed flexible container. See, e.g., U.S. Pat. Nos. 6,645,758 and 6,780,617, and 9,586,208, herein incorporated by reference. However, including the cell lysis within the sealed PCR vessel can improve ease of use and safety, particularly if the sample to be tested may contain a biohazard. In the embodiments illustrated herein, the waste from cell lysis, as well as that from all other steps, remains within the sealed pouch. However, it is understood that the pouch contents could be removed for further testing.

FIG. 2 shows an illustrative instrument 800 that could be used with pouch 510. Instrument 800 includes a support member 802 that could form a wall of a casing or be mounted within a casing. Instrument 800 may also include a second support member (not shown) that is optionally movable with respect to support member 802, to allow insertion and withdrawal of pouch 510. Illustratively, a lid may cover pouch 510 once pouch 510 has been inserted into instrument 800. In another embodiment, both support members may be fixed, with pouch 510 held into place by other mechanical means or by pneumatic pressure.

In the illustrative example, heaters 886 and 888 are mounted on support member 802. However, it is understood that this arrangement is illustrative only and that other arrangements are possible. Bladder plate 810, with bladders 822, 844, 846, 848, 864, 866, hard seals 838, 843, 852, 853, seals 871, 872, 873, 874 form bladder assembly 808 may illustratively be mounted on a moveable support structure that may be moved toward pouch 510, such that the pneumatic actuators are placed in contact with pouch 510. When pouch 510 is inserted into instrument 800 and the movable support member is moved toward support member 802, the various blisters of pouch 510 are in a position adjacent to the various bladders of bladder assembly 810 and the various seals of assembly 808, such that activation of the pneumatic actuators may force liquid from one or more of the blisters of pouch 510 or may form pinch valves with one or more channels of pouch 510. The relationship between the blisters and channels of pouch 510 and the bladders and seals of assembly 808 is illustrated in more detail in FIG. 3.

Each pneumatic actuator is connected to compressed air source 895 via valves 899. While only several hoses 878 are shown in FIG. 2, it is understood that each pneumatic fitting is connected via a hose 878 to the compressed gas source 895. Compressed gas source 895 may be a compressor, or, alternatively, compressed gas source 895 may be a compressed gas cylinder, such as a carbon dioxide cylinder. Compressed gas cylinders are particularly useful if portability is desired. Other sources of compressed gas are within the scope of this invention.

Assembly 808 is illustratively mounted on a movable support member, although it is understood that other configurations are possible.

Several other components of instrument 810 are also connected to compressed gas source 895. A magnet 850, which is mounted on a second side 814 of support member 802, is illustratively deployed and retracted using gas from compressed gas source 895 via hose 878, although other methods of moving magnet 850 are known in the art. Magnet 850 sits in recess 851 in support member 802. It is understood that recess 851 can be a passageway through support member 802, so that magnet 850 can contact blister 546 of pouch 510. However, depending on the material of support member 802, it is understood that recess 851 need not extend all the way through support member 802, as long as when magnet 850 is deployed, magnet 850 is close enough to provide a sufficient magnetic field at blister 546, and when magnet 850 is retracted, magnet 850 does not significantly affect any magnetic beads 533 present in blister 546. While reference is made to retracting magnet 850, it is understood that an electromagnet may be used and the electromagnet may be activated and inactivated by controlling flow of electricity through the electromagnet. Thus, while this specification discusses withdrawing or retracting the magnet, it is understood that these terms are broad enough to incorporate other ways of withdrawing the magnetic field. It is understood that the pneumatic connections may be pneumatic hoses or pneumatic air manifolds, thus reducing the number of hoses or valves required.

The various pneumatic pistons 868 of pneumatic piston array 869 are also connected to compressed gas source 895 via hoses 878. While only two hoses 878 are shown connecting pneumatic pistons 868 to compressed gas source 895, it is understood that each of the pneumatic pistons 868 are connected to compressed gas source 895. Twelve pneumatic pistons 868 are shown.

A pair of heating/cooling devices, illustratively Peltier heaters, are mounted on a second side 814 of support 802. First-stage heater 886 is positioned to heat and cool the contents of blister 564 for first-stage PCR. Illustratively, second-stage heater 888 is positioned to heat and cool the contents of second-stage wells 582 of pouch 510, for second-stage PCR, including all sample wells and control wells. It is understood, however, that these heaters could also be used for other heating purposes, and that other heaters may be use, as appropriate for the particular application. Other configurations are possible.

When fluorescent detection is desired, an optical array 890 may be provided. As shown in FIG. 2, optical array 890 includes a light source 898, illustratively a filtered LED light source, filtered white light, or laser illumination, and a camera 896. Camera 896 illustratively has a plurality of photodetectors each corresponding to a second-stage well 582 in pouch 510. Alternatively, camera 896 may take images that contain all of the second-stage wells 582, and the image may be divided into separate fields corresponding to each of the second-stage wells 582. Depending on the configuration, optical array 890 may be stationary, or optical array 890 may be placed on movers attached to one or more motors and moved to obtain signals from each individual second-stage well 582. In an illustrative embodiment, the optical array images all wells 582 within array 581, including all sample wells and control wells, simultaneously, sequentially, or in other arrangements. While an LED light source 898 and camera 896 are used in this example, it is understood that other arrangements are possible, including fluorimeters using photomultipliers, splitters, filters, and a variety of other arrangements, and other measuring devices, depending on the detection mechanism used in wells 582.

As shown, a computer 894 controls valves 899 of compressed air source 895, and thus controls all of the pneumatics of instrument 800. Computer 894 also controls heaters 886 and 888, and optical array 890. Each of these components is connected electrically, illustratively via cables 891, although other physical or wireless connections are within the scope of this invention. It is understood that computer 894 may be housed within instrument 800 or may be external to instrument 800. Further, computer 894 may include built-in circuit boards that control some or all of the components, may calculate amplification curves, melting curves, Cps, Cts, standard curves, and other related data, and may also include an external computer, such as a desktop or laptop PC, to receive and display data from the optical array. An interface, illustratively a keyboard interface, may be provided including keys for inputting information and variables such as temperatures, cycle times, etc. Illustratively, a display 892 is also provided. Display 892 may be an LED, LCD, or other such display, for example.

Example 1

The temperature at which DNA strands denature (Tm) depends on the sequence characteristics of the DNA. The melting temperature may depend on subtle differences in pouch chemistry concentrations, amount of amplicon, and instrument characteristics, but should otherwise be consistent across pouch runs. The control assay Tm historically shows on average 0.69 degree standard deviation between pouch runs. If this variablity is pouch chemistry or instrument specific, the control assay Tm values in a given pouch may be used to normalize the analyte assay Tm values for that pouch.

It was hypothesized that target Tm correlations may be present for any or all assays within the array in the same pouch. Tm correlations may allow for normalization of Tm values within a pouch run (Tm value normalization). Advantageously, Tm value normalization would reduce the range of the Tm distribution between pouch runs, allowing for narrower Tm ranges, and resulting in greater specificity and sensitivity. Furthermore, Tm value normalization would allow for analyses using Tm values that were not feasible with greater variability. For example, Tm values between related species could be distinguished as part of pouch analysis or as a population meta-analysis.

Several different datasets were used to estimate the intra-pouch correlations between control Tm values and analyte assay Tm values across different concentrations. These datasets included pouch QC data and panel development analytic study data, as well as runs from Limit of Detection (LoD) studies.

First, pouch QC Data was retrieved from the FilmArray database. This pouch QC data included individual analyte assay data from 435,678 runs from Mar. 19, 2013 to Nov. 26, 2018. The panels included Respiratory ("RP") Panel, Gastrointestinal ("GI") Panel, Blood Culture Identification ("BCID") Panel, Meningitis/Encephalitis ("ME") Panel, Respiratory 2 ("RP2") Panel, and Respiratory 2plus ("RP2plus") Panel (BioFire Diagnostics, LLC). While the commercial software reports only positive, negative, indeterminate for most assays, additional data, including Tm and Cp can be retrieved from internal databases. While the examples below discuss calling results positive or negative, or speciation or other distinctions between positive results, it is understood that an indeterminate result is still possible. A regrouping algorithm is applied to a first Tm value ("Tm1") and a second Tm value ("Tm2") for analyte assays with multiple Tm values (same method used for Tm range studies). In this example, the average Tm1 value (of the wells) for each assay within each pouch was used. Runs with average yeast control or PCR2 control Tm values out of the melt ranges were excluded. While reference is made below to various pathogens and antibiotics, it is understood that this represents assays for the specific pathogen or antibiotic resistance genes used within the respective pouches. It is also understood that the methods used herein may be used on other assay targets, including those not associated with pathogens.

Figure 5A:
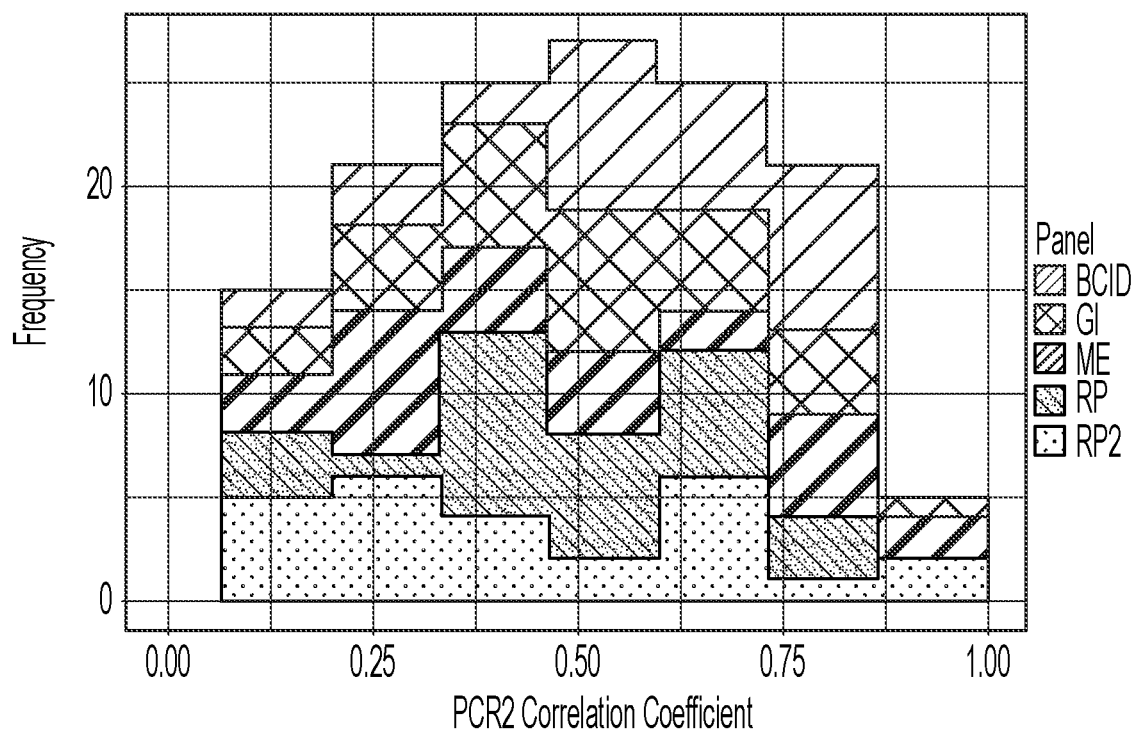
FIG. 5A is a histogram illustrating the correlation between Tm values for each analyte assay in a panel and Tm values for a PCR2 control, from QC data.
Figure 5B:
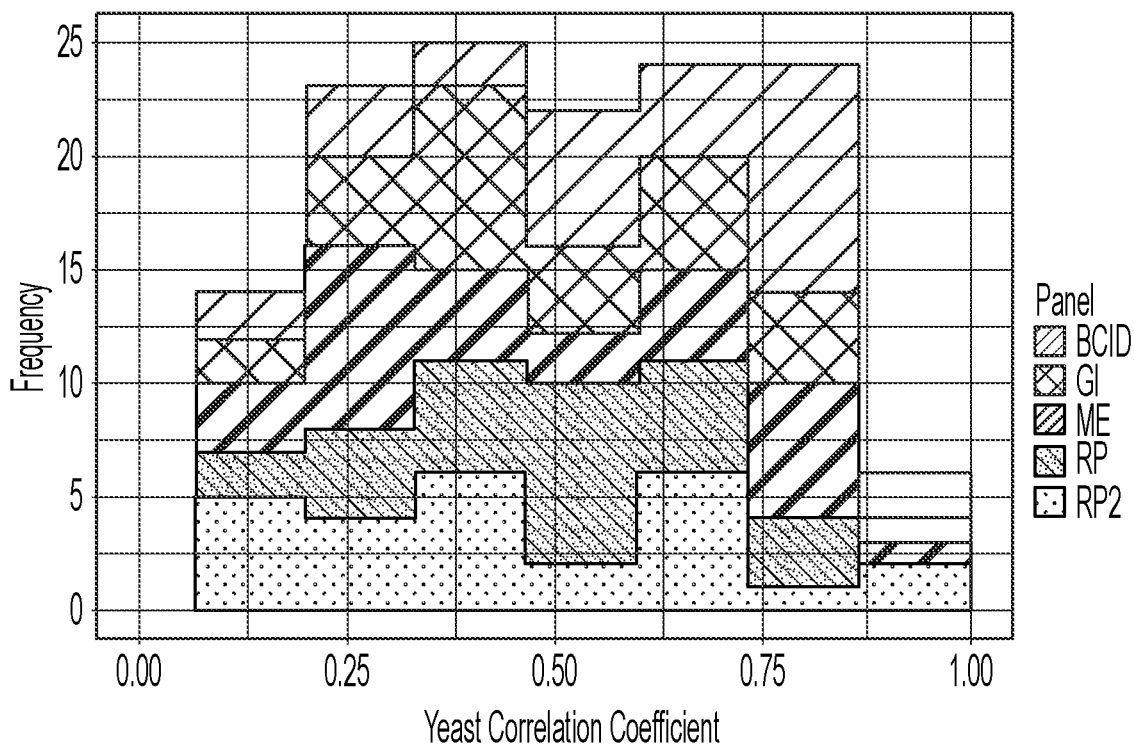
FIG. 5B is a histogram illustrating the correlation between Tm values for each analyte assay in a panel and Tm values for a yeast control, from QC data.

Correlation coefficients were computed for each analyte assay. FIG. 5A is a histogram illustrating the correlation between Tm values for each analyte assay in the panel and the Tm values for the PCR2 control, while FIG. 5B is a histogram illustrating the correlation between Tm values for each analyte assay in the panel and the Tm values for the yeast control. As shown in FIG. 5A, for the PCR2 control, the correlation coefficients for RP ranged from 0.122 to 0.755, the correlation coefficients for BCID ranged from 0.109 to 0.829, the correlation coefficients for GI ranged from 0.015 to 0.909, the correlation coefficients for ME ranged from 0.067 to 0.888, and the correlation coefficients for RP2 & RP2plus ranged from 0.029 to 0.936. As shown in FIG. 5B, for the yeast control, the correlation coefficients for RP ranged from 0.042 to 0.854, the correlation coefficients for BCID ranged from 0.068 to 0.874, the correlation coefficients for GI ranged from 0.007 to 0.902, the correlation coefficients for ME ranged from 0.071 to 0.927, and the correlation coefficients for RP2 & RP2plus ranged from 0.021 to 0.969.

Figure 6A:
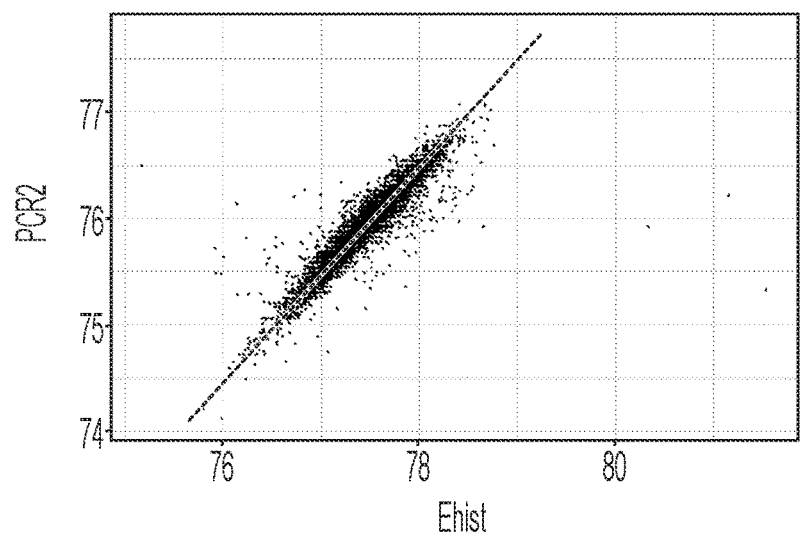
FIG. 6A is a scatter plot illustrating average Tm values for Ehist vs average Tm values of a PCR2 control, from QC data.
Figure 6B:
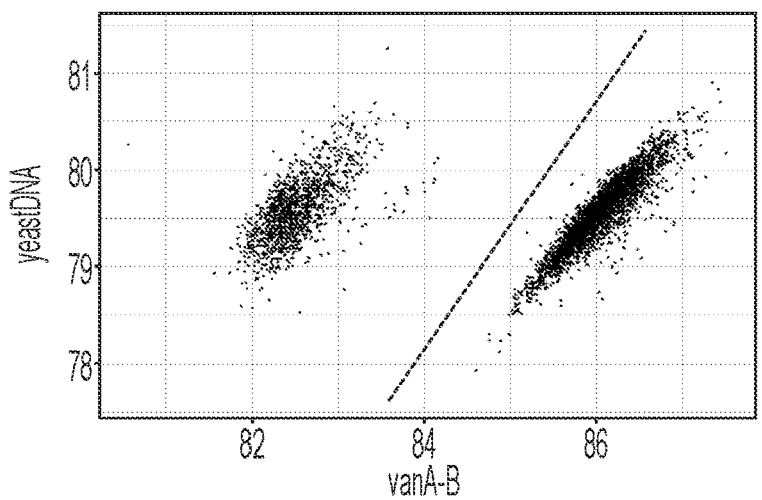
FIG. 6B is a scatter plot illustrating average Tm values for vanA-B vs average Tm values of a yeast control, from QC data.
Figure 6C:
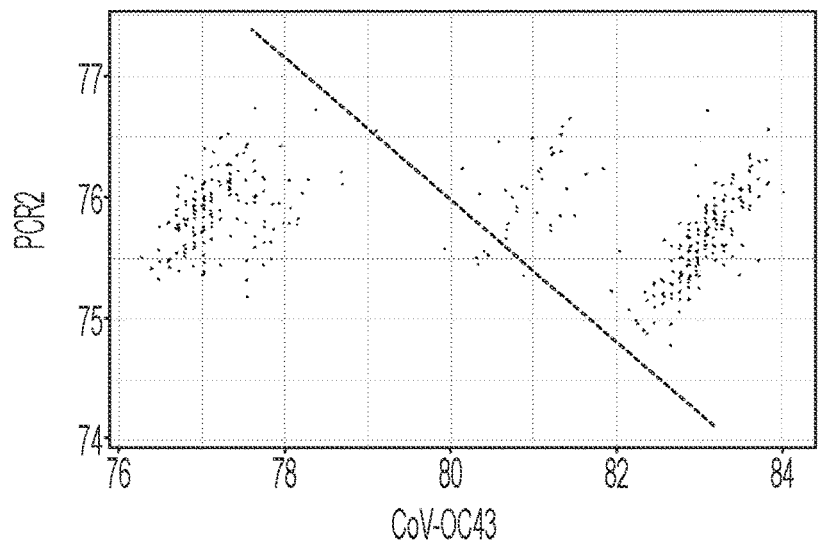
FIG. 6C is a scatter plot illustrating average Tm values for CoV-OC43 vs average Tm value for a PCR2 control, from QC data.

The Tm results were plotted for visual observation and modelled using linear regression. Based on these plots, it was clear that some analyte assays contained one population. For example, FIG. 6A illustrates a scatter plot of average Tm values for *Entamoeba histolytica* ("Ehist") vs average Tm values of a PCR2 control (with each point indicating one pouch run), where there is likely just one population. Other analyte assays likely contained two populations, as can be seen in FIG. 6B, a scatter plot illustrating average Tm values for the Vancomycin resistance assay ("vanA-B") vs average Tm values of a yeast control (with each point indicating one pouch run), or even three populations, as can be seen in FIG. 6C, a scatter plot illustrating average Tm values for Coronavirus OC43 ("CoV-OC43") vs average Tm value for a PCR2 control (with each point indicating one pouch run). Accordingly, for those analyte assays containing multiple populations, the correlation between the Tm values of the analyte assay and the control Tm values was weaker.

Figure 7A:
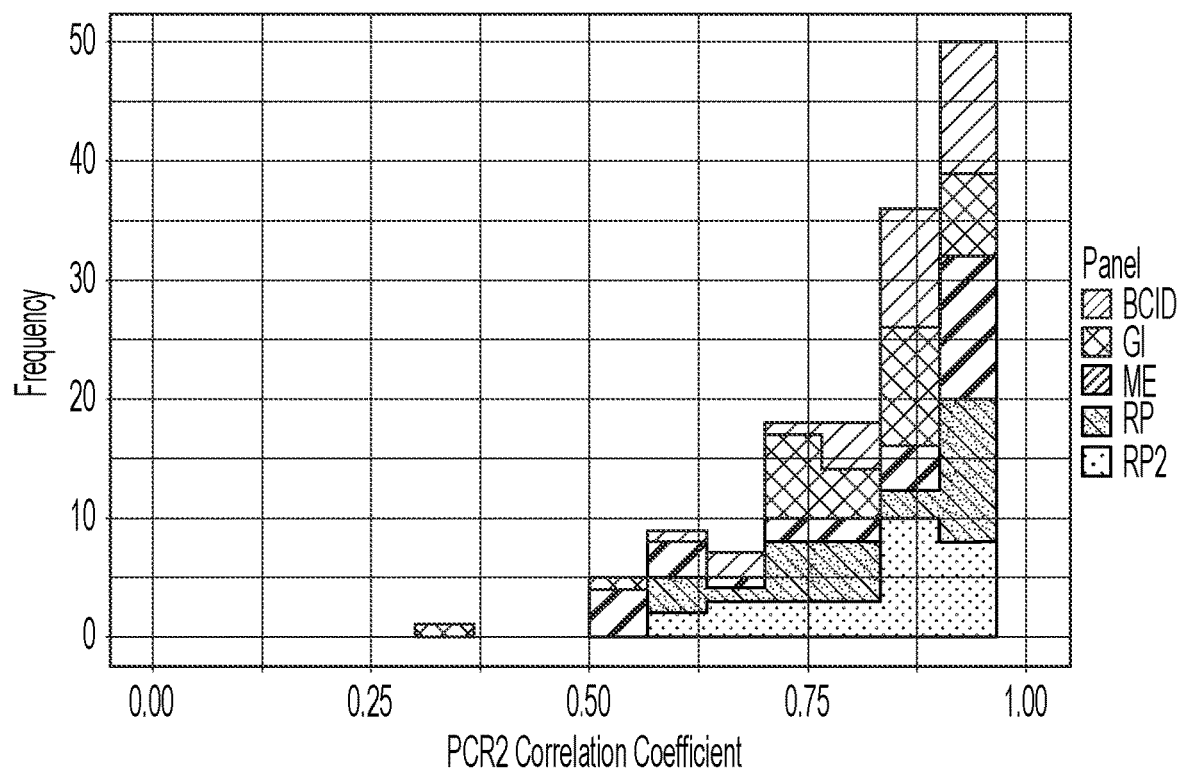
FIG. 7A is a histogram illustrating the average correlation coefficients between Tm values of each analyte assay in a panel and Tm values of a PCR2 control after applying a clustering algorithm, from QC data.
Figure 7B:
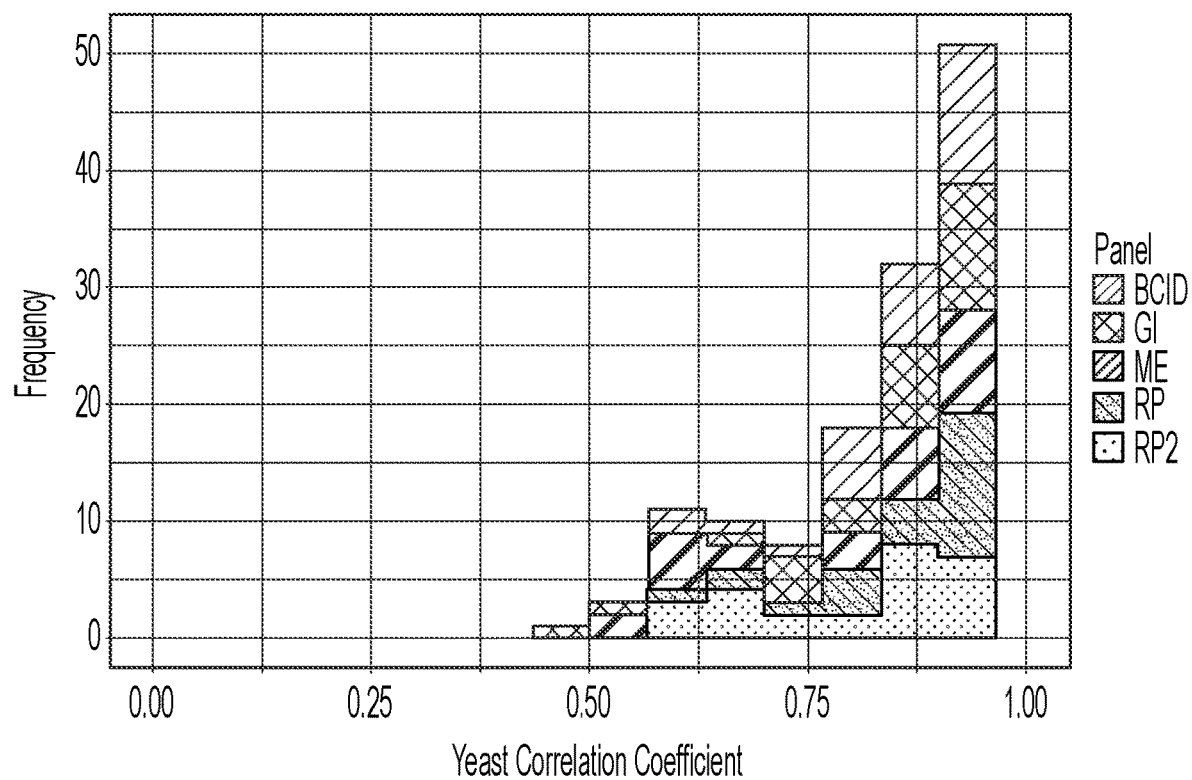
FIG. 7B is a histogram illustrating the average correlation coefficients between the Tm values of each analyte assay in a panel and Tm values of a yeast control after applying a clustering algorithm, from QC data.

Next, a clustering algorithm was applied to group obvious populations, and groups that accounted for less than 5% of the data for each analyte assay were removed. Correlation coefficients were then calculated for each group. The correlation coefficients for each group were then averaged to obtain an analyte assay level metric. For example, FIG. 7A is a histogram illustrating the average correlation coefficients between each analyte assay in the panel and the PCR2 control, while FIG. 7B is a histogram illustrating the average correlation coefficients between each analyte assay in the panel and the yeast control. As shown in FIG. 7A, the average correlation coefficients for RP ranged from 0.583 to 0.952, the average correlation coefficients for BCID ranged from 0.619 to 0.942, the average correlation coefficients for GI ranged from 0.351 to 0.958, the average correlation coefficients for ME ranged from 0.507 to 0.957, and the average correlation coefficients for RP2 & RP2plus ranged from 0.577 to 0.949. As shown in FIG. 7B, the average correlation coefficients for RP ranged from 0.575 to 0.973, the average correlation coefficients for BCID ranged from 0.610 to 0.962, the average correlation coefficients for GI ranged from 0.444 to 0.969, the average correlation coefficients for ME ranged from 0.522 to 0.972, and the average correlation coefficients for RP2 & RP2plus ranged from 0.603 to 0.982.

Figure 8B:
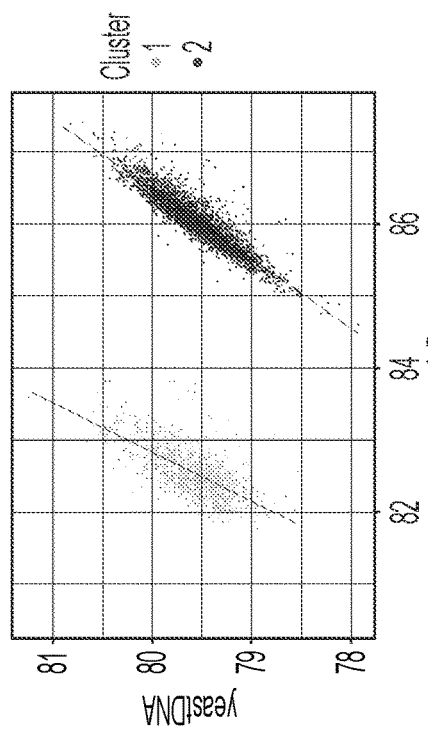
FIG. 8B is a scatter plot illustrating average Tm values for vanA-B vs average Tm values of a yeast control after applying a clustering algorithm, from QC data.
Figure 8A:
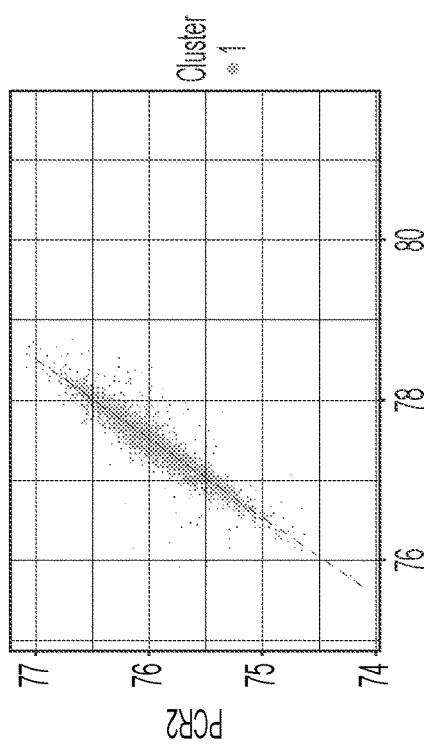
FIG. 8A is a scatter plot illustrating average Tm values for Ehist vs average Tm values of a PCR2 control after applying a clustering algorithm, from QC data.
Figure 8C:
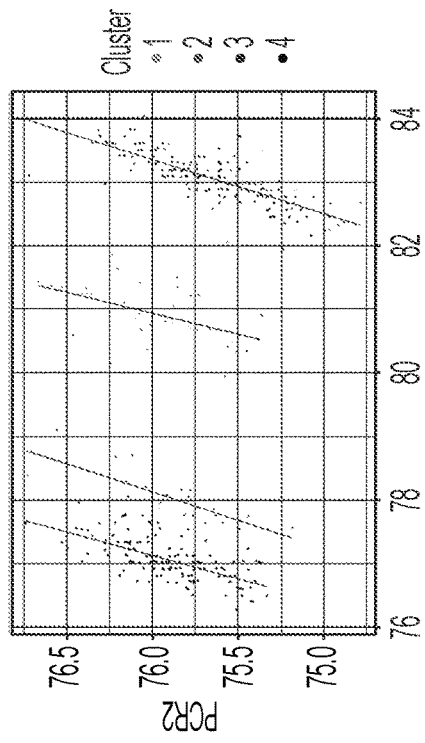
FIG. 8C is a scatter plot illustrating average Tm values for CoV-OC43 vs average Tm value for a PCR2 control after applying a clustering algorithm, from QC data.

Additionally, a linear model was fitted to each group, and the slopes of the group-level linear regression models were averaged to obtain an analyte assay level metric, as shown in FIGS. 8A, 8B, and 8C. For example, FIG. 8A is a scatter plot illustrating average Tm values for Ehist vs average Tm values of a PCR2 control after applying the clustering algorithm, while FIG. 8B is a scatter plot illustrating average Tm values for vanA-B vs average Tm values of a yeast control after applying the clustering algorithm, and FIG. 8C is a scatter plot illustrating average Tm values for CoV-OC43 vs average Tm value for a PCR2 control after applying the clustering algorithm. When comparing FIGS. 8A, 8B, and 8C to the same data plotted prior to the clustering algorithm and averaging (shown in FIGS. 6A, 6B, and 6C), it is clear that the clustering algorithm has improved the correlation in each case.

Next, original LoD data from melt range studies were retrieved from the FilmArray database. The data included 2,899 runs from Feb. 17, 2012 to Oct. 23, 2018, and the panels included GI, BCID, ME, and RP2. A regrouping algorithm was applied to Tm1 and Tm2 values for analyte assays with multiple Tm values. The average Tm1 value (of the wells) was used for each assay within each pouch. Runs with average yeast control or PCR2 control Tm values out of the melt ranges were excluded. A clustering algorithm was applied to this data, and correlation coefficients and slopes were calculated as discussed above.

Figure 9A:
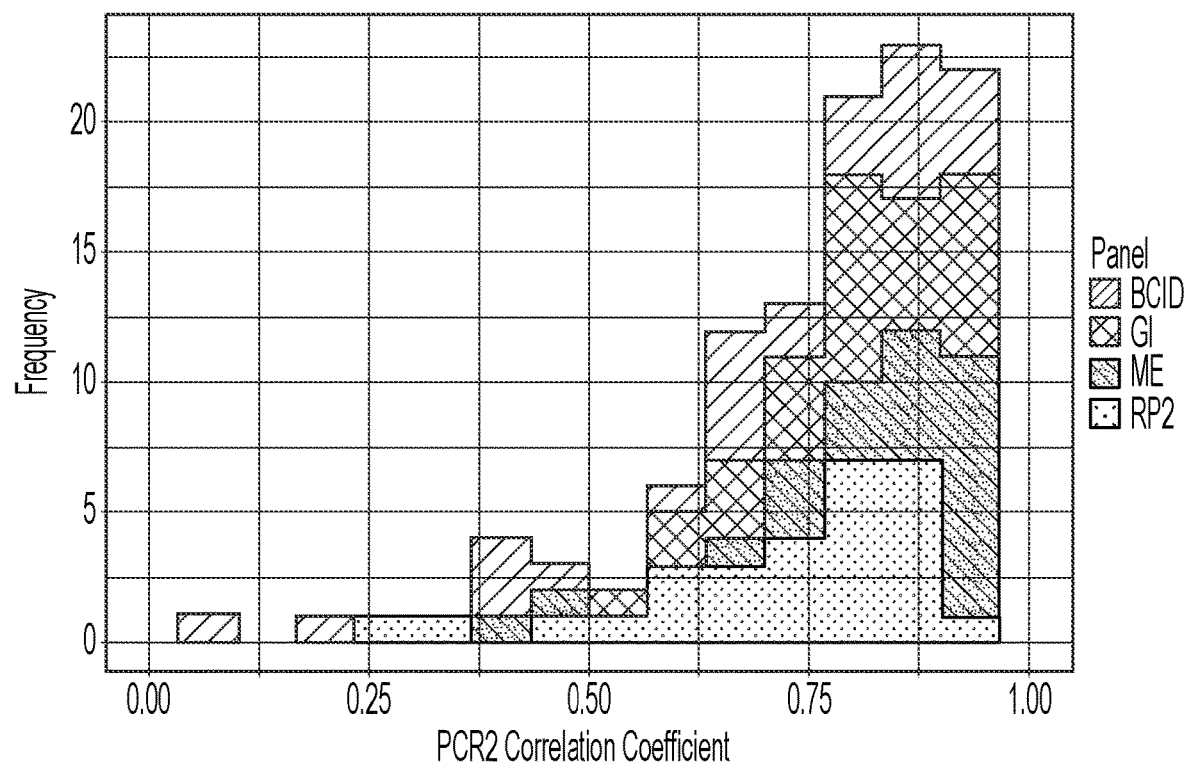
FIG. 9A is a histogram illustrating average correlation coefficients between average Tm values for each analyte assay in a panel and Tm values of a PCR2 control after applying a clustering algorithm, from LoD data.
Figure 9B:
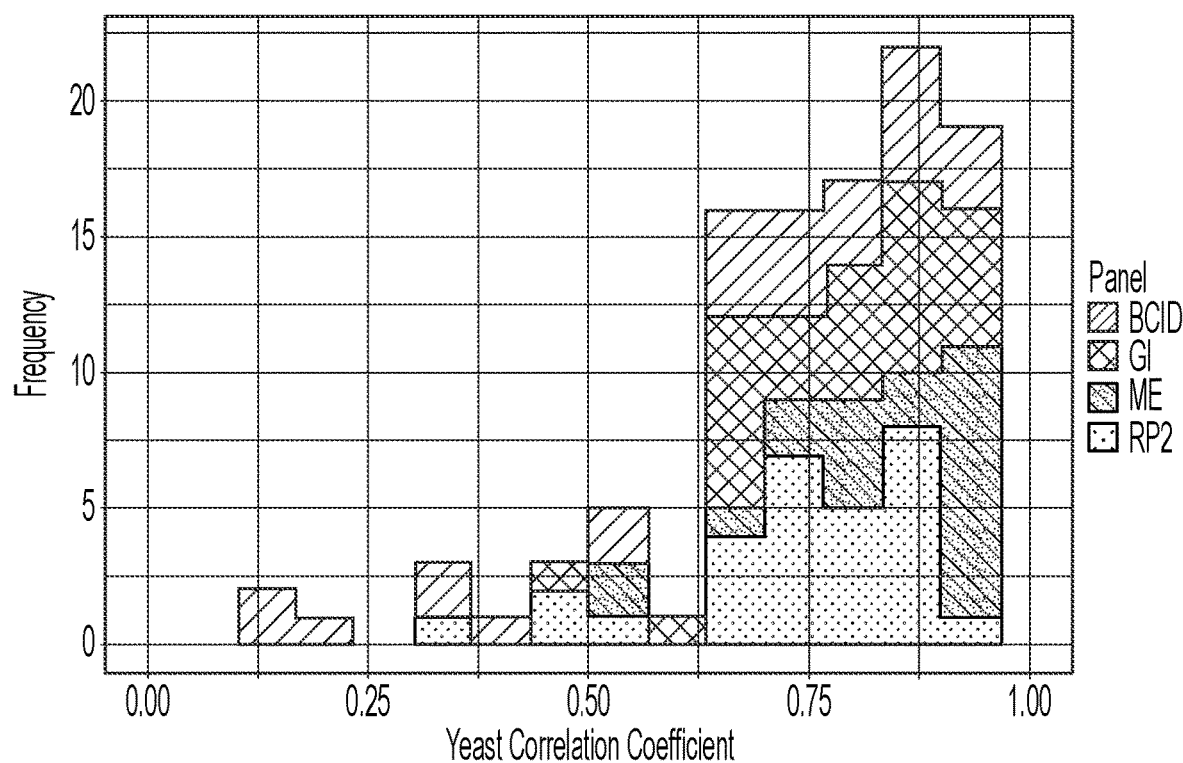
FIG. 9B is a histogram illustrating average correlation coefficients between average Tm values for each analyte assay in a panel and Tm values of a yeast control after applying a clustering algorithm, from LoD data.

Similar to the method discussed above with respect to FIGS. 7A and 7B, a clustering algorithm was applied to group obvious populations in the LoD data, and groups that accounted for less than 5% of the data for each analyte assay were removed. Correlation coefficients were then calculated for each group. The correlation coefficients for each group were then averaged to obtain an analyte assay level metric. FIG. 9A is a histogram illustrating the average correlation coefficients between the Tm values for each analyte assay in the panel and the Tm values of a PCR2 control, while FIG. 9B is a histogram illustrating the average correlation coefficients between the Tm values for each analyte assay in the panel and the Tm values of a yeast control. As shown in FIG. 9A, the average correlation coefficients for GI ranged from 0.554 to 0.950, the average correlation coefficients for BCID ranged from 0.062 to 0.992, the average correlation coefficients for ME ranged from 0.400 to 0.973, and the average correlation coefficients for RP2 ranged from 0.237 to 0.933. As shown in FIG. 9B, the average correlation coefficients for GI ranged from 0.472 to 0.967, the average correlation coefficients for BCID ranged from 0.115 to 0.981, the average correlation coefficients for ME ranged from 0.549 to 0.982, and the average correlation coefficients for RP2 ranged from 0.350 to 0.904.

Figure 10B:
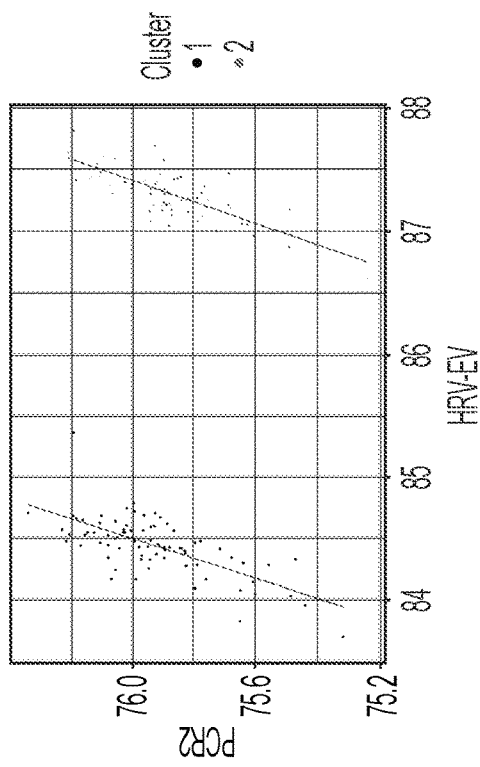
FIG. 10B is a scatter plot illustrating average Tm values for HRV-EV vs average Tm values of a PCR2 control after applying a clustering algorithm, from LoD data.
Figure 10A:
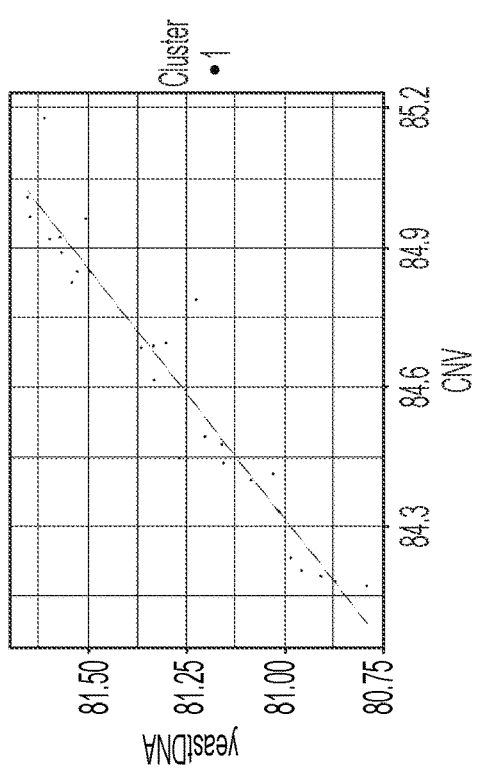
FIG. 10A is a scatter plot illustrating average Tm values for CMV vs average Tm values of a yeast control after applying a clustering algorithm, from LoD data.
Figure 10C:
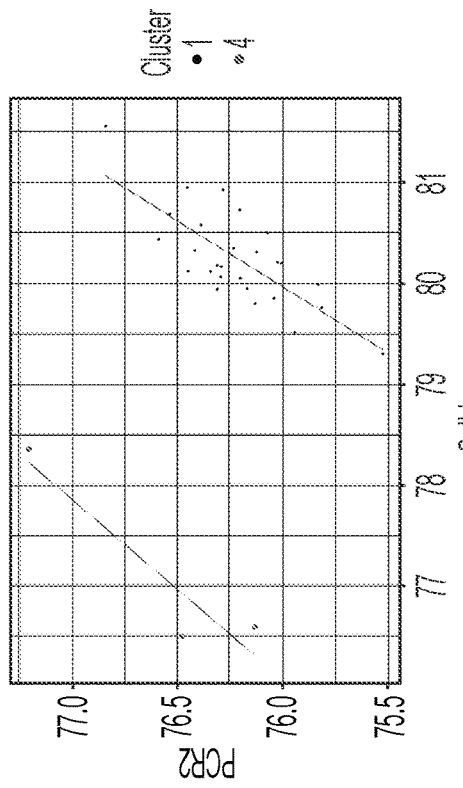
FIG. 10C is a scatter plot illustrating average Tm values for Calbicans vs average Tm values for a PCR2 control after applying a clustering algorithm, from LoD data.

Similar to the method discussed above with respect to FIGS. 8A, 8B, and 8C, a linear model was fitted to each group in the LoD data, and the slopes of the group-level linear regression models were averaged to obtain an analyte assay level metric, as shown in FIGS. 10A, 10B, and 10C. For example, FIG. 10A is a scatter plot illustrating average Tm values for Cytomegalovirus ("CMV") vs average Tm values of a yeast control after applying the clustering algorithm, while FIG. 10B is a scatter plot illustrating average Tm values for Human Rhinovirus/Enterovirus ("HRV-EV") vs average Tm values of a PCR2 control after applying the clustering algorithm, and FIG. 10C is a scatter plot illustrating average Tm values for *Candida albicans* ("Calbicans") vs average Tm values for a PCR2 control after applying the clustering algorithm.

In summary, for the QC data, before clustering, the PCR2 inner quartile range (IQR) was 0.412, and the yeast IQR was 0.411. For the QC data, after clustering, the PCR2 IQR=0.162, and the yeast IQR was 0.166. For the LoD data, before clustering, the PCR2 IQR was 0.526, and the yeast IQR was 0.472. For the LoD data, after clustering, the PCR2 IQR was 0.208, and the yeast IQR was 0.208. Thus, clustering reduced the IQR in both sets of data. After clustering, the resulting groups display mostly moderate to strong correlations. This pattern is demonstrated in both QC and LoD data. Therefore, with moderate to strong correlations, the data can be effectively normalized.

Example 2

Figure 11:
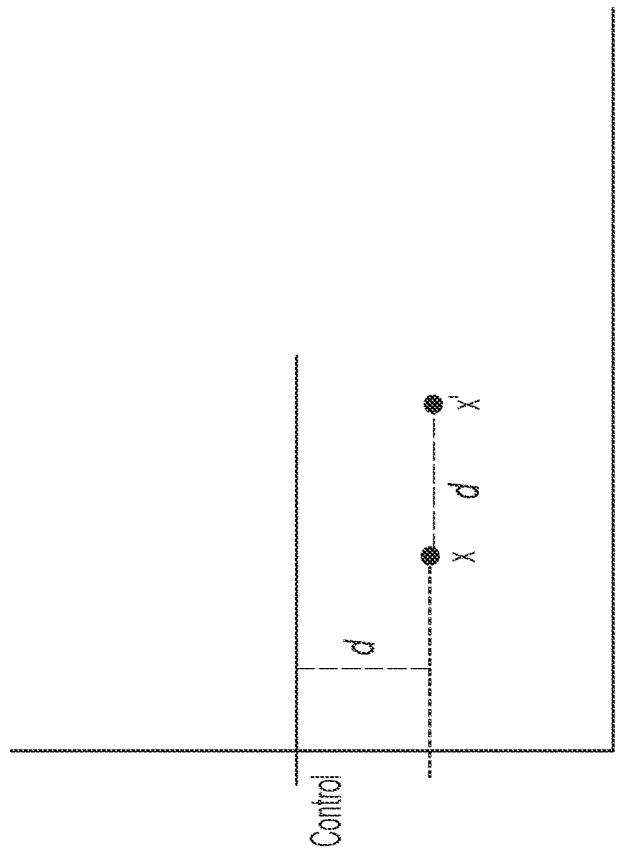
FIG. 11 shows an example graph illustrating normalization not dependent upon a linear model.

To normalize an analyte assay Tm value based on a mean control Tm value (independent of a linear model), the expected analyte assay Tm value based on previous data is shifted by the deviation from the mean control Tm value. FIG. 11 shows an example graph illustrating normalization independent of a linear model, where "d", the difference between the Tm value for the control and the mean Tm value for the control, is added to the Tm value for the analyte assay based on previous data to normalize the analyte assay Tm. For example, if the Tm for *Bordetella pertussis* ("Bper") is 84.62, the Tm for PCR2 is 75.87, and the mean Tm for PCR2 is 76.0, the normalized Tm for Bper can be calculated using following formula:

Normalized Bper Tm=Bper Tm+(mean PCR2 Tm−PCR2 Tm)

Normalized Bper Tm=84.62+(76.0−75.87)=84.75

It is understood that this method may be applied to other assays.

Example 3

To normalize an analyte assay Tm value based on a mean control Tm value (dependent upon a linear model), the analyte assay Tm value is normalized around a central analyte assay Tm value. The central analyte assay Tm value is determined using the mean control Tm value and the predicted central analyte assay Tm value from the linear model. The central analyte assay Tm value is shifted by the deviation from the analyte assay Tm value to the predicted analyte assay Tm value, based on the regression line. This method requires sufficient prior data to fit a linear model.

Figure 12:
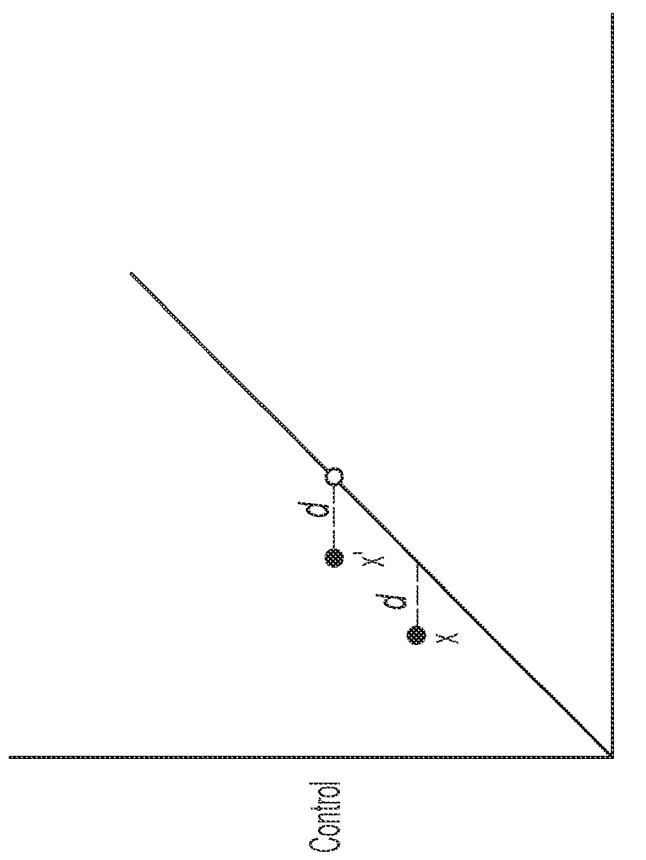
FIG. 12 shows an example graph illustrating normalization dependent upon a linear model.

FIG. 12 shows an example graph illustrating normalization dependent upon a linear model. For example, if the expected Tm for Bper based on previous data is 84.62, the Tm for PCR2 is 75.87, the mean Tm for PCR2 is 76.0, the central Tm for Bper is 87.6, and the predicted Tm for Bper based on the regression line is 87.44, the normalized Tm for Bper can be calculated using following formula:

Normalized Bper Tm=(Bper Tm−Predicted Bper Tm)+Central Bper Tm

Normalized Bper Tm=(84.62−87.44)+87.6

Normalized Bper Tm value=84.78

Example 4

The normalization methods discussed above with respect to Example 2 and Example 3 were tested using data pulled from 3 datasets: QC data (pouch QC runs), LoD data (runs from the Limit of Detection studies), and Trend data (Trend data is a compilation of data from deidentified patient runs that includes Tm, Cp, and other data not available to most customers). The tests were focused on 20 assays selected from various panels, representing range of correlations: GI: *Cryptosporidium* target 2 ("Crypt2"), *Vibrio cholerae* ("Vchol"), *Entamoeba histolytica* ("Ehist"), *Aeromonas* ("Aerom") (it is noted that this target is not included in the current commercial product, but data for *Aeromonas* is in the Trend database), *Campylobacter* target 1 ("Campy1"); BCID: *Candida krusei* ("Ckrusei"), *Candida parapsilosis* ("Cparapsilosis"), *Proteus* ("Proteus"), *Escherichia coli* ("Ecoli"), one of the *Enterococcus* assays ("*Enterococcus*"); ME: Herpes simplex virus 1 ("HSV1"), Human herpesvirus 6 ("HHV6"), *Cryptococcus neoformans/gattii* ("*Cryptococcus*"), *Haemophilus influenzae* 1 ("Hinfluenzae1"), *Haemophilus influenzae* 2 ("Hinfluenzae2"); and RP2: Middle East Respiratory Syndrome target 2 ("MERS2"), Respiratory Syncytial Virus ("RSV"), Adenovirus target 6 ("Adeno6"), Influenza A/H3 ("FluA-H3"), Influenza A target 2 ("FluApan2"). The standard deviations of the distributions of analyte assay Tms were calculated before and after normalization by control Tms, and the percent decrease in standard deviation before and after normalization by control Tms was calculated as well, with larger percent decreases indicating greater reduction in the standard deviation.

A regrouping algorithm was applied to Tm1 and Tm2 values for analyte assays with multiple Tm values (same method used for Tm range studies). The average Tm1 value (of the wells) was used for each assay within each pouch. The runs with average yeast control and PCR2 control Tm values out of the melt ranges were excluded. The Tm1 values were normalized by PCR2 and yeast control.

From the QC data, there were 83,535 RP runs, 27,828 GI runs, 14,138 BCID runs, 10,498 ME runs, and 14,841 RP2 & RP2plus runs.

Figure 13A:
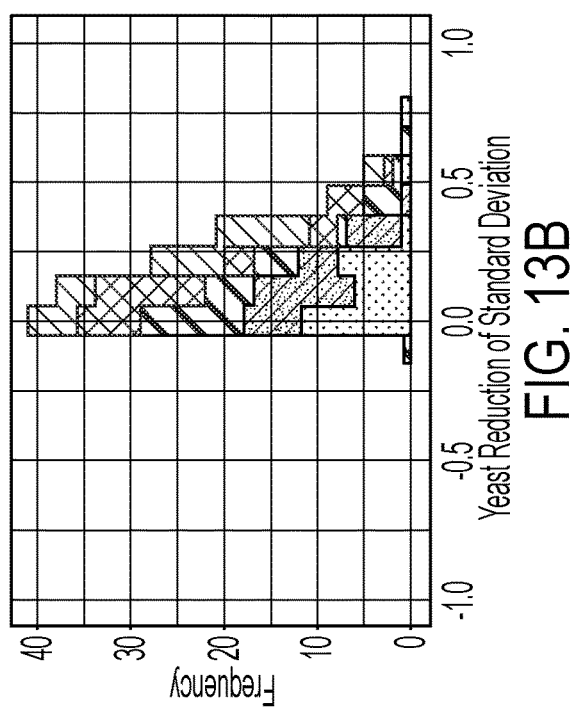
FIG. 13A is a histogram illustrating the percent decrease in standard deviation for each analyte assay after a normalization not dependent on a linear model by a PCR2 control, from QC data.
Figure 13B:
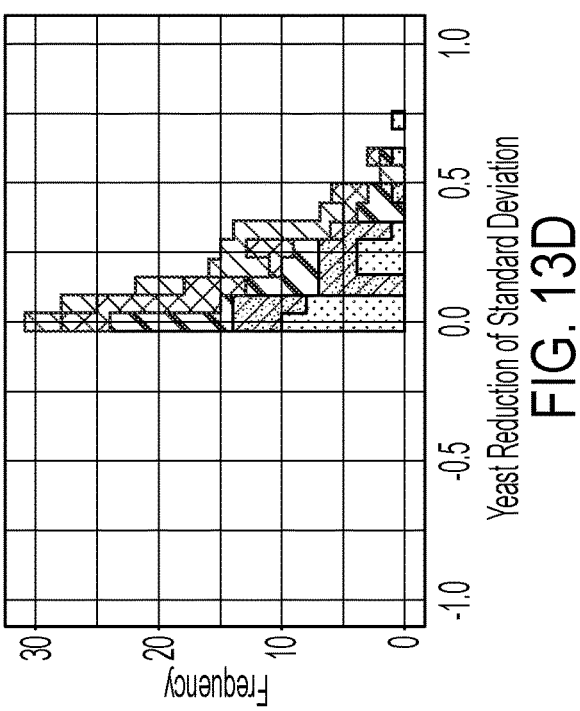
FIG. 13B is a histogram illustrating the percent decrease in standard deviation for each analyte assay after a normalization not dependent on a linear model by a yeast control, from QC data.
Figure 13C:
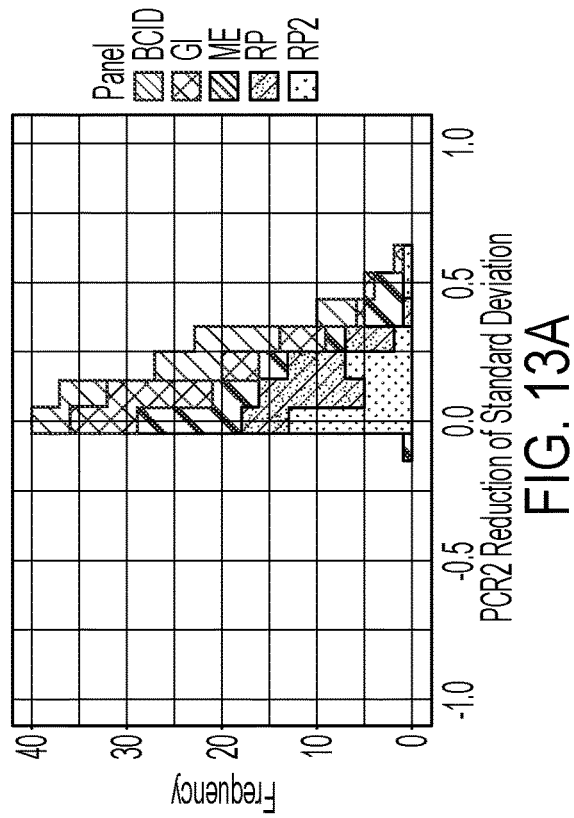
FIG. 13C is a histogram illustrating the percent decrease in standard deviation for each analyte assay after a normalization dependent on a linear model by a PCR2 control, from QC data.
Figure 13D:
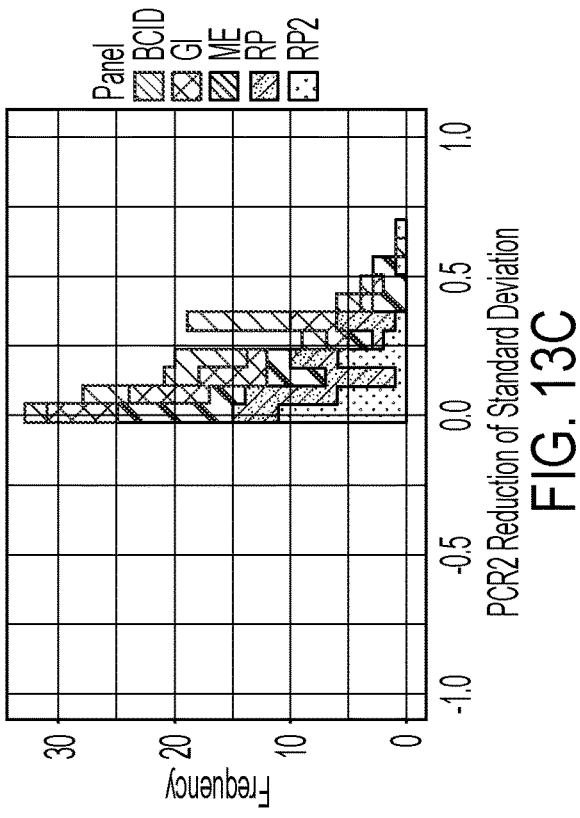
FIG. 13D is a histogram illustrating the percent decrease in standard deviation for each analyte assay after a normalization dependent on a linear model by a yeast control, from QC data.

FIGS. 13A-13D are histograms illustrating the percent decrease in standard deviation for each of the analyte assays from the QC data after normalization. FIG. 13A is a histogram illustrating the percent decrease in standard deviation for each analyte assay after a normalization not dependent on a linear model (e.g., as explained at Example 2) by a PCR2 control. FIG. 13B is a histogram illustrating the percent decrease in standard deviation for each analyte assay after a normalization not dependent on a linear model (e.g., as explained at Example 2) by a yeast control. FIG. 13C is a histogram illustrating the percent decrease in standard deviation for each analyte assay after a normalization dependent on a linear model (e.g., as explained at Example 3) by a PCR2 control. FIG. 13D is a histogram illustrating the percent decrease in standard deviation for each analyte assay after a normalization dependent on a linear model (e.g., as explained at Example 3) by a yeast control.

Figure 14A:
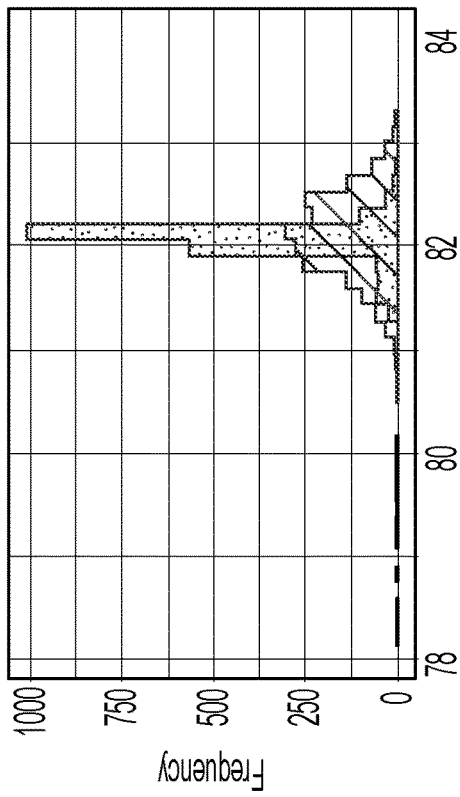
FIG. 14A shows a histogram of non-normalized Tm values for Ehist overlaid with a histogram of Tm values for Ehist normalized (not dependent on a linear model) by yeast control, from QC data.
Figure 14B:
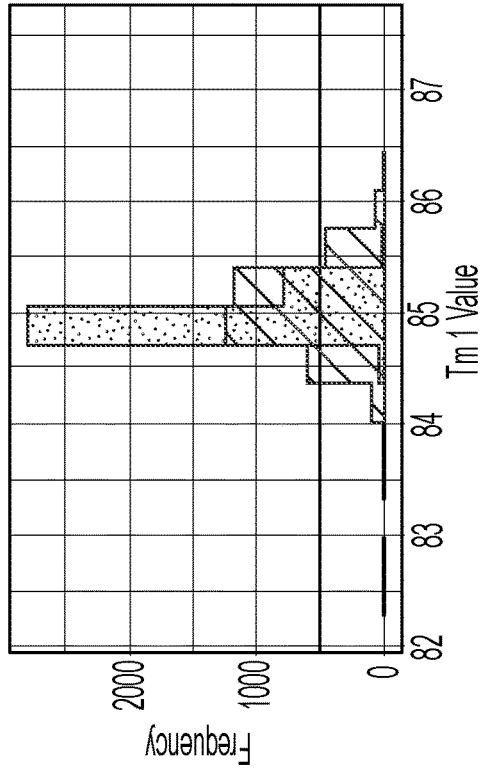
FIG. 14B shows a histogram of non-normalized Tm values for Hinfluenzae2 overlaid with a histogram of Tm values for Hinfluenzae2 normalized (not dependent on a linear model) by yeast control, from QC data.
Figure 14C:
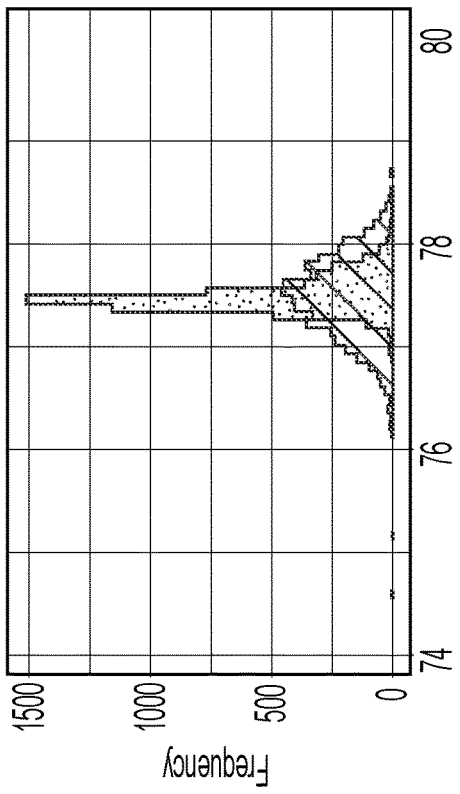
FIG. 14C shows a histogram of non-normalized Tm values for Cparapsilosis overlaid with a histogram of Tm values for Cparapsilosis normalized (not dependent on a linear model) by yeast control, from QC data.
Figure 14D:
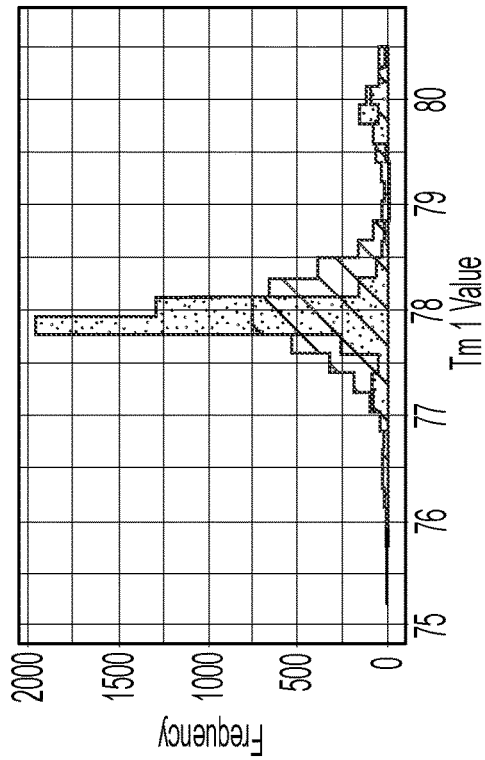
FIG. 14D shows a histogram of non-normalized Tm values for Ckrusei overlaid with a histogram of Tm values for Ckrusei normalized (not dependent on a linear model) by yeast control, from QC data.

FIGS. 14A-14D illustrate histograms of non-normalized Tm values overlaid with histograms of normalized Tm values (using a normalization not dependent upon a linear model, as explained at Example 2) for several different analyte assays from the QC data. FIG. 14A illustrates a histogram of non-normalized Tm values (shown with stripes) for Ehist overlaid with a histogram of Tm values (shown with dots) for Ehist normalized by a yeast control. FIG. 14B illustrates a histogram of non-normalized Tm values (shown hatched) for Hinfluenzae2 overlaid with a histogram of Tm values (shown with dots) for Hinfluenzae2 normalized by a yeast control. FIG. 14C illustrates a histogram of non-normalized Tm values (shown with stripes) for Cparapsilosis overlaid with a histogram of Tm values (shown with dots) for Cparapsilosis normalized by a yeast control. FIG. 14D illustrates a histogram of non-normalized Tm values (shown with stripes) for Ckrusei overlaid with a histogram of Tm values (shown with dots) for Ckrusei normalized by a yeast control.

Figure 15A:
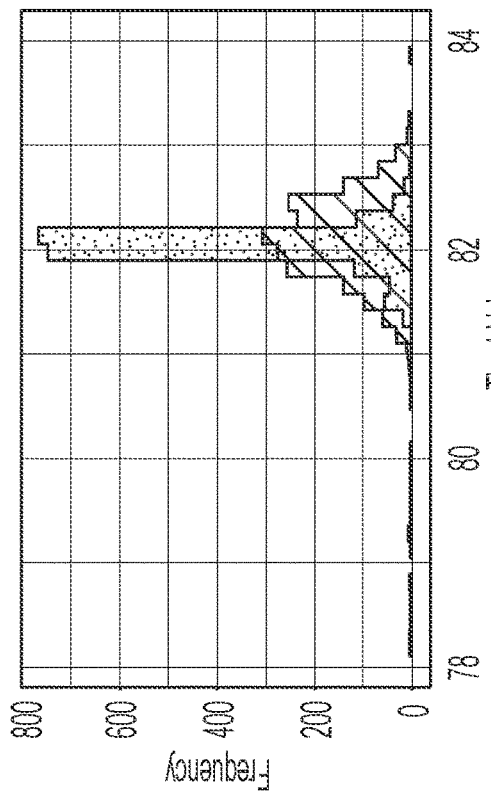
FIG. 15A shows a histogram of non-normalized Tm values for Ehist overlaid with a histogram of Tm values for Ehist normalized (dependent on a linear model) by yeast control, from QC data.
Figure 15B:
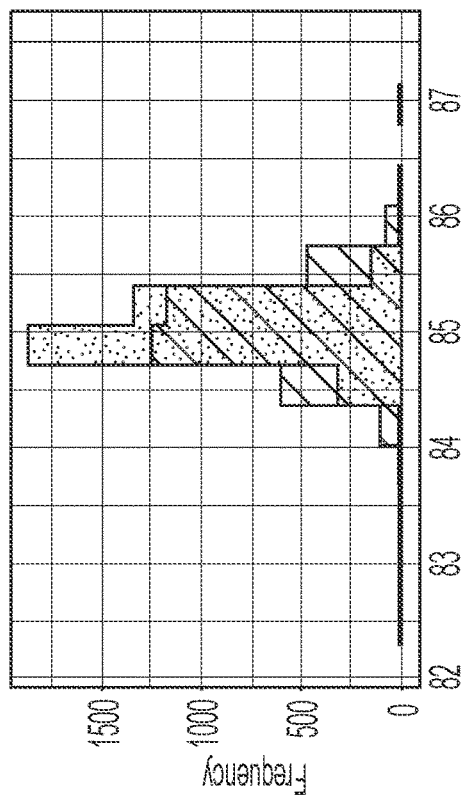
FIG. 15B shows a histogram of non-normalized Tm values for Hinfluenzae2 overlaid with a histogram of Tm values for Hinfluenzae2 normalized (dependent on a linear model) by yeast control, from QC data.
Figure 15C:
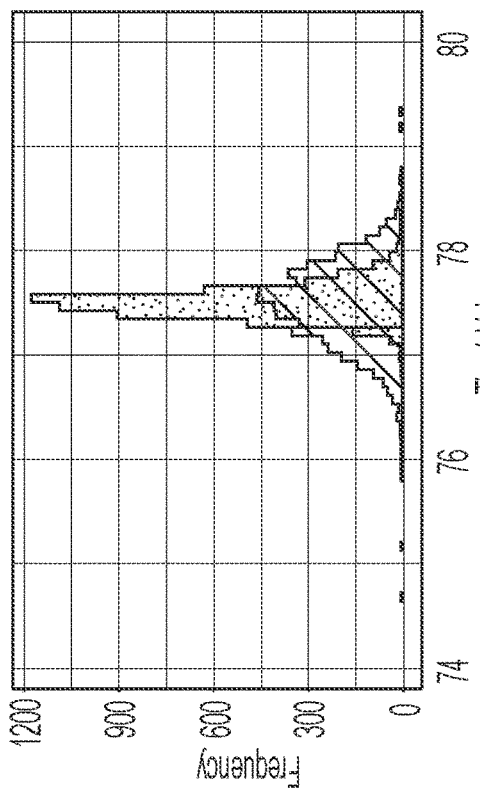
FIG. 15C shows a histogram of non-normalized Tm values for Cparapsilosis overlaid with a histogram of Tm values for Cparapsilosis normalized (dependent on a linear model) by yeast control, from QC data.
Figure 15D:
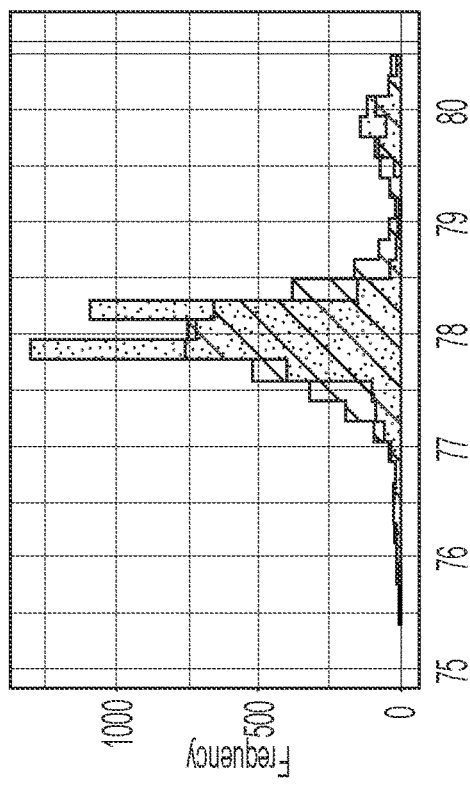
FIG. 15D shows a histogram of non-normalized Tm values for Ckrusei overlaid with a histogram of Tm values for Ckrusei normalized (dependent on a linear model) by yeast control, from QC data.

FIGS. 15A-15D illustrate histograms of non-normalized Tm values overlaid with histograms of normalized Tm values (using a normalization dependent upon a linear model, as explained at Example 3) for several different analyte assays from the QC data. FIG. 15A illustrates a histogram of non-normalized Tm values (shown with stripes) for Ehist overlaid with a histogram of Tm values (shown with dots) for Ehist normalized by a yeast control. FIG. 15B illustrates a histogram of non-normalized Tm values (shown with stripes) for Hinfluenzae2 overlaid with a histogram of Tm values (shown with dots) for Hinfluenzae2 normalized by a yeast control. FIG. 15C illustrates a histogram of non-normalized Tm values (shown in red) for Cparapsilosis overlaid with a histogram of Tm values (shown with dots) for Cparapsilosis normalized by a yeast control. FIG. 15D illustrates a histogram of non-normalized Tm values (shown with stripes) for Ckrusei overlaid with a histogram of Tm values (shown with dots) for Ckrusei normalized by a yeast control.

From the LoD data, there were 790 GI runs, 843 BCID runs, 329 ME runs, and 692 RP2 runs.

Figure 16A:
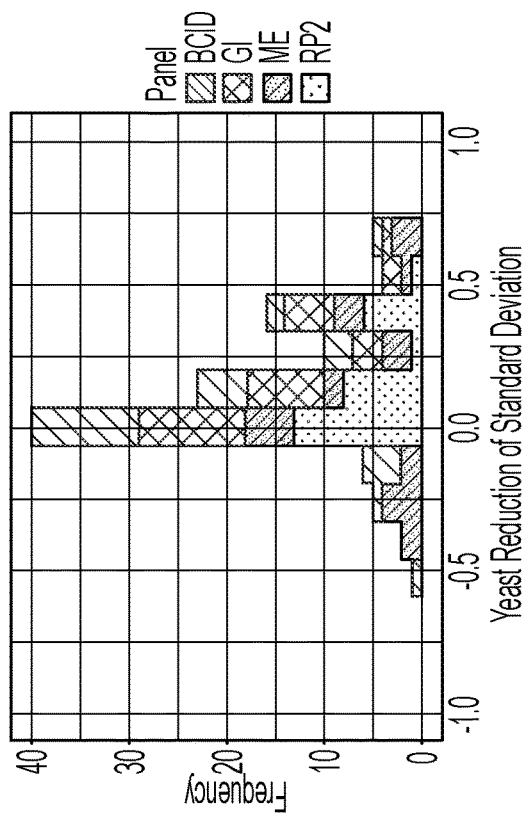
FIG. 16A is a histogram illustrating the percent decrease in standard deviation for each analyte assay after a normalization (not dependent on a linear model) by a PCR2 control, from LoD data.
Figure 16B:
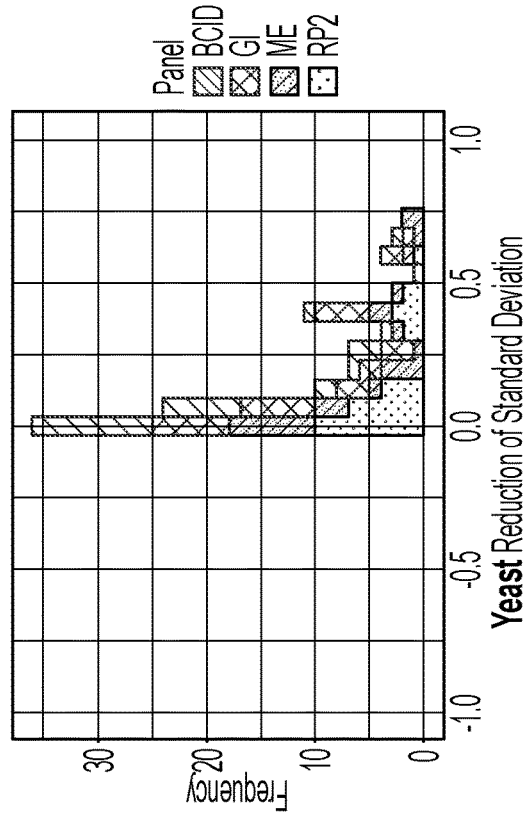
FIG. 16B is a histogram illustrating the percent decrease in standard deviation for each analyte assay after a normalization (not dependent on a linear model) by a yeast control, from LoD data.
Figure 16C:
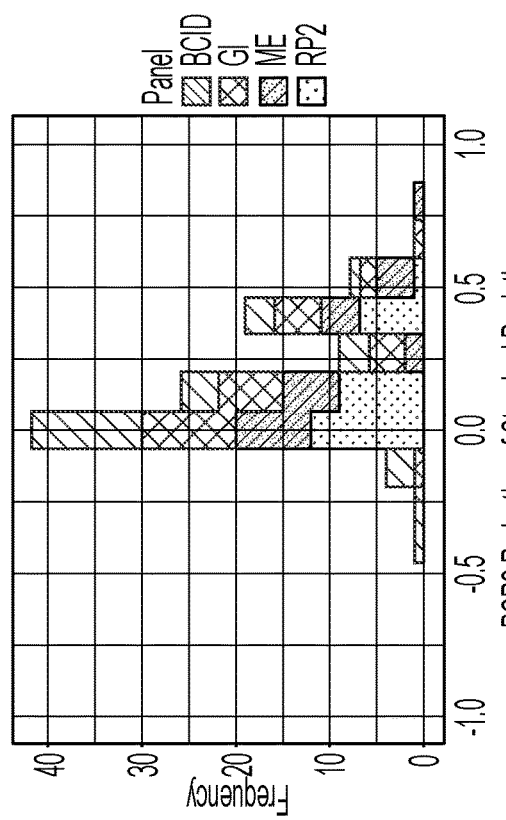
FIG. 16C is a histogram illustrating the percent decrease in standard deviation for each analyte assay after a normalization (dependent on a linear model) by a PCR2 control, from LoD data.
Figure 16D:
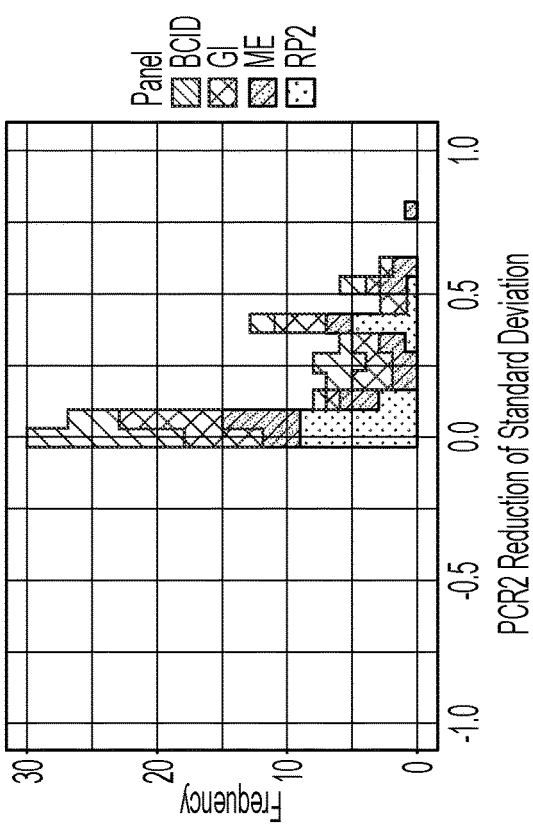
FIG. 16D is a histogram illustrating the percent decrease in standard deviation for each analyte assay after a normalization (dependent on a linear model) by a yeast control, from LoD data.

FIGS. 16A-16D are histograms illustrating the percent decrease in standard deviation for each of the analyte assays from the LoD data after normalization. FIG. 16A is a histogram illustrating the percent decrease in standard deviation for each analyte assay after a normalization not dependent on a linear model (e.g., as explained at Example 2) by a PCR2 control. FIG. 16B is a histogram illustrating the percent decrease in standard deviation for each analyte assay after a normalization not dependent on a linear model (e.g., as explained at Example 2) by a yeast control. FIG. 16C is a histogram illustrating the percent decrease in standard deviation for each analyte assay after a normalization dependent on a linear model (e.g., as explained at Example 3) by a PCR2 control. FIG. 16D is a histogram illustrating the percent decrease in standard deviation for each analyte assay after a normalization dependent on a linear model (e.g., as explained at Example 3) by a yeast control.

Figure 17A:
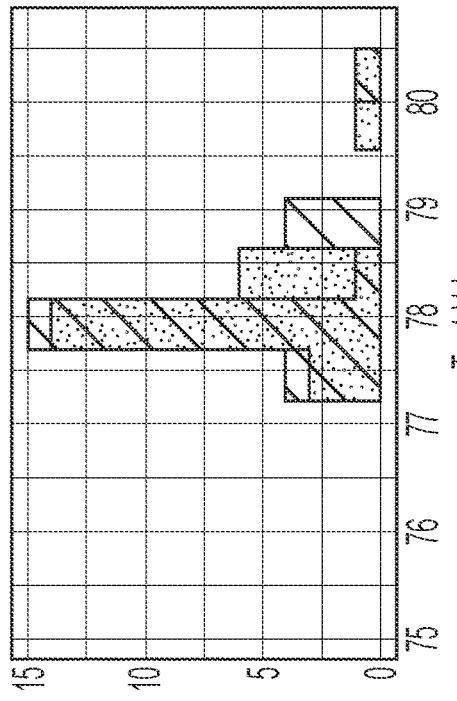
FIG. 17A shows a histogram of non-normalized Tm values for Ehist overlaid with a histogram of Tm values for Ehist normalized (not dependent on a linear model) by yeast control, from LoD data.
Figure 17B:
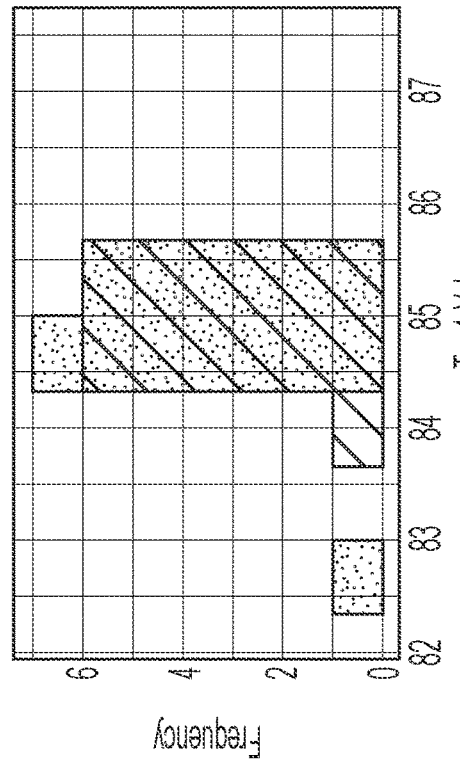
FIG. 17B illustrates a histogram of non-normalized Tm values for Hinfluenzae2 overlaid with a histogram of Tm values for Hinfluenzae2 normalized (not dependent on a linear model) by a yeast control, from LoD data.
Figure 17C:
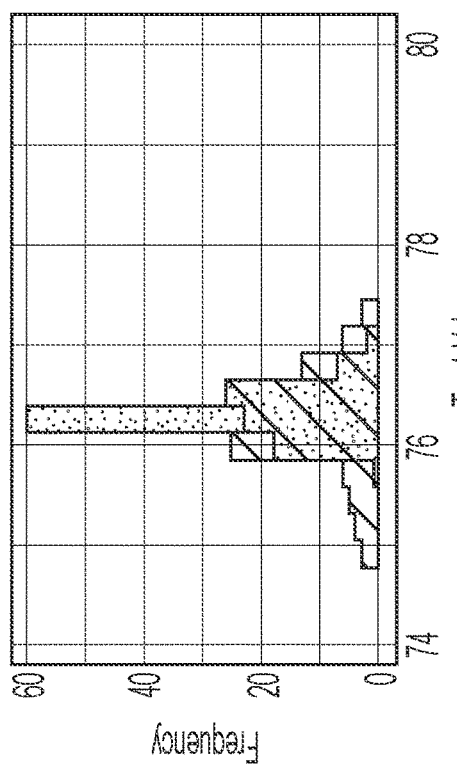
FIG. 17C illustrates a histogram of non-normalized Tm values for Cparapsilosis overlaid with a histogram of Tm values for Cparapsilosis normalized (not dependent on a linear model) by a yeast control, from LoD data.
Figure 17D:
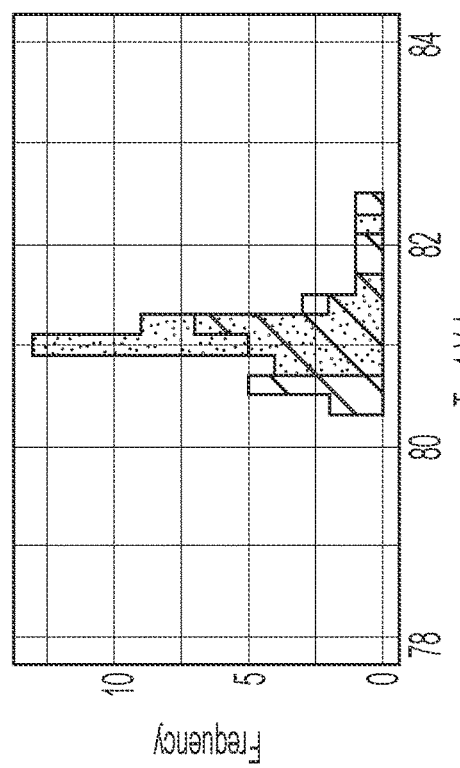
FIG. 17D illustrates a histogram of non-normalized Tm values for Ckrusei overlaid with a histogram of Tm values for Ckrusei normalized (not dependent on a linear model) by a yeast control, from LoD data.

FIGS. 17A-17D illustrate histograms of non-normalized Tm values overlaid with histograms of normalized Tm values (using a normalization not dependent upon a linear model, as explained at Example 2) for several different analyte assays from the LoD data. FIG. 17A illustrates a histogram of non-normalized Tm values (shown with stripes) for Ehist overlaid with a histogram of Tm values (shown with dots) for Ehist normalized by a yeast control. FIG. 17B illustrates a histogram of non-normalized Tm values (shown with stripes) for Hinfluenzae2 overlaid with a histogram of Tm values (shown with dots) for Hinfluenzae2 normalized by a yeast control. FIG. 17C illustrates a histogram of non-normalized Tm values (shown with stripes) for Cparapsilosis overlaid with a histogram of Tm values (shown with dots) for Cparapsilosis normalized by a yeast control. FIG. 17D illustrates a histogram of non-normalized Tm values (shown with stripes) for Ckrusei overlaid with a histogram of Tm values (shown with dots) for Ckrusei normalized by a yeast control.

FIGS. 18A-18D illustrate histograms of non-normalized Tm values overlaid with histograms of normalized Tm values (using a normalization dependent upon a linear model, as explained at Example 3) for several different analyte assays from the LoD data. FIG. 18A illustrates a histogram of non-normalized Tm values (shown with stripes) for Ehist overlaid with a histogram of Tm values (shown with dots) for Ehist normalized by a yeast control.

FIG. 18B illustrates a histogram of non-normalized Tm values (shown with stripes) Hinfluenzae2 overlaid with a histogram of Tm values (shown with dots) for Hinfluenzae2 normalized by a yeast control. FIG. 18C illustrates a histogram of non-normalized Tm values (shown with stripes) for Cparapsilosis overlaid with a histogram of Tm values (shown with dots) for Cparapsilosis normalized by a yeast control. FIG. 18D illustrates a histogram of non-normalized Tm values (shown with stripes) for Ckrusei overlaid with a histogram of normalized Tm values (shown with dots) for Ckrusei normalized by a yeast control.

From the Trend data, there were 46,398 GI runs, 34,245 BCID runs, 5,279 ME runs, and 14,400 RP2 & RP2plus runs.

Figure 19A:
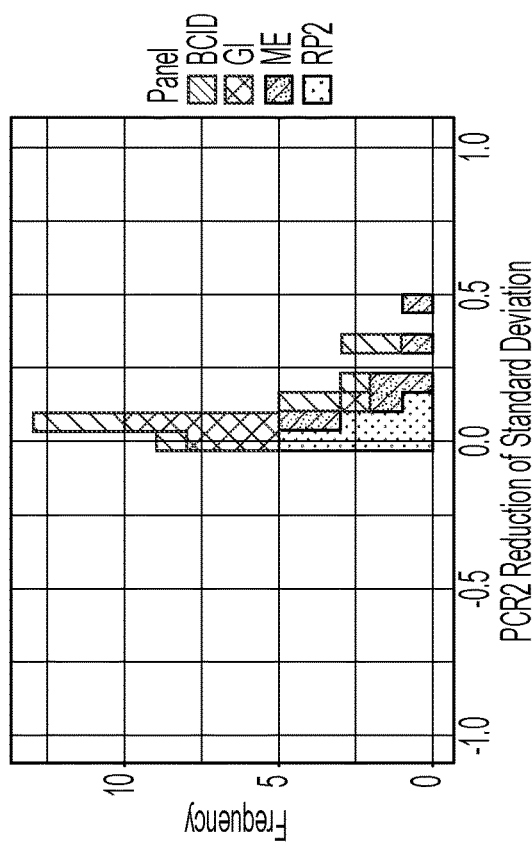
FIG. 19A is a histogram illustrating the percent decrease in standard deviation for each analyte assay after a normalization (not dependent on a linear model) by a PCR2 control, from Trend data.
Figure 19B:
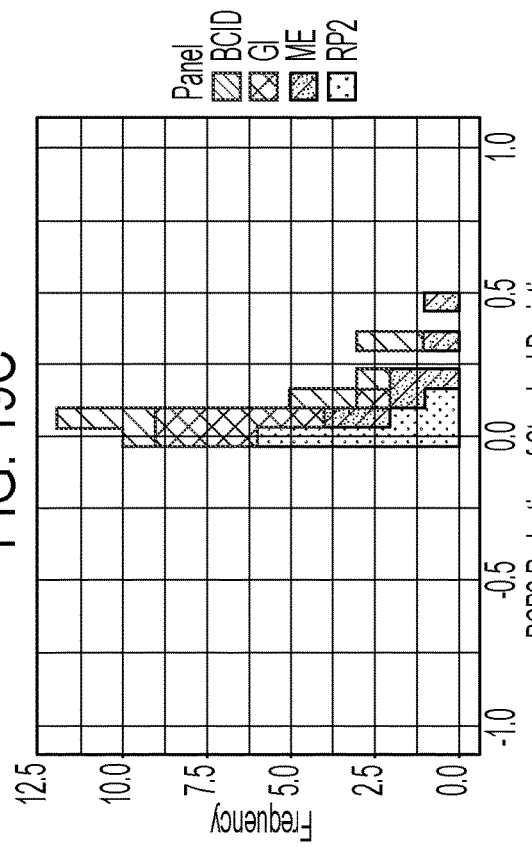
FIG. 19B is a histogram illustrating the percent decrease in standard deviation for each analyte assay after a normalization (not dependent on a linear model) by a yeast control, from Trend data.
Figure 19C:
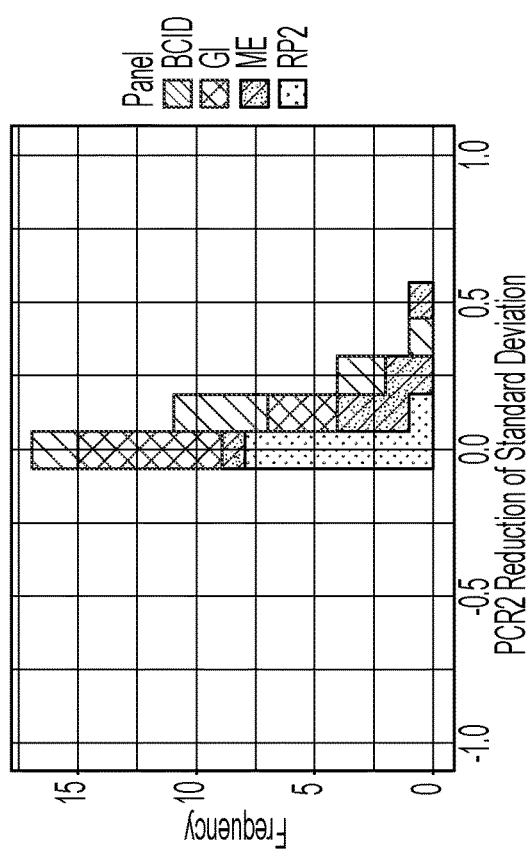
FIG. 19C is a histogram illustrating the percent decrease in standard deviation for each analyte assay after a normalization (dependent on a linear model) by a PCR2 control, from Trend data.
Figure 19D:
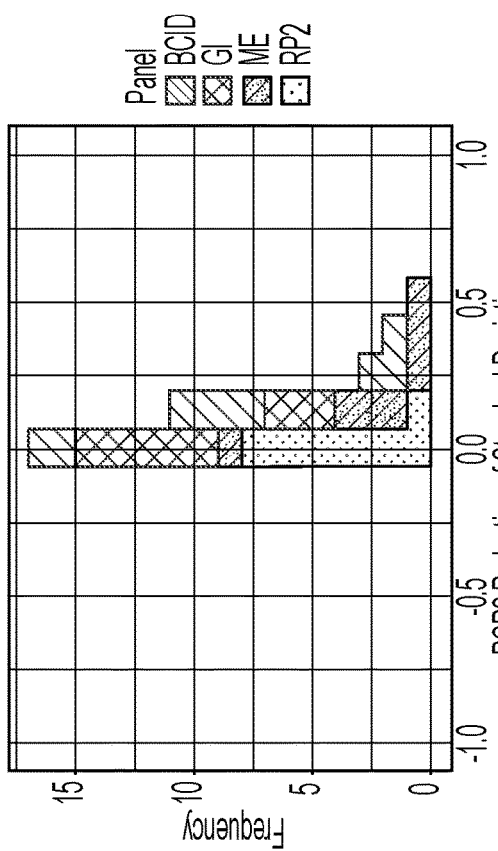
FIG. 19D is a histogram illustrating the percent decrease in standard deviation for each analyte assay after a normalization (dependent on a linear model) by a yeast control, from Trend data.

FIGS. 19A-19D are histograms illustrating the percent decrease in standard deviation for each of the analyte assays from the Trend data after normalization. FIG. 19A is a histogram illustrating the percent decrease in standard deviation for each analyte assay after a normalization not dependent on a linear model (e.g., as explained at Example 2) by a PCR2 control. FIG. 19B is a histogram illustrating the percent decrease in standard deviation for each analyte assay after a normalization not dependent on a linear model (e.g., as explained at Example 2) by a yeast control. FIG. 19C is a histogram illustrating the percent decrease in standard deviation for each analyte assay after a normalization dependent on a linear model (e.g., as explained at Example 3) by a PCR2 control. FIG. 19D is a histogram illustrating the percent decrease in standard deviation for each analyte assay after a normalization dependent on a linear model (e.g., as explained at Example 3) by a yeast control.

Figure 20A:
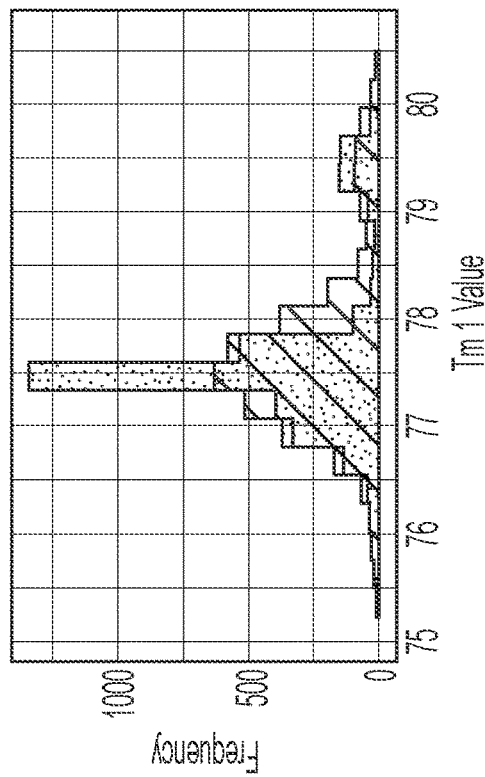
FIG. 20A illustrates a histogram of non-normalized Tm values for Ehist overlaid with a histogram of Tm values for Ehist normalized (not dependent upon a linear model) by a yeast control, from Trend data.
Figure 20C:
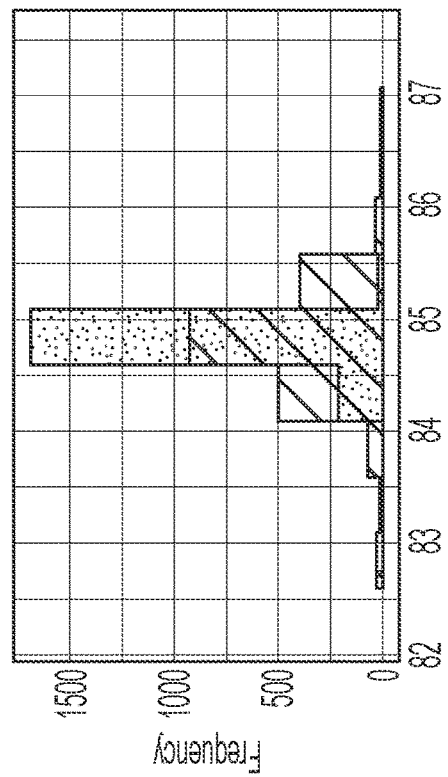
FIG. 20C illustrates a histogram of non-normalized Tm values for Cparapsilosis overlaid with a histogram of Tm values for Cparapsilosis normalized (not dependent upon a linear model) by a yeast control, from Trend data.
Figure 20B:
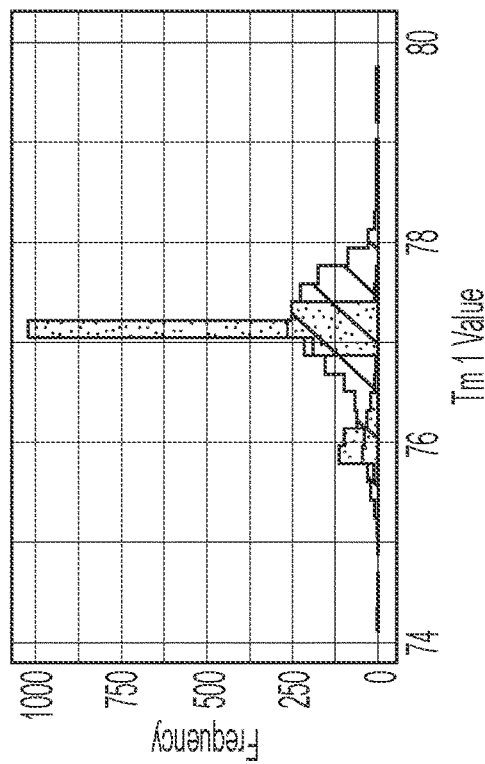
FIG. 20B illustrates a histogram of non-normalized Tm values for Hinfluenzae2 overlaid with a histogram of Tm values for Hinfluenzae2 normalized (not dependent upon a linear model) by a yeast control, from Trend data.
Figure 20D:
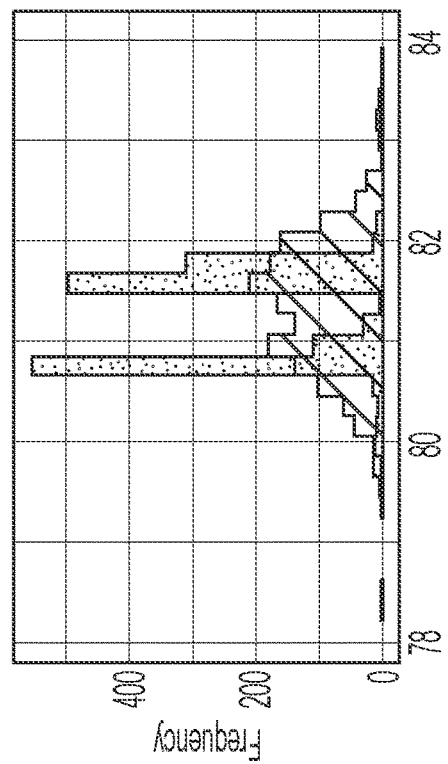
FIG. 20D illustrates a histogram of non-normalized Tm values for Ckrusei overlaid with a histogram of Tm values for Ckrusei normalized (not dependent upon a linear model) by a yeast control, from Trend data.

FIGS. 20A-20D illustrate histograms of non-normalized Tm values overlaid with histograms of normalized Tm values (using a normalization not dependent upon a linear model, as explained at Example 2) for several different analyte assays from the Trend data. FIG. 20A illustrates a histogram of non-normalized Tm values (shown with stripes) for Ehist overlaid with a histogram of Tm values (shown with dots) for Ehist normalized by a yeast control. FIG. 20B illustrates a histogram of non-normalized Tm values (shown with stripes) for Hinfluenzae2 overlaid with a histogram of Tm values (shown with dots) for Hinfluenzae2 normalized by a yeast control. FIG. 20C illustrates a histogram of non-normalized Tm values (shown with stripes) for Cparapsilosis overlaid with a histogram of Tm values (shown with dots) for Cparapsilosis normalized by a yeast control. FIG. 20D illustrates a histogram of non-normalized Tm values (shown with stripes) for Ckrusei overlaid with a histogram of Tm values (shown with dots) for Ckrusei normalized by a yeast control.

Figure 21A:
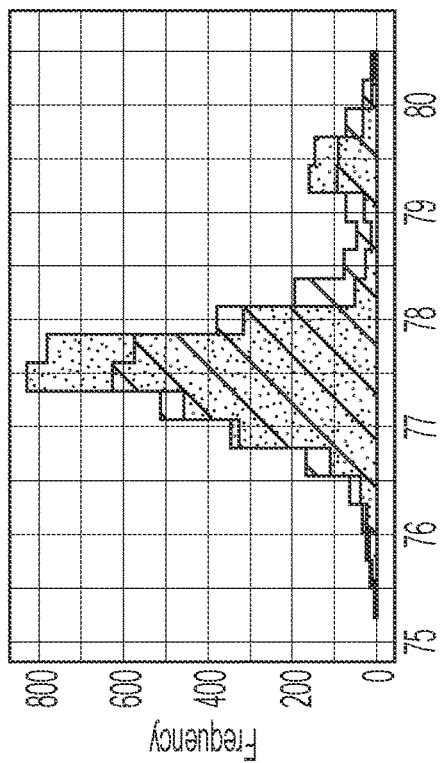
FIG. 21A illustrates a histogram of non-normalized Tm values for Ehist overlaid with a histogram of Tm values for Ehist normalized (dependent upon a linear model) by a yeast control, from Trend data.
Figure 21B:
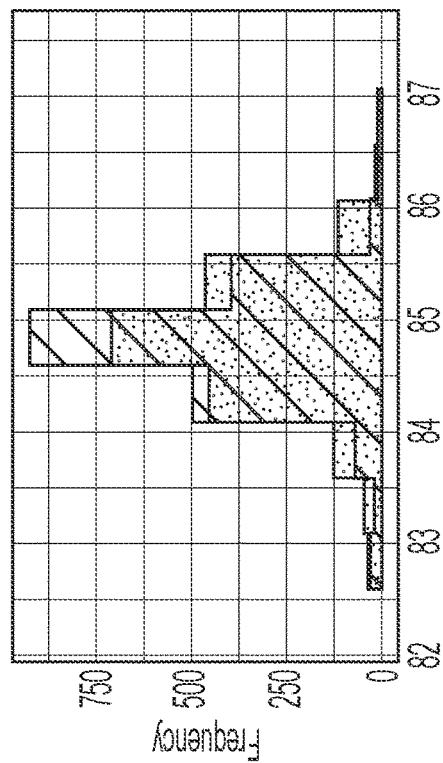
FIG. 21B illustrates a histogram of non-normalized Tm values for Hinfluenzae2 overlaid with a histogram of Tm values for Hinfluenzae2 normalized (dependent upon a linear model) by a yeast control, from Trend data.
Figure 21C:
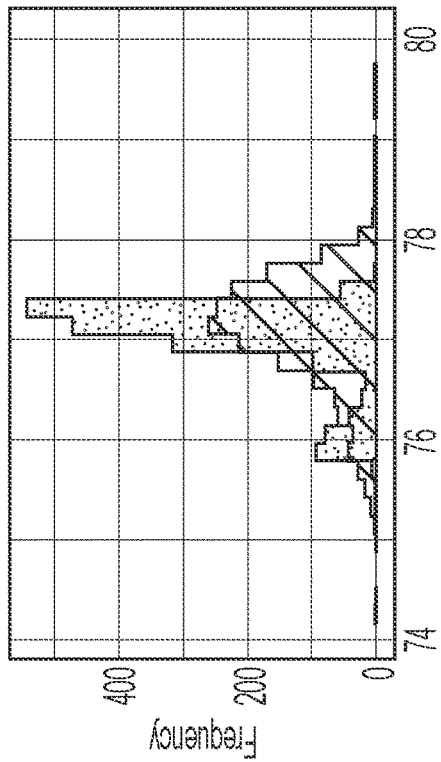
FIG. 21C illustrates a histogram of non-normalized Tm values for Cparapsilosis overlaid with a histogram of Tm values for Cparapsilosis normalized (dependent upon a linear model) by a yeast control, from Trend data.
Figure 21D:
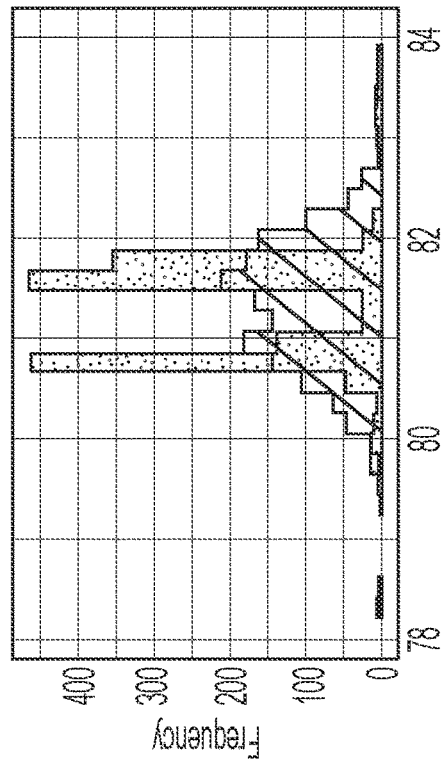
FIG. 21D illustrates a histogram of non-normalized Tm values for Ckrusei overlaid with a histogram of Tm values for Ckrusei normalized (dependent upon a linear model) by a yeast control, from Trend data.

FIGS. 21A-21D illustrate histograms of non-normalized Tm values overlaid with histograms of normalized Tm values (using a normalization dependent upon a linear model, as explained at Example 3) for several different analyte assays from the Trend data. FIG. 21A illustrates a histogram of non-normalized Tm values (shown with stripes) for Ehist overlaid with a histogram of Tm values (shown with dots) for Ehist normalized by a yeast control. FIG. 21B illustrates a histogram of non-normalized Tm values (shown with stripes) for Hinfluenzae2 overlaid with a histogram of Tm values (shown with dots) for Hinfluenzae2 normalized by a yeast control. FIG. 21C illustrates a histogram of non-normalized Tm values (shown with stripes) for Cparapsilosis overlaid with a histogram of Tm values (shown with dots) for Cparapsilosis normalized by a yeast control. FIG. 21D illustrates a histogram of non-normalized Tm values (shown with stripes) for Ckrusei overlaid with a histogram of Tm values (shown with dots) for Ckrusei normalized by a yeast control.

Thus, two methods of normalization can be applied: one independent of the linear model and one dependent on the linear model. When the linear model is used to normalize, all analyte assays show some reduction in the standard deviation of the distribution of Tm values. When the linear model is not used to normalize, most analyte assays still show some reduction in the standard deviation of the distribution of Tm values. In any case, reduction of the standard deviation may enable tighter Tm ranges, producing greater specificity and sensitivity. This normalization performs the best when reducing variability for a constant amplicon level, as seen in QC data. The normalization can reduce variability, to a lesser degree, from different concentrations of amplicon, as seen in the LoD data. The normalization can also reduce variability when dealing with multiple sources of irregularity, as seen in Trend data.

Example 5

Next, Tm values were clustered, normalized, and plotted to investigate whether these clusters would align with calculated sequence Tm value distributions. If so, it may be possible to assign probability of species based on a Tm value. This study focused on 20 assays selected from various panels: GI: *Aeromonas* ("Aerom") (it is noted that this target is not included in the current commercial product, but data for *Aeromonas* is in the Trend database), *Clostridium difficile* ("Cdiff"), ToxA and ToxB gene targets, Enteroaggregative *E. coli* ("EAEC"), Norovirus GI ("Noro1"), *Salmonella* ("Salm"); BCID: *Acinetobacter baumannii* ("Abaumannii"), *Escherichia coli* ("Ecoli"), *Haemophilus influenzae* target 1 ("Hinfluenzae1"), *Klebsiella pneumoniae* ("Kpneumoniae"), *Proteus* ("Proteus"), *Staphylococcus aureus* ("Saureus"); ME: *Escherichia coli* target 3 ("Ecoli3"), *Haemophilus influenzae* target 1 ("Hinfluenzae1"), Herpes simplex virus 1 ("HSV1"), Varicella zoster virus ("VZV1"); and RP2: Adenovirus target 2 ("Adeno2"), Coronavirus OC43 ("CoV-OC43"), Influenza B ("FluB"), Human Rhinovirus/Enterovirus ("HRV/EV"), Respiratory Syncytial Virus ("RSV"). Only deidentified patient runs from the Trend dataset were used in this study. There were 41,723 GI runs, 28,735 BCID runs, 3,391 ME runs, and 12,694 RP2 & RP2plus runs.

Specifically, a regrouping algorithm was applied to Tm1 and Tm2 values for analyte assays with multiple Tm values (same method used for Tm range studies). The average Tm1 value (of the wells) for each assay within each pouch was used. Runs with average yeast control and PCR2 control Tm values out of the melt ranges were excluded. The Tm1 values were clustered, and Tm1 values were normalized by PCR2 and yeast control within each cluster.

Figure 22A:
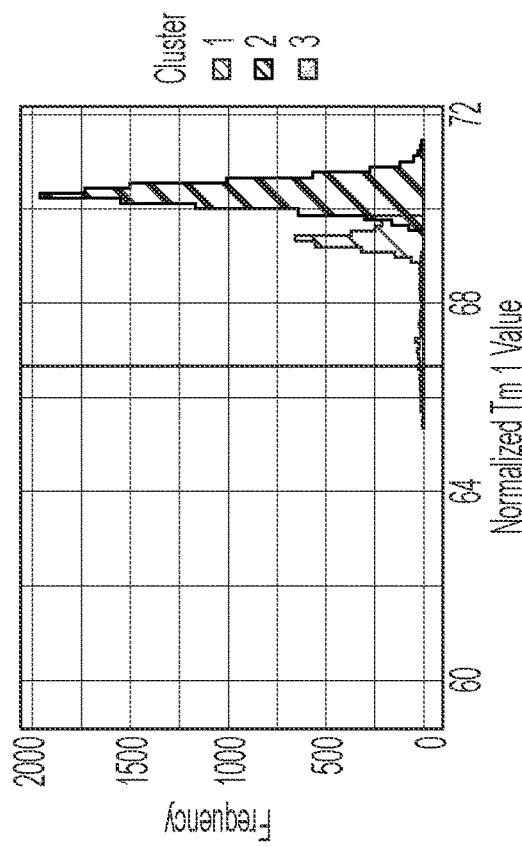
FIG. 22A illustrates clustered Tm values for Aerom.
Figure 22B:
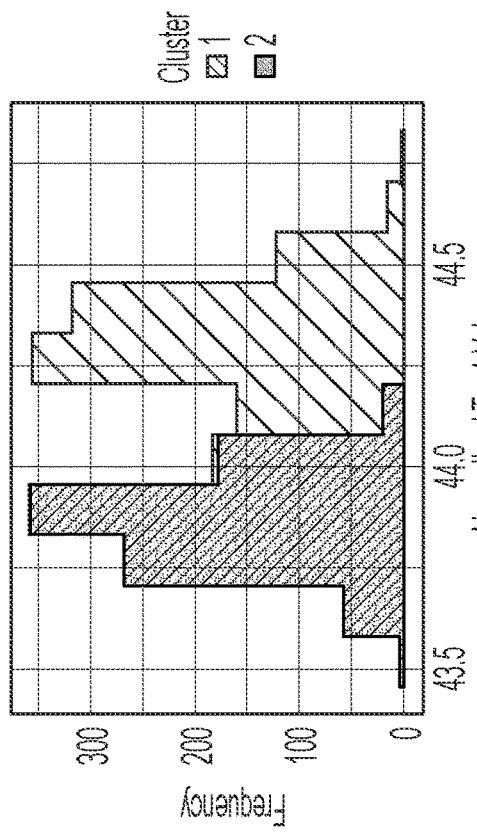
FIG. 22B shows a histogram of clustered Tm values for Aerom normalized by a PCR2 control.
Figure 22C:
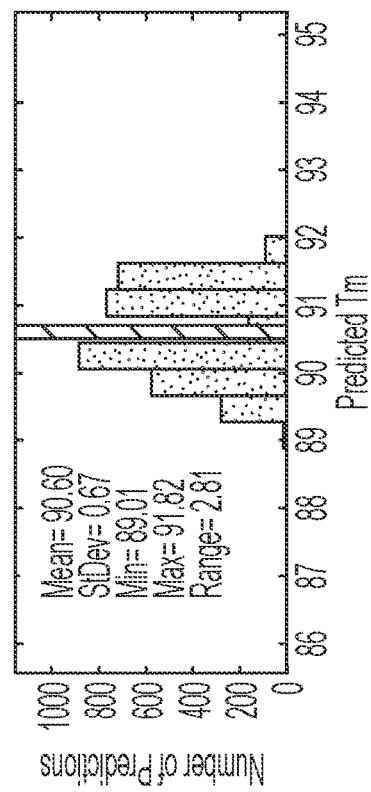
FIG. 22C illustrates clustered Tm values for VZV1.
Figure 22D:
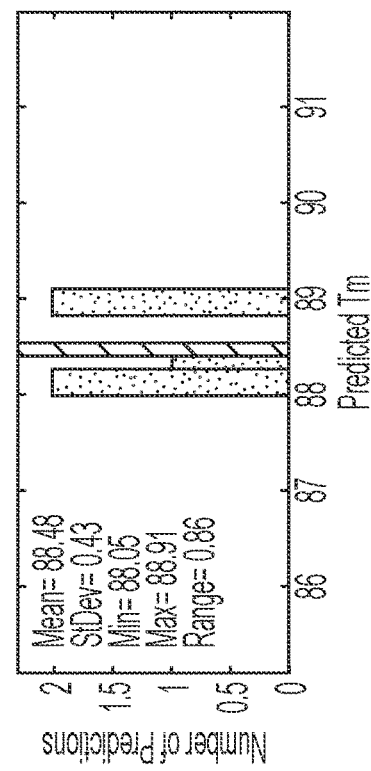
FIG. 22D shows a histogram of clustered Tm values for VZV1 normalized by a PCR2 control.

FIG. 22A illustrates Tm values for Aerom, designated by cluster with stripes and dots, respectively, for two clusters. FIG. 22B illustrates a histogram of Tm values for Aerom normalized by PCR2, designated by cluster with narrow stripes for cluster 1, bold stripes for cluster 2, and no stripes for cluster 3. FIG. 22C illustrates Tm values for VZV1, designated by cluster with stripes and dots, respectively, for two clusters. FIG. 22D illustrates a histogram of Tm values for VZV1 normalized by PCR2, designated by cluster with black and white stripes for one cluster and gray and white stripes for the other cluster.

Figure 23A:
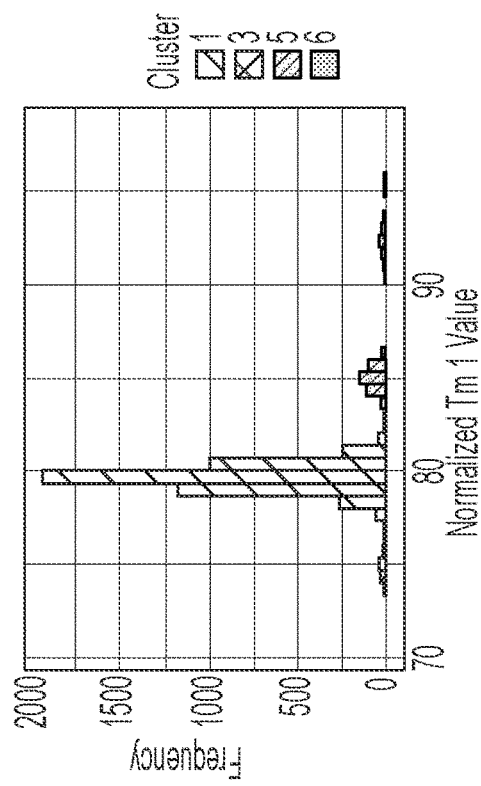
FIG. 23A illustrates clustered Tm values for Kpneumoniae.
Figure 23B:
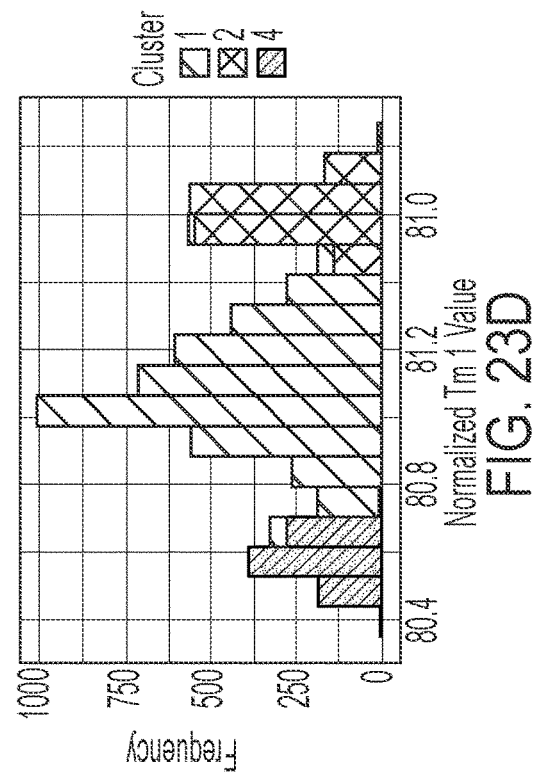
FIG. 23B shows a histogram of clustered Tm values for Kpneumoniae normalized by a yeast control.
Figure 23C:
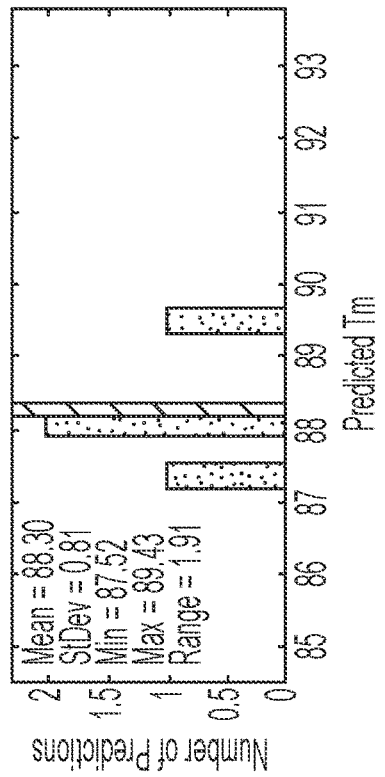
FIG. 23C illustrates clustered Tm values for *Proteus;*
Figure 23D:
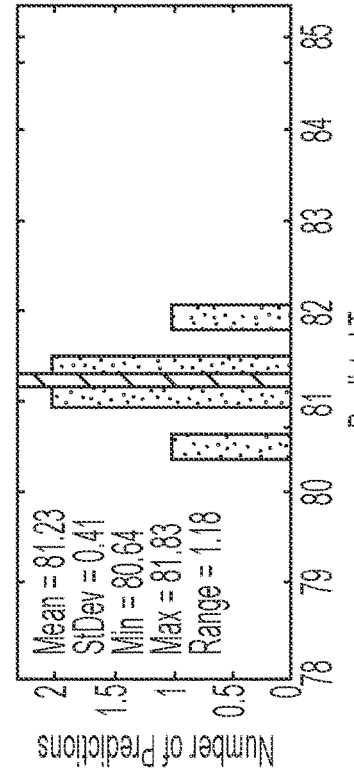
FIG. 23D shows a histogram of clustered Tm values for *Proteus* normalized by a yeast control.

FIG. 23A illustrates a scatter plot of Tm values for Kpneumoniae, designated by cluster with stripes and dots, respectively, for two clusters. FIG. 23B illustrates a histogram of Tm values for Kpneumoniae normalized by yeast, designated by cluster with black and white stripes for cluster 1, crossed strips for cluster 2, black and gray stripes for cluster 5, and gray for cluster 6. FIG. 23C illustrates Tm values for *Proteus*, designated by cluster with stripes and dots, respectively, for two clusters. FIG. 23D illustrates a histogram of Tm values for *Proteus* normalized by yeast, designated by cluster with black and white stripes for cluster 1, crossed strips for cluster 2, and black and gray stripes for cluster 4.

FIG. 24A illustrates Tm values for Ecoli3, designated by cluster with stripes and dots, respectively, for two clusters. FIG. 24B illustrates a histogram of Tm values for Ecoli3 normalized by yeast, with narrow stripes for cluster 3 and bold stripes for cluster 4. FIG. 24C illustrates Tm values for RSV, designated by cluster with stripes and dots, respectively, for two clusters. FIG. 24D illustrates a histogram of Tm values for RSV normalized by yeast, with black and white narrow stripes for cluster 1, crossed narrow stripes for cluster 2, bolder black and white stripes for cluster 4, black and gray stripes for cluster 5, dots for cluster 6, and gray for cluster 7.

As can be seen from FIGS. 22A-22D and FIGS. 23A-23D, some analytes show a close match to sequence histograms, which may be used to compute probable identity to a group. However, other analytes do not show a close match to sequence histograms (as can be seen from FIGS. 24A-24D). Thus, while speciation may be possible for some assays, the full details of a speciation method have not yet been determined. More analysis needs to be done on speciation to understand the actual sequences/species present in each assay distribution.

Example 6

Figure 25:
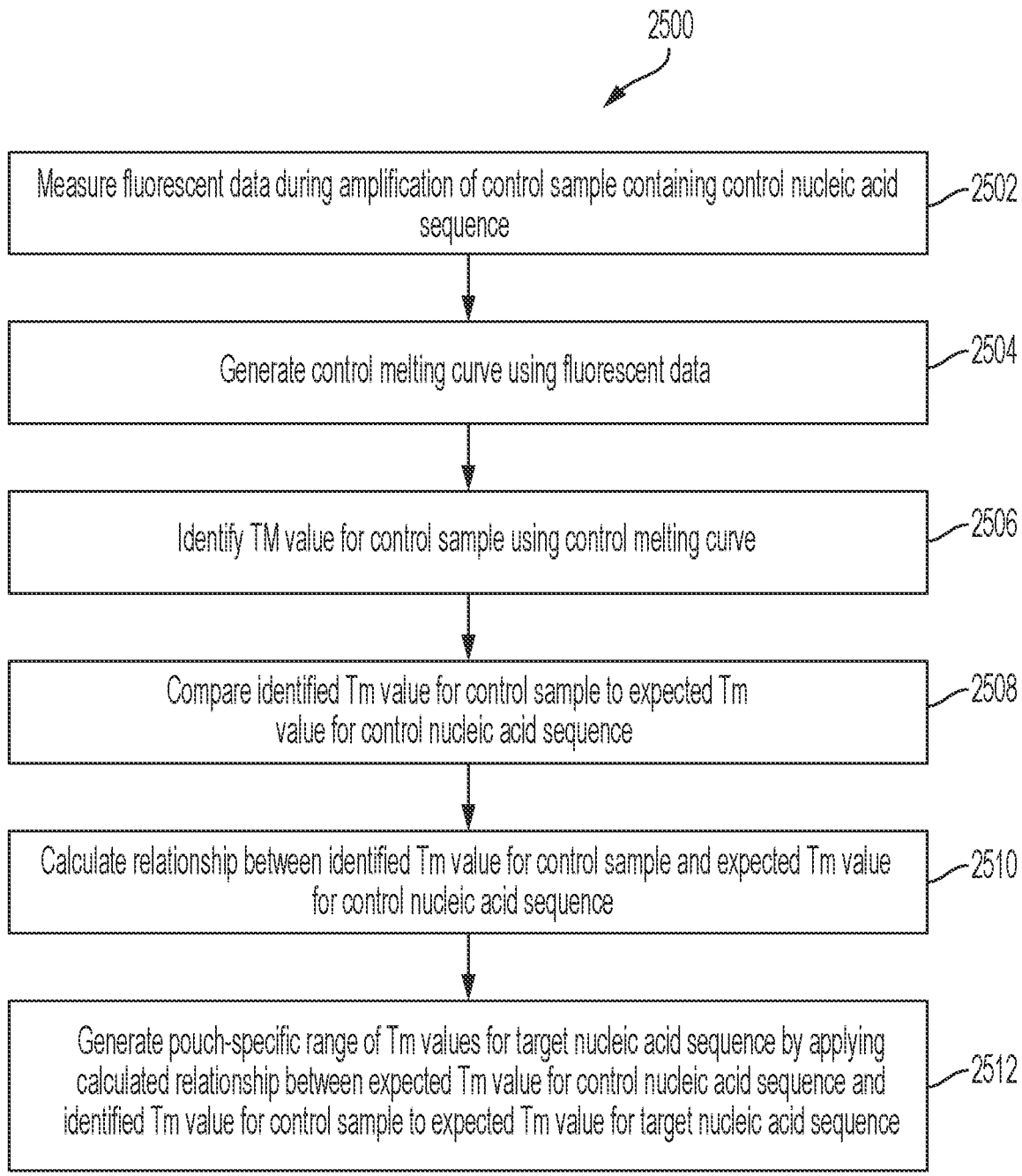
FIG. 25 is a flow chart of an illustrative example of a method for generating an array-specific range of Tm values to be used for calling a sample positive or negative for a target nucleic acid sequence in a given array.
Figure 48:
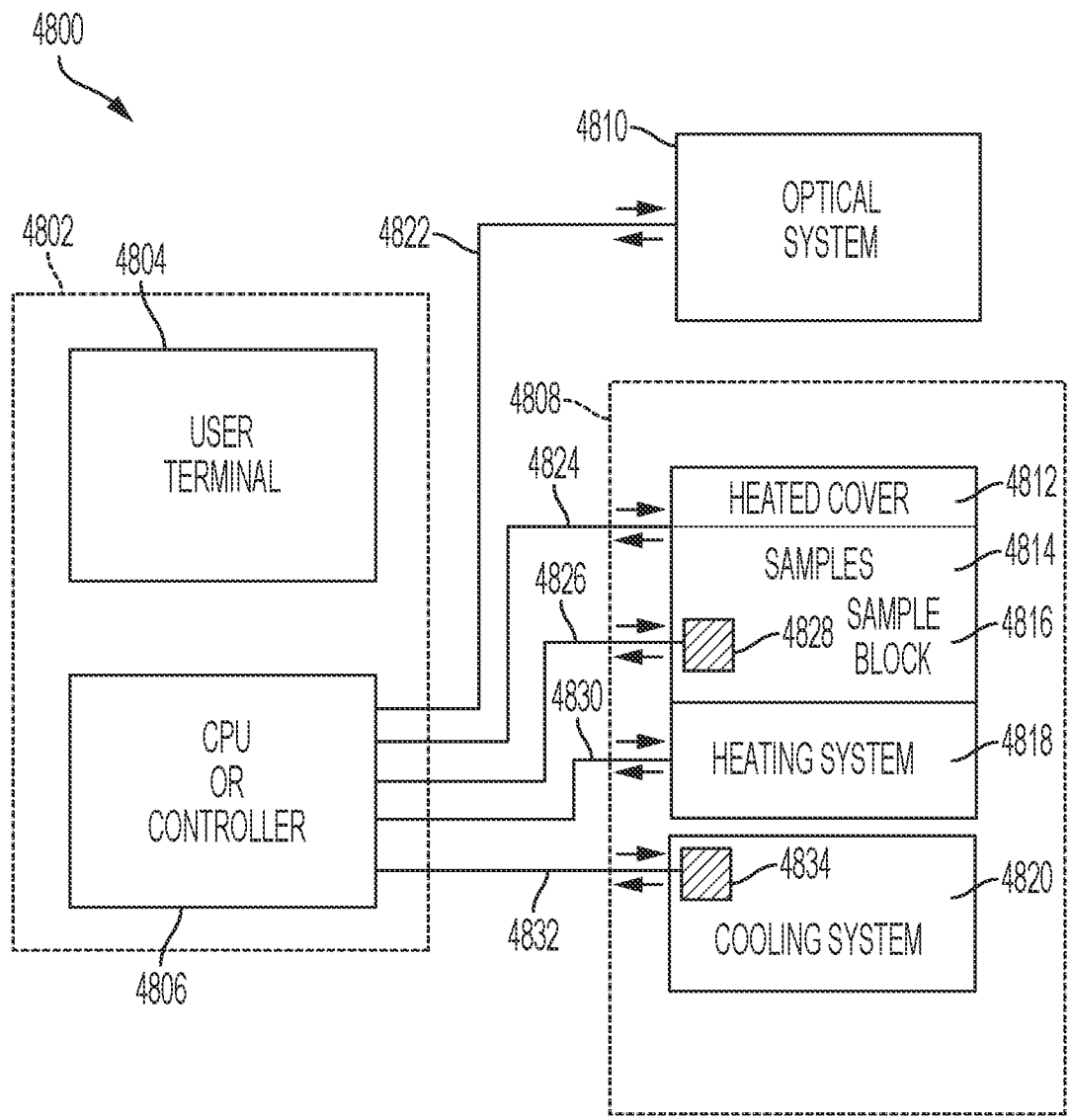
FIG. 48 illustrates a block diagram of an exemplary embodiment of a thermal cycling system in accordance with aspects of the disclosure.

FIG. 25 shows an illustrative process 2500 for generating an array-specific range of Tm values to be used for calling a sample positive or negative for a target nucleic acid sequence in a given pouch. The process may be implemented by various components of the PCR system as described below with reference to FIG. 48, including a processor or controller, an optical element, and one or more temperature controlling devices. In some embodiments, the process 2500 or a portion thereof may be implemented in a set of instructions and stored on a computer-readable memory and executable on one or more processors or a controller.

A control sample containing a (known) control nucleic acid sequence is included in a sample well in a given pouch, along with primers for amplifying the control nucleic acid sequence and a fluorescent dye such as a dsDNA binding dye. The control sample is amplified via thermal cycling, which includes at least a two-step PCR protocol. The PCR protocol may include for each of several cycles, an in-cycle temperature adjusting segment or denaturation segment where the control sample well is heated from an annealing temperature to a denaturation temperature and cooled from the denaturation temperature to the annealing temperature. The PCR protocol may also include for each of the several cycles, an extension segment where the temperature is held constant. In some embodiments, the processors or controller provide control signals to a thermocycling element including to heat the control sample well, to cool the control sample well, and to hold the temperature of the control sample well constant.

At block 2502, fluorescent data (which indicates an amount of fluorescence emitted by the sample) is collected from the control sample during the amplification. The fluorescent data may be collected by an optical system such as the optical system 4810 as described in more detail below with reference to FIG. 48 and provided to the processors or controller. For example, the optical system may provide light to the control sample (e.g., from an LED) and may include optical detectors to detect the amount of light scattered by the sample. The processors or controller may then collect an amount of fluorescence along with a temperature of the control sample (temperature, fluorescence pairs) at several points in time during amplification. It is understood that fluorescence is illustrative only, and other ways of measuring denaturation are within the scope of this disclosure.

At block 2504, a control melting curve is generated using the fluorescent data from the amplification of the control sample. In some embodiments, the amount of fluorescence may be plotted as a function of temperature to generate a melting curve. At block 2506, a Tm value for the control sample is identified using the control melting curve, e.g., by identifying a peak in the control melting curve. At block 2508, the identified Tm value for the control sample is compared to an expected value for the control nucleic acid sequence.

At block 2510, a relationship between the expected value for the control nucleic acid sequence and the identified Tm value for the control sample is calculated. At block 2512, an array-specific range of values for the target nucleic acid sequence is generated by applying the calculated relationship between the expected value for the control nucleic acid sequence and the identified Tm value for the control sample to the expected Tm value for the target nucleic acid sequence. For example, the array-specific range of values may be calculated by normalizing around a Tm value that is calculated by applying the calculated relationship between the expected value for the control nucleic acid sequence and the identified Tm value for the control sample to an expected Tm value for the target nucleic acid sequence, e.g., as discussed with respect to Example 2. In some examples, generating the array-specific range of Tm values for the target nucleic acid sequence may be further based on a linear relationship between Tm values for the target nucleic acid sequence and Tm values for the control nucleic acid sequence from previous pouch runs, as discussed with respect to Example 3. Moreover, in some examples, generating the array-specific range of Tm values for the target nucleic acid sequence may be further based on an assay-specific Cp value calculated for the analyte assay in the pouch, as discussed below with respect to FIG. 26.

Figure 26:
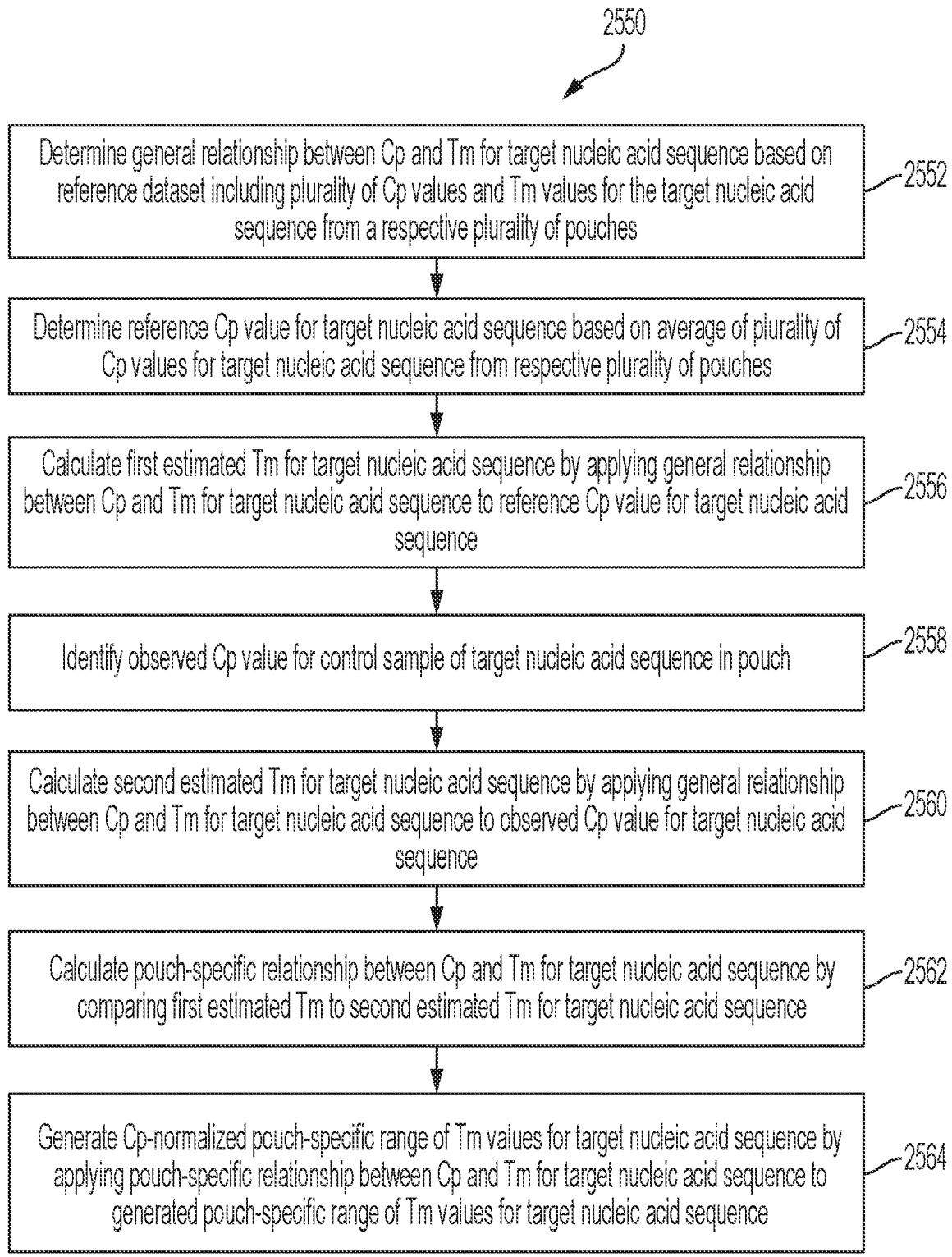
FIG. 26 is a flow chart of an illustrative example of a method for generating a Cp-normalized array-specific range of Tm values to be used for calling a sample positive or negative for a target nucleic acid sequence in an array containing the assay.

FIG. 26 shows an illustrative process 2550 for generating a Cp-normalized array-specific range of Tm values for calling a sample positive or negative for a target nucleic acid sequence in a pouch containing the assay. In some examples, the process 2550 may include steps from the process 2500. Moreover, in some examples, the process 2550 may be implemented by various components of the PCR system as described above with respect to FIG. 3 or below with reference to FIG. 48, including a processor or controller, an optical element, and one or more temperature controlling devices. In some embodiments, the process 2550 or a portion thereof may be implemented in a set of instructions and stored on a computer-readable memory and executable on one or more processors or a controller.

At block 2552, a general relationship between Cp and Tm for the target nucleic acid sequence may be calculated based on a reference dataset including a plurality of Cp values and Tm values for the target nucleic acid sequence from a respective plurality of pouches. At block 2554, a reference Cp value for the target nucleic acid sequence may be determined based on an average of the plurality of Cp values for the target nucleic acid sequence from the respective plurality of pouches. At block 2556, a first estimated Tm for the target nucleic acid sequence may be calculated by applying the general relationship to the reference Cp value. At block 2558, an observed Cp value for the second control sample containing the target nucleic acid sequence in the array may be identified. At block 2560, a second estimated Tm for the target nucleic acid sequence may be calculated by applying the general relationship to the observed Cp value. At block 2562, an array-specific relationship between Cp and Tm for the target nucleic acid sequence may be calculated by comparing the first estimated Tm to the second estimated Tm for the target nucleic acid sequence. At block 2564, a Cp-normalized array-specific range of Tm values may be generated for the target nucleic acid sequence by applying the array-specific relationship between Cp and Tm for the target nucleic acid sequence to the generated array-specific range of Tm values for the target nucleic acid sequence.

Example 7

Figure 27:
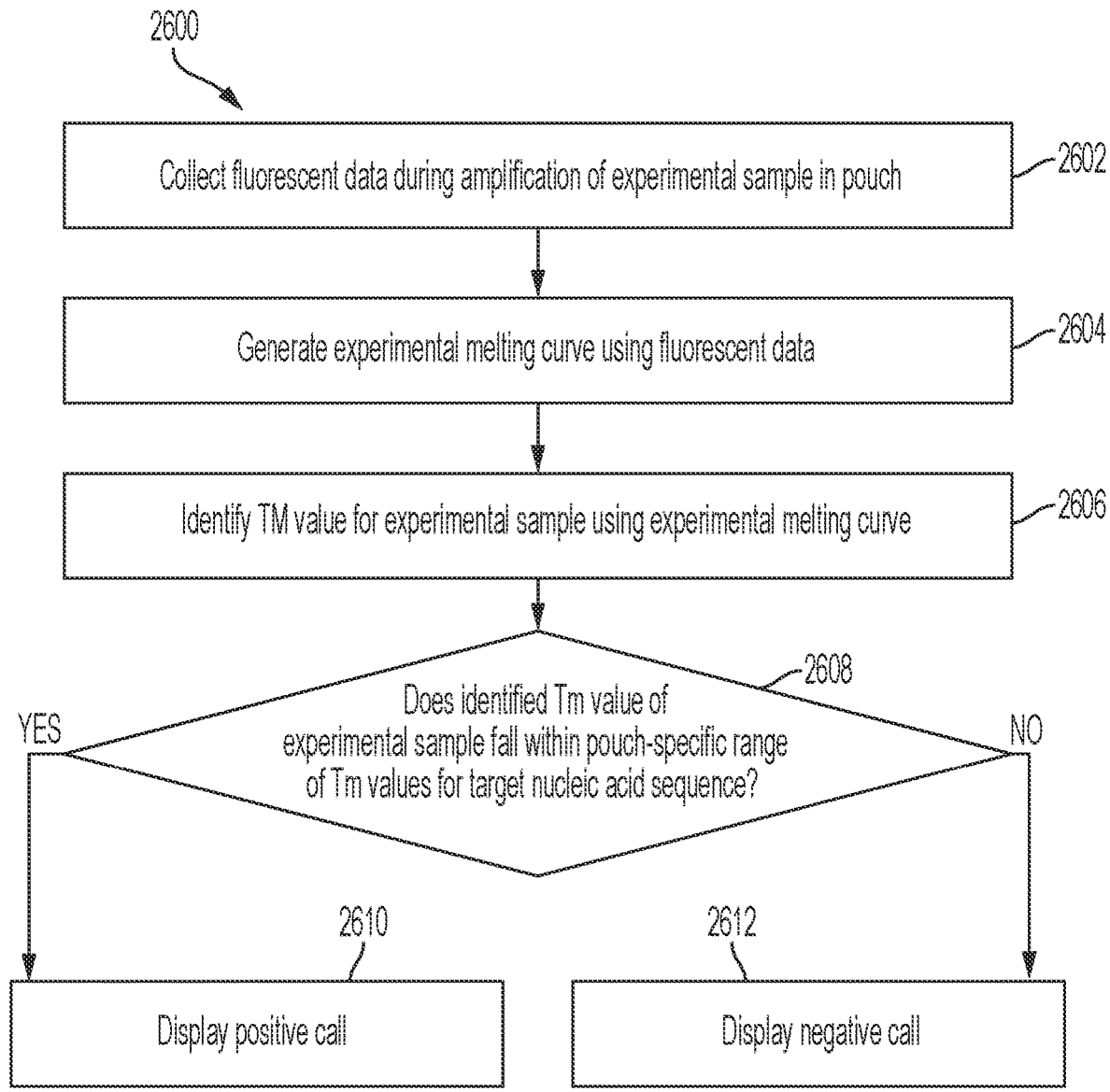
FIG. 27 is a flow chart of an illustrative example of a method for calling a sample positive or negative for a target nucleic acid sequence in a given array.

FIG. 27 shows an illustrative process 2600 for calling a sample positive or negative for a target nucleic acid sequence in a given pouch. The process may be implemented by various components of the PCR system as described below with reference to FIG. 48, including a processor or controller, an optical element, and one or more temperature controlling devices. In some embodiments, the process 2600 or a portion thereof may be implemented in a set of instructions and stored on a computer-readable memory and executable on one or more processors or a controller.

An experimental sample (with unknown composition) is included in an experimental sample well, in the same pouch as the control sample well discussed above with respect to FIG. 25 and FIG. 26, along with primers for amplifying a target nucleic acid sequence and a fluorescent dye such as a dsDNA binding dye. The experimental sample is amplified via thermal cycling, which includes at least a two-step PCR protocol. The PCR protocol may include for each of several cycles, an in-cycle temperature adjusting segment or denaturation segment where the experimental sample well is heated from an annealing temperature to a denaturation temperature and cooled from the denaturation temperature to the annealing temperature. The PCR protocol may also include for each of the several cycles, an extension segment where the temperature is held constant. In some embodiments, the processors or controller provide control signals to a thermocycling element including to heat the experimental sample well, to cool the experimental sample well, and to hold the temperature of the experimental sample well constant.

At block 2602, fluorescent data (which indicates an amount of fluorescence emitted by the sample) is collected from the experimental sample during the amplification. The fluorescent data may be collected by an optical system such as the optical system 4810 as described in more detail below with reference to FIG. 48 and provided to the processors or controller. For example, the optical system may provide light to the experimental sample (e.g., from an LED) and may include optical detectors to detect the amount of light scattered by the sample. The processors or controller may then collect an amount of fluorescence along with a temperature of the experimental sample (temperature, fluorescence pairs) at several points in time during amplification. It is understood that fluorescence is illustrative only, and other ways of measuring denaturation are within the scope of this disclosure.

At block 2604, an experimental melting curve is generated using the fluorescent data from the amplification of the experimental sample. In some embodiments, the amount of fluorescence may be plotted as a function of temperature to generate a melting curve. At block 2606, a Tm value for the experimental sample is identified using the control melting curve, e.g., by identifying a peak in the experimental melting curve.

At block 2608, a determination is made as to whether the Tm value of the experimental sample falls within the array-specific range of Tm values for the target nucleic acid sequence calculated at FIG. 25, or the Cp-normalized array-specific range of Tm values for the target nucleic acid calculated at FIG. 26. If so (block 2608, YES), the method proceeds to block 2610, where a positive call is displayed. For example, the processors or controller may display an indication of a positive call on a user interface. If not (block 2608, NO), the method proceeds to block 2612, where a negative call is displayed. For example, the processors or controller may display an indication of a negative call on a user interface. In some embodiments, the processors or controller may also display indications of the data points, the melting curves, the array-specific range of Tm values, etc.

Example 8

Some assays experience false positives, which are often caused by non-specific amplification. For example, Crypt2 false positives are largely caused by an interaction with yeast. Non-specific amplification should result in an amplified region that is unique compared to the intended target. The same process that can be used to identify distinct subtype sequences from one another can be used to separate specific amplification from non-specific amplification. If there is enough separation between these distinct distributions, a prediction of which sequence was observed could be made from a Tm value. Normalization can improve the performance of a model to predict the sequence (a classification model) by increasing the separation between groups of Tm values from distinct sequences.

An example "Negative Run Dataset" includes all QC GI Panel runs labelled "Negative" from 5/5/2020 to 10/13/2020 (6847 total runs). All pouches should be negative for all assays, and accordingly, any well positives for assays in this dataset are characterized as "false positives."

An example "Positive Run Dataset" includes QC GI Omega mix (a mixture of nucleic acids for all targets in that panel) runs from October 2020 (1798 total runs). All pouches should be positive for all assays. Consequently, any well positives for assays in this dataset are characterized as "true positives."

A Tm Normalization with control assay(s) was applied and averaged across the replicates to obtain normalized Tm values for each assay. A 5-fold cross-validation was performed on a classification model to distinguish between true and false positives based on the raw Tm values and the normalized Tm values. The cross-validated accuracy scores were then compared to determine whether the normalization techniques provided enhanced capabilities of classifying the positive results.

Figure 28A:
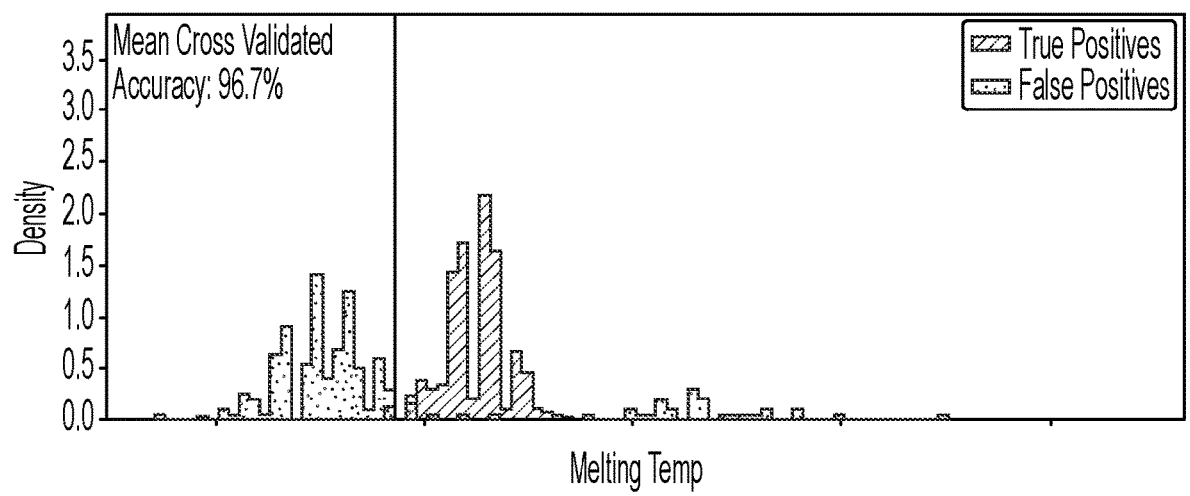
FIGS. 28A and 28B illustrate distributions of true and false positives for Cdiff, with raw Tms displayed in FIG. 28A and normalized Tms displayed in FIG. 28B. The vertical line indicates an illustrative decision boundary in this and several following figures.
Figure 28B:
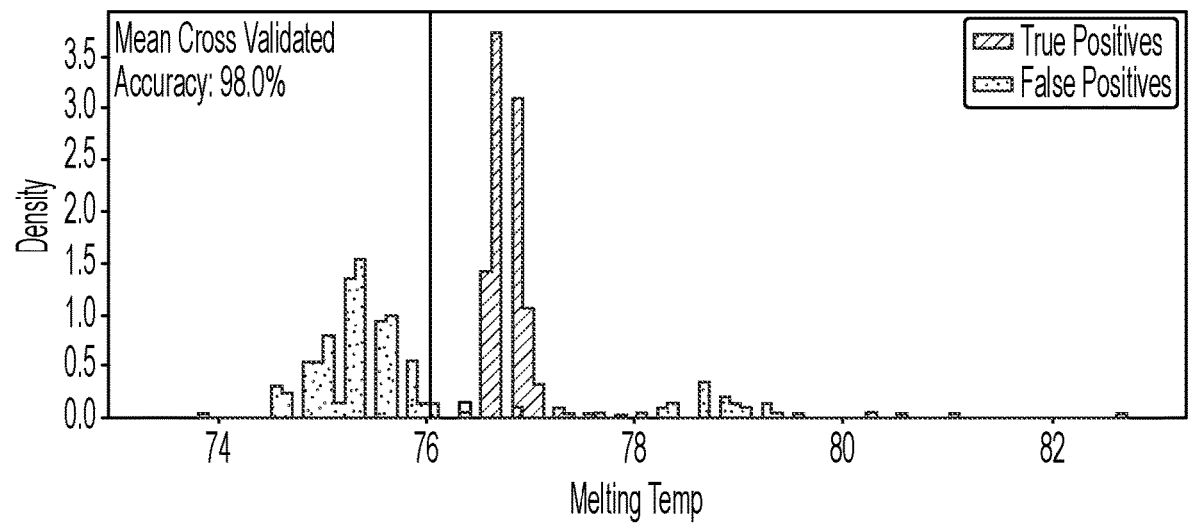

FIGS. 28A and 28B illustrate distributions of true and false positives for Cdiff. Raw Tms are displayed in FIG. 28A and normalized Tms are displayed in FIG. 28B. As shown in FIGS. 28A and 28B, the accuracy of the model used to distinguish between false positives identified in negative QC runs and true positives pulled from Omega mix QC runs improves from 96.7% to 98.0% with Tm normalization.

Figure 29A:
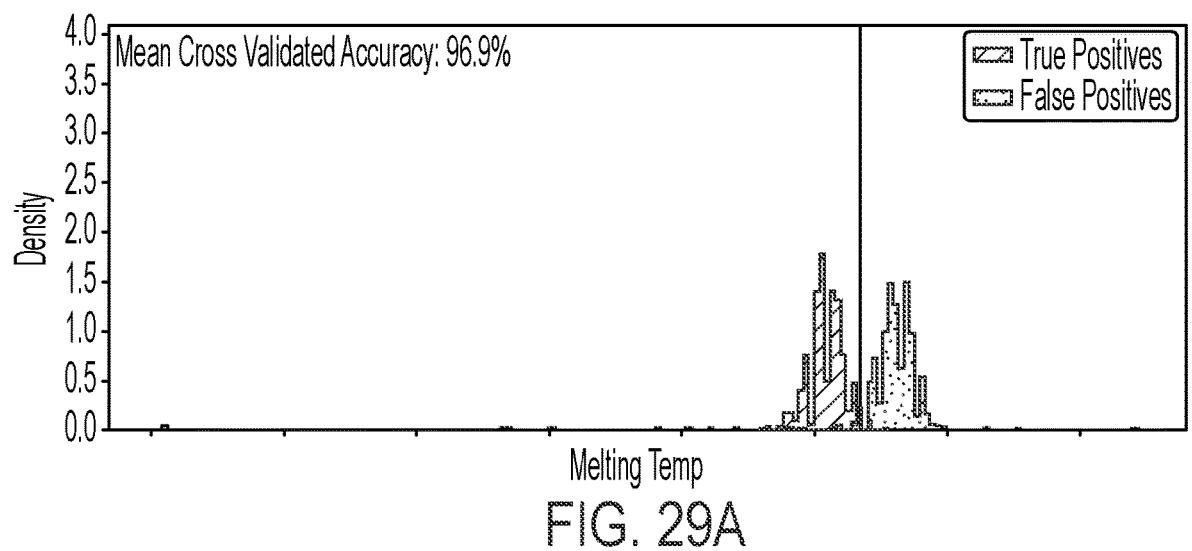
FIGS. 29A and 29B illustrate distributions of true and false positives for Crypt2, with raw Tms displayed in FIG. 29A and normalized Tms displayed in FIG. 29B.
Figure 29B:
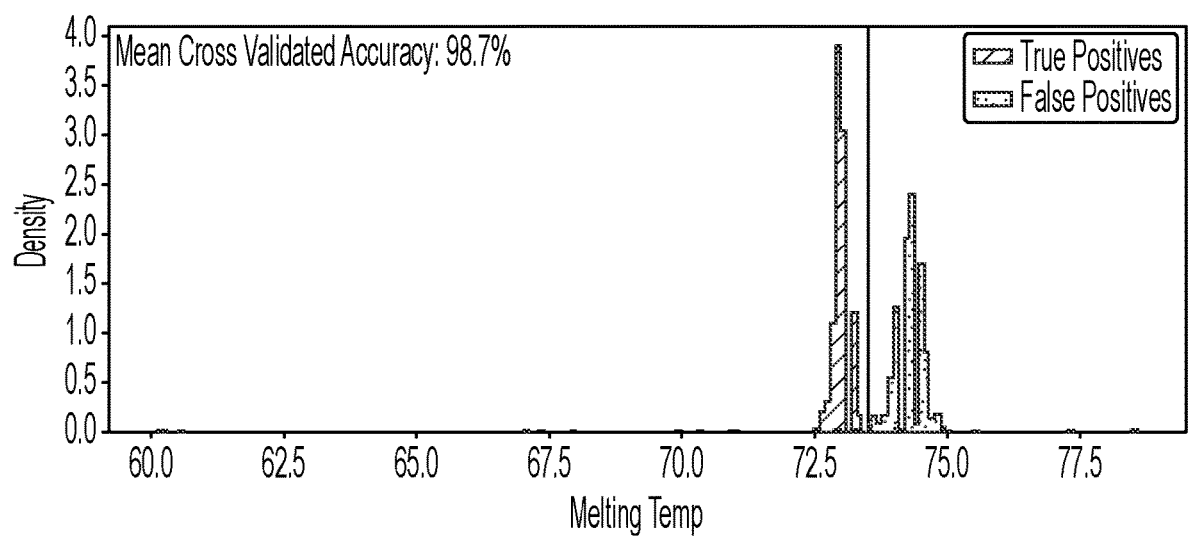

FIGS. 29A and 29B illustrate distributions of true and false positives for Crypt2. Raw Tms are displayed in FIG. 29A and normalized Tms are displayed in FIG. 29B. As shown in FIGS. 29A and 29B, the accuracy of the model used to distinguish between false positives identified in negative QC runs and true positives pulled from Omega mix QC runs improves from 96.9% to 98.7% with Tm normalization.

FIGS. 30A and 30B illustrate distributions of true and false positives for Enterotoxigenic *E. coli* target 3 ("ETEC 3"). Raw Tms are displayed in FIG. 30A and normalized Tms are displayed in FIG. 30B. As shown in FIGS. 30A and 30B, the accuracy of the model used to distinguish between false positives identified in negative QC runs and true positives pulled from Omega mix QC runs improves from 83.6% to 98.5% with Tm normalization.

FIG. 31 is a table illustrating the cross-validated accuracy improvements for Cdiff, Crypt2, and ETEC 3 with Tm normalization. As shown in FIG. 31, the accuracy of the model used to distinguish between false positives identified in negative QC runs vs true positives pulled from Omega mix QC runs improves with Tm normalization.

Utilizing the discriminatory power of the normalization techniques, a determination can be made as to which positive wells are false positives and which are true positives based on their melt profiles for Cdiff, Crypt2, and ETEC 3. The true and false positive distributions in Cdiff, Crypt2, and ETEC 3 are better distinguished when normalization is applied to the melt profiles. An increase in cross-validated accuracy is seen when Tm normalization is applied.

Example 9

Trend data provides observations of wild type genetic sequences passed through FilmArray melting analysis resulting in Tm values. The specific genetic sequences associated with these Tms are unknown. Using known sequence data from window studies, a model may be generated for estimating the probability that Trend Tm values belong to known sequence groups. Reduction in variance from application of normalization algorithm allows for separation and identification of Tm distributions belonging to sequence groups.

Tm window studies make use of several datasets to determine how FilmArray instruments, chemistry and the targeted sequences interact to produce melting curves and subsequently Tm values. "Reference runs" include known sequences that are used as input to FilmArray runs. The Tm values from these runs as well as the sequence data are used to tune the Tm prediction model. "Database sequences" include relevant sequences collected from NCBI databases and run through the Tm prediction algorithm. Reference runs provide an estimation of observation variance, and the Tm prediction algorithm applied to database sequences provides an a priori mean Tm.

For a sequence $Seq_i$ from parent reference assay group Ref; a distribution, illustratively a Gaussian distribution although it is understood that other distributions may be used, may be built representing a probable range of Tms that might result from that sequences being present in a FilmArray run:

$$f_{Tm|Seq=Seq_i}(x) = \frac{1}{\sigma_{Seq_i}\sqrt{2\pi}} e^{-\frac{1}{2}\left(\frac{x-\mu_{Seq_i}}{\sigma_{Seq_i}}\right)^2},$$

where $\sigma_{seq_i}=Std(Ref_j)$ the standard deviation for all runs in the reference group related to $Seq_i$ and $\mu_{seq_i}=Tm_{Pred}(Seq_i)$ represents the Tm value predicted by the trained Tm model.

Figure 32:
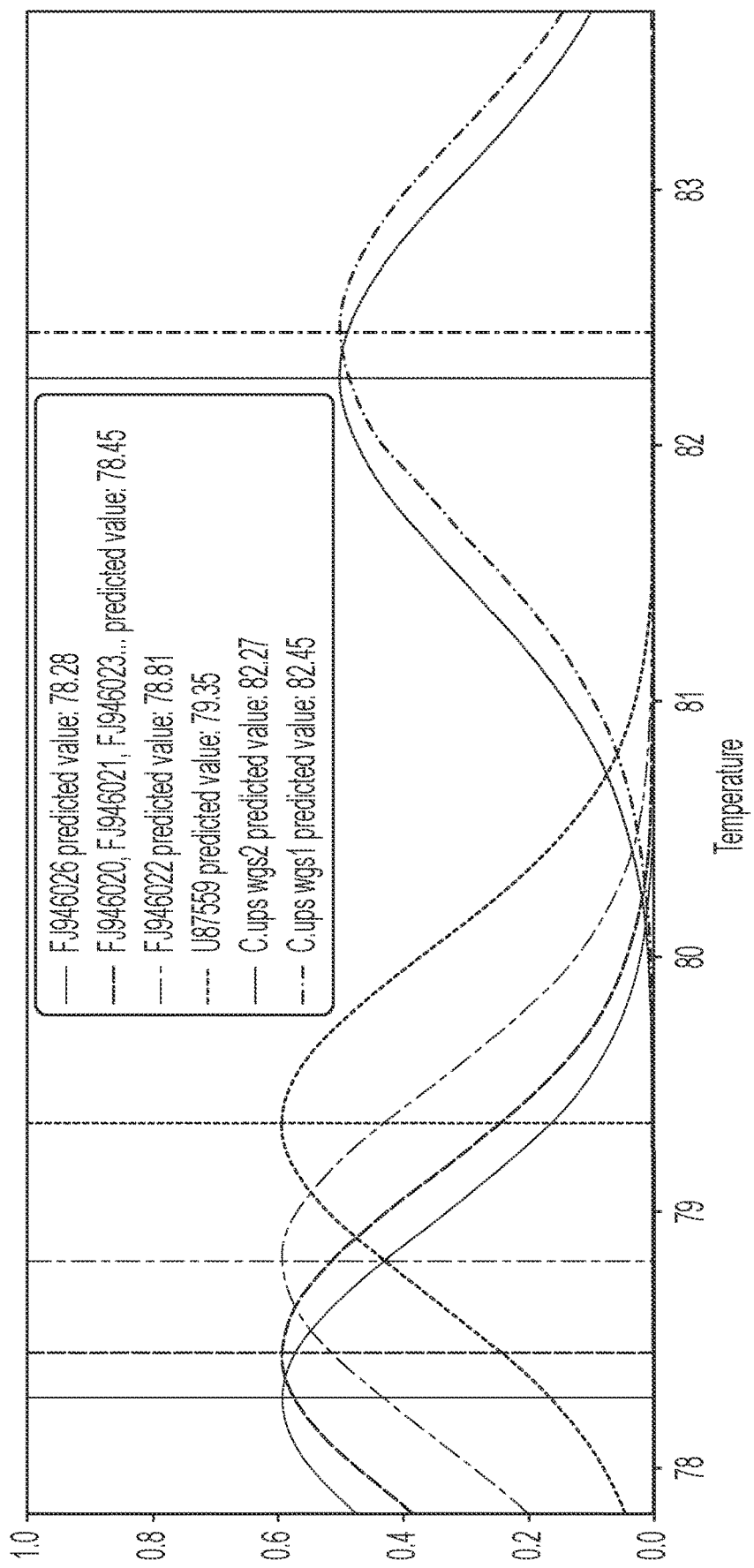
FIG. 32 illustrates theoretical distributions of Tm values for each database sequence group for Campy 2.

FIG. 32 illustrates theoretical distributions of Tm values for each database sequence group for *Campylobacter* target 2 ("Campy 2"). In FIG. 32, solid vertical lines represent probability density functions, and dotted vertical lines indicate the predicted mean Tm of each sequence group. Database sequences with very similar predicted Tms are grouped before estimation. These distributions can be stacked to show relative probability.

Figures 33A, 33B:
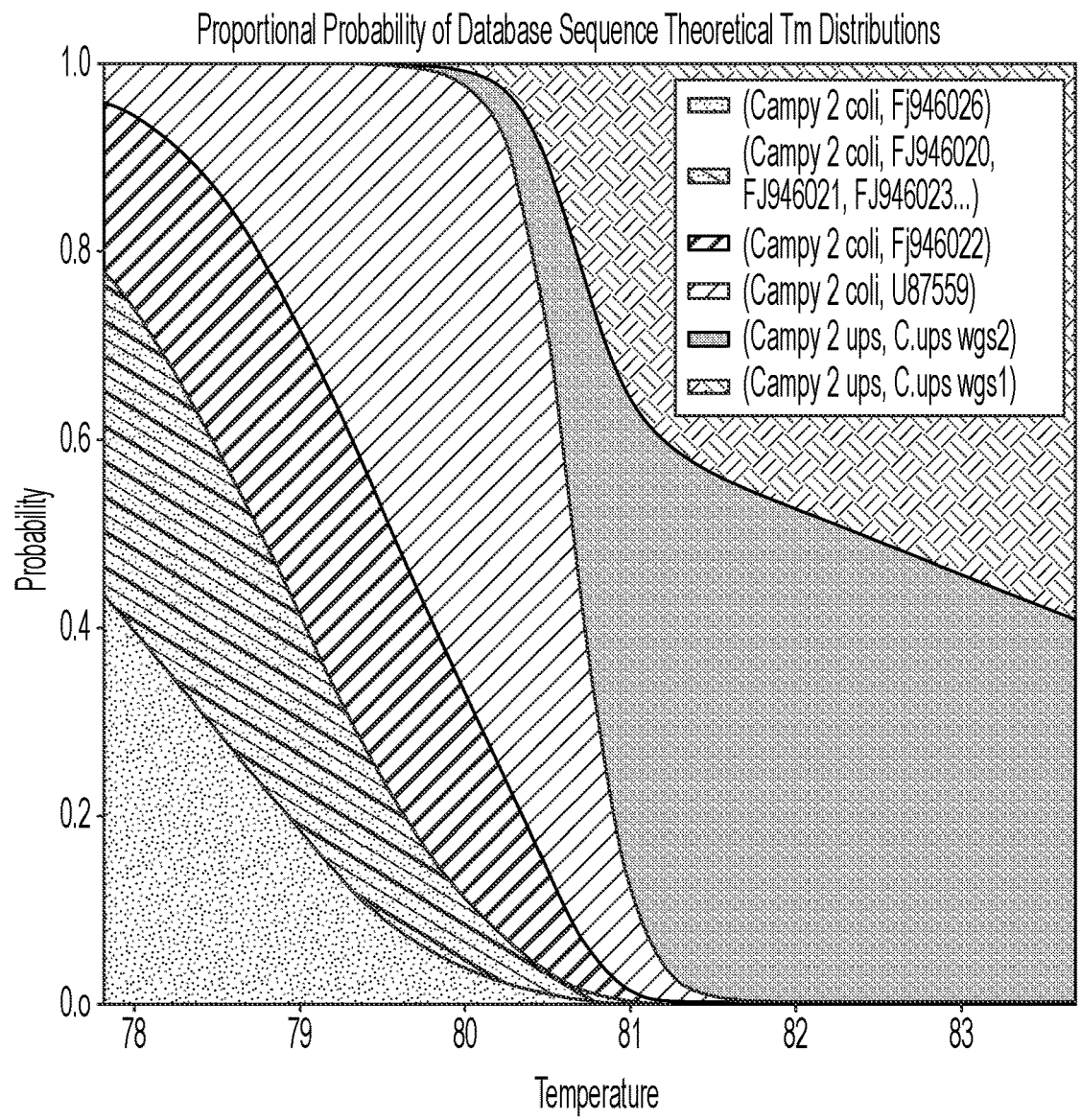
FIG. 33A illustrates the probability of each database sequence group for Campy 2 by temperature and FIG. 33B illustrates the assumed equal prevalence for each database sequence group for Campy 2.

These database sequence distributions are then normalized to sum to one. FIG. 33A illustrates the probability of each sequence group by temperature. Color regions represent the proportion of each sequence group predicted by the Tm prediction algorithm with reference study variance. These estimates assume equal prevalence for each database sequence group, as shown in FIG. 33B.

Figure 34:
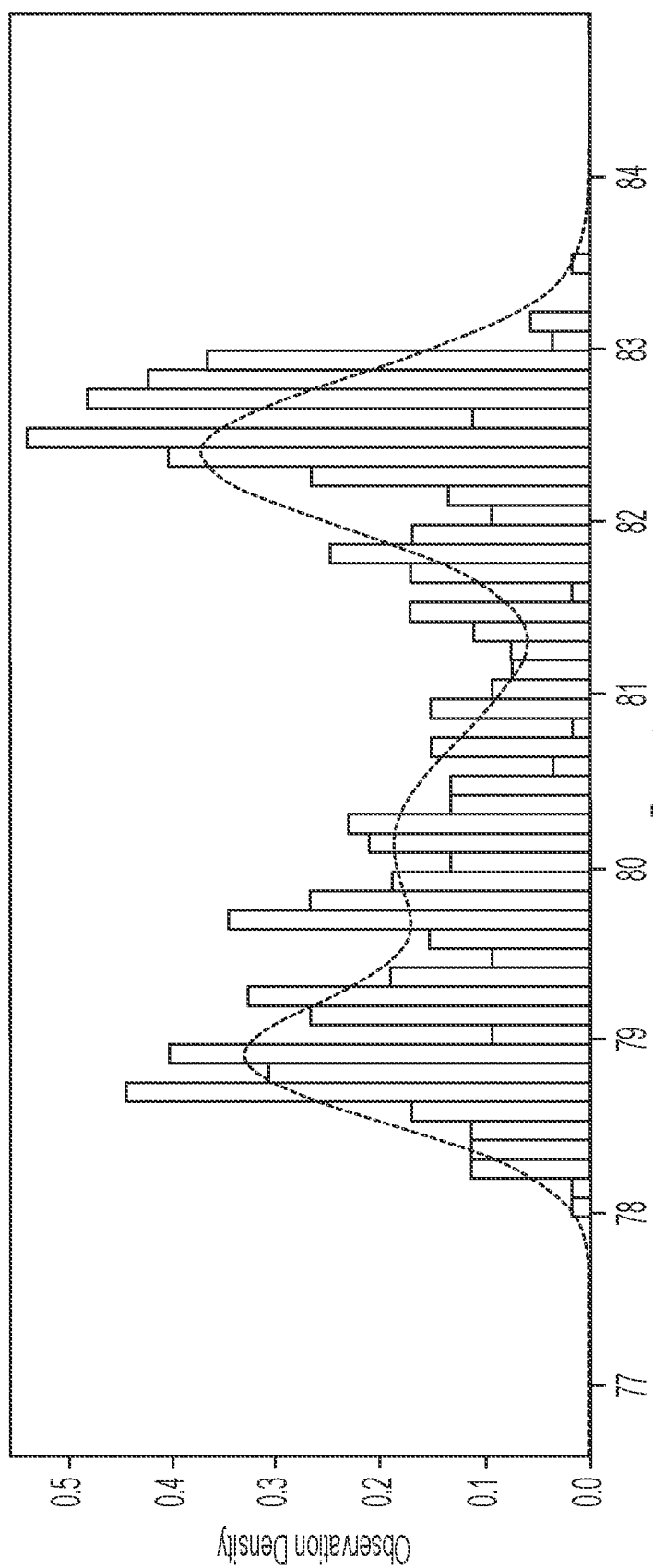
FIG. 34 illustrates a histogram of the distribution of observed Tm values for the assay Campy 2 from BioFire® Syndromic Trends, a pathogen surveillance platform (also called "the Trend database" or "Trend" herein)

GI panel runs performed between Jan. 1, 2020 and Oct. 25, 2020 were queried from the Trend database. FIG. 34 illustrates a histogram of the distribution of observed Tm values for the assay Campy 2 from the Trend database. The dotted line represents a continuous estimated fit of the observed data. Applying the proportional probabilities from FIG. 33A and FIG. 33B to Trend observations provides an estimate of field proportion assuming equal prevalence.

Figures 35A, 35B:
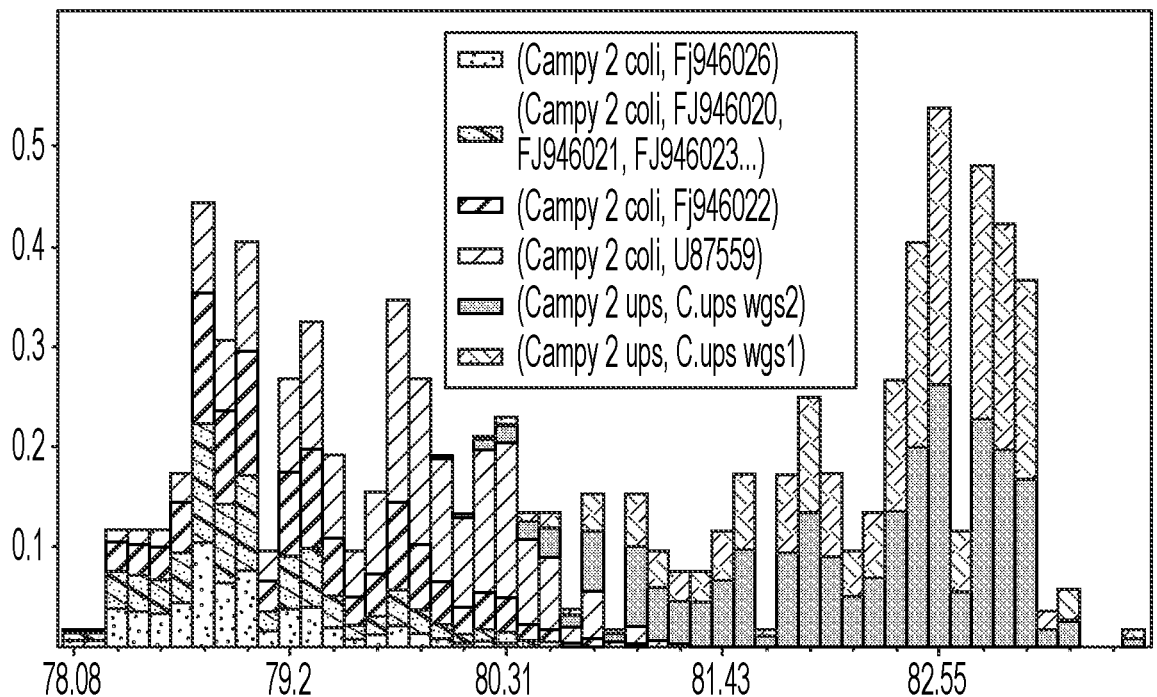
FIG. 35A illustrates a histogram of observed Tm values of the assay Campy 2 from the Trend database, with overlaid colors representing the proportion of each bin based off of theoretical distributions of database sequence groups.
FIG. 35B is a table illustrating the estimated Trend prevalence for each database sequence group for Campy 2, assuming uniform field prevalence.

FIG. 35A illustrates a histogram of observed Tm values of the assay Campy 2 from the Trend database, with overlaid colors representing the proportion of each bin based off of theoretical distributions of database sequence groups, and FIG. 35B is a table illustrating the estimated Trend prevalence for each database sequence group for Campy 2.

Figures 36A, 36B:
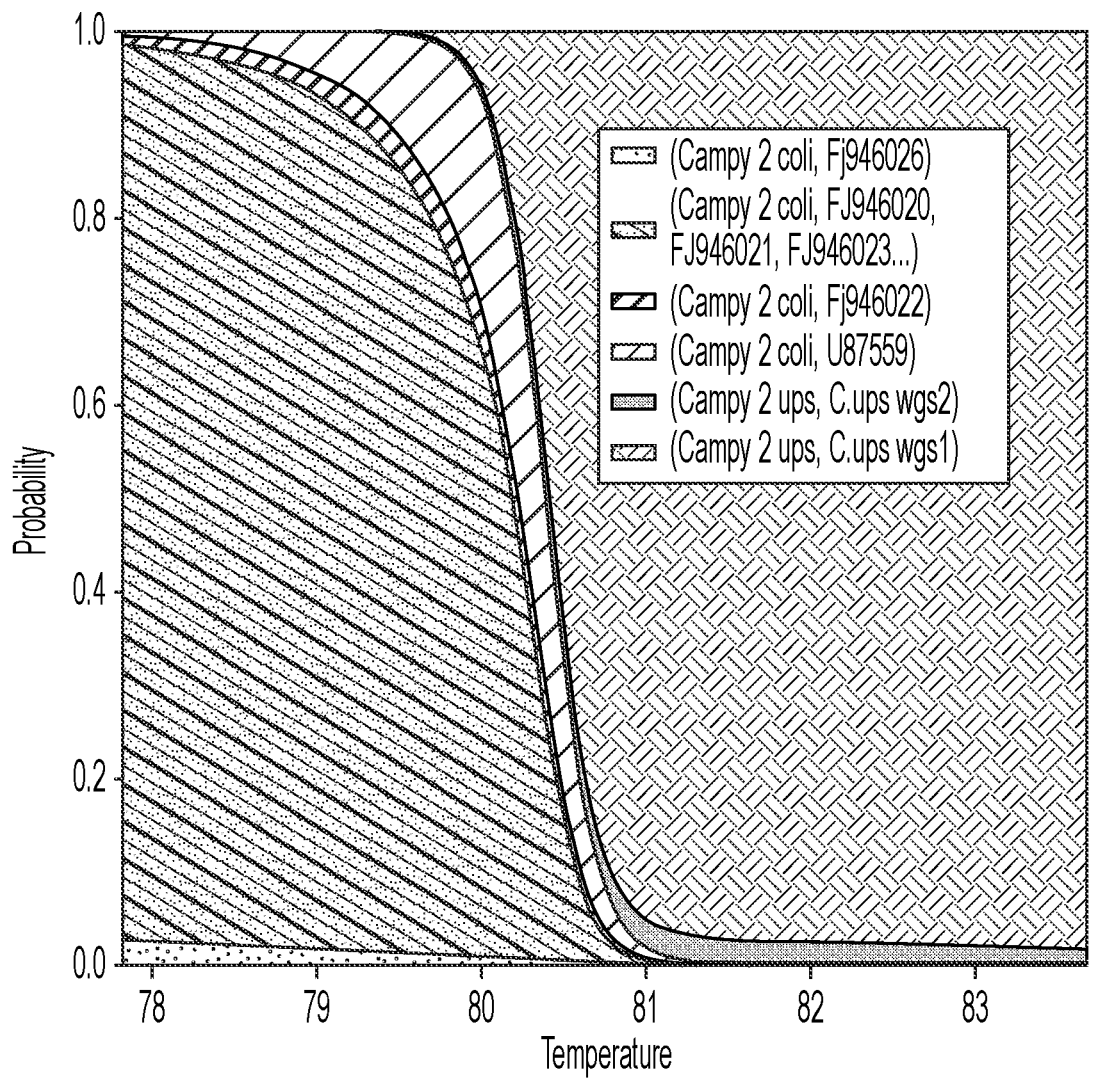
FIG. 36A is a table showing contrived prevalence data for each database sequence group for Campy 2.
FIG. 36B illustrates the effect of the prevalence data on the expected database sequence proportions for Campy 2.

If field prevalence data is available, these estimates can be updated, either periodically or in real time, and can be updated generally or for specific geographic regions. Here, field prevalence data are provided to demonstrate how the estimated sequence distributions might be updated with new information. FIG. 36A shows contrived prevalence data, and FIG. 36B illustrates the effect of the prevalence data on the expected database sequence proportions. Specifically, FIG. 36B illustrates the probability of each sequence group by temperature, with color regions representing the proportion of each sequence group projected by the Tm prediction algorithm, as updated with the contrived field prevalence data from FIG. 36A.

Figures 37A, 37B:
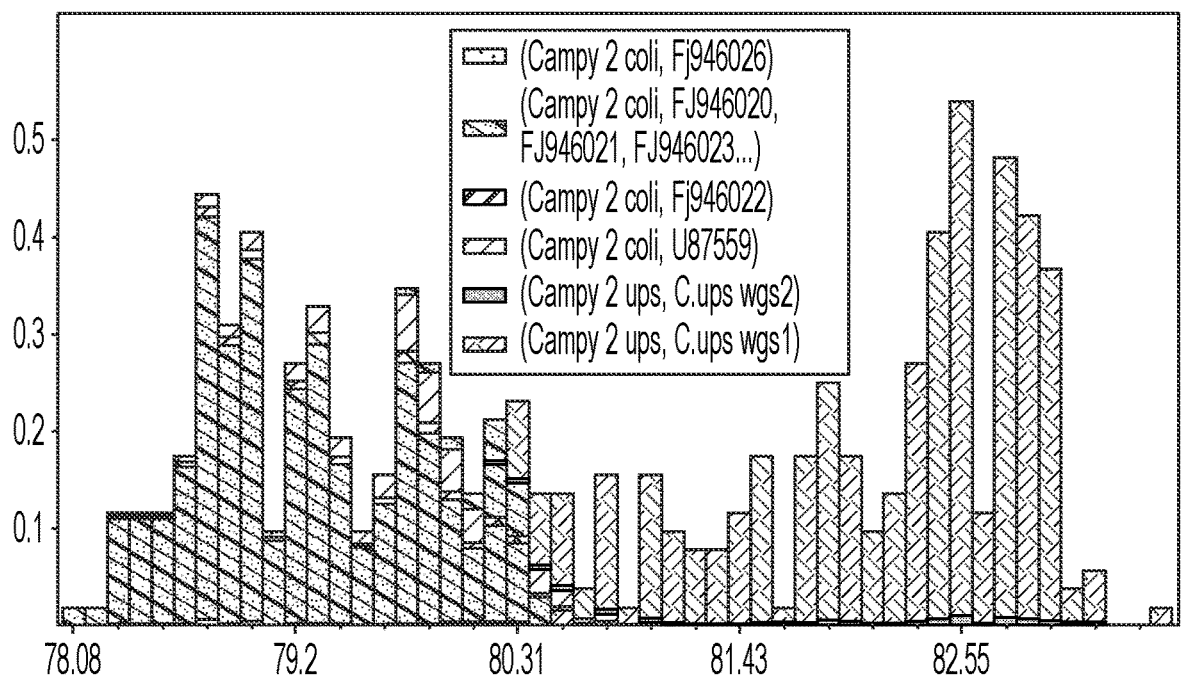
FIG. 37A is a table showing the contrived field prevalence and estimated Trend prevalence for each sequence group of the assay Campy 2 from the Trend database.
FIG. 37B is a histogram of observed Tm values for each sequence group of the assay Campy 2 from the Trend database, assuming a contrived field prevalence.

FIG. 37A is a table showing the contrived field prevalence and estimated trend prevalence for each Campy 2 sequence group. FIG. 37B is a histogram of observed Tm values of the assay Campy 2 from the Trend database. Overlaid colors represent the proportion of each bin based off of theoretical distributions of database sequence groups that have been updated with contrived field prevalence data.

Using sequence data from window studies, a model may be generated for estimating the probability that Trend Tm values belong to known sequence groups. The reduction in variance from the application of the normalization algorithm allows for separation and identification of Tm distributions belonging to unique sequences, potentially indicating a novel strain. The application of normalization and predictive genotyping could be used for anomaly detection, site grouping, and as additional information provided to a customer. Illustratively, these methods may allow institutions such as hospitals and hospital groups to use identification of Tms and Tm distributions to determine whether an outbreak is specific to that institution, is specific to the local community or geographic region, or is consistent with a larger national or global trend.

Example 10

As discussed above, normalizing Tm reduces standard deviations of Tm values (compared to raw Tm values). Accordingly, Tm normalization can increase the ability to distinguish different underlying melt profiles and reduces the distance (i.e., absolute distances from prediction plots) from predicted Tm values to observed Tm values. Tm normalization also increases the effectiveness of sequence differentiation. That is, after normalization, the distances from predicted Tms to actual observed Tm values are reduced and the distance from decisions boundary should be higher. Given a new observed Tm value, and making assumptions of variability and database sequence coverage, it is possible make a statement about its relationship to known database sequences, by providing a genotyping likelihood.

The Tm (Jellyfish) model (Howley, et al., J. Biol Chem, Vol. 254:11, pp 4876-4883 (1979)) predicts that differences in characteristics of genetic sequences (e.g., GC-content, length, etc.) result in differences in observed Tm values. Applying the PCR2 Tm normalization to observed Tm values reduces the distance between the predicted TM and observed data. FIGS. 38A-38C and FIGS. 39A-39C illustrate the distributions of the distance from the predicted TM value for Campy 2 and Cdiff, respectively. It is understood that the Jellyfish model is only one illustrative example of predicting Tm and that other predictive models may be used to predetermine a range of Tms, for example Umelt (dna-utah.org/umelt/umelt.html, University of Utah) and experimental data.

Figure 38A:
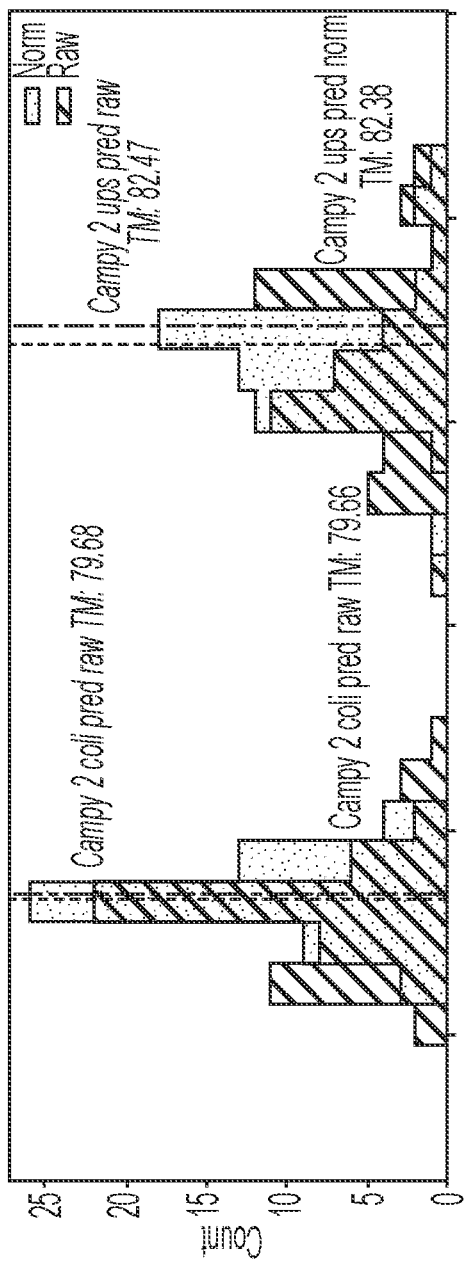
FIG. 38A is a histogram illustrating distributions of Campy 2 coli raw Tm values, Campy 2 coli normalized Tm values, Campy 2 ups raw Tm values, and Campy 2 ups normalized Tm values.

FIG. 38A is a histogram illustrating distributions of *Campylobacter coli* ("Campy 2 coli") raw Tm values, Campy 2 coli normalized Tm values, *Campylobacter upsaliensis* ("Campy 2 ups") raw Tm values, and Campy 2 ups normalized Tm values. As shown in FIG. 38A, the predicted raw Tm value for Campy 2 coli was 79.68, the predicted normalized Tm value for Campy 2 coli was 79.66, the predicted raw Tm value for Campy 2 ups was 82.47 and the predicted normalized Tm value for Campy 2 ups was 82.38.

Figure 38B:
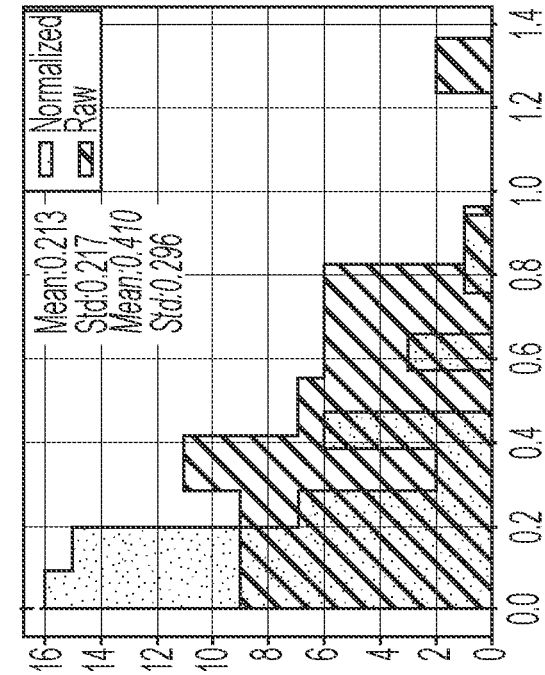
FIG. 38B illustrates the difference distribution for normalized Tm values compared to raw Tm values for Campy 2 coli.

FIG. 38B illustrates the difference distribution for normalized Tm values compared to raw Tm values for Campy 2 coli. As shown in FIG. 38B, for the normalized Tm values for Campy 2 coli, the mean difference was 0.119 and the standard deviation was 0.127, while for raw Tm values for Campy 2 coli, the mean difference was 0.242 and the standard deviation was 0.193.

Figure 38C:
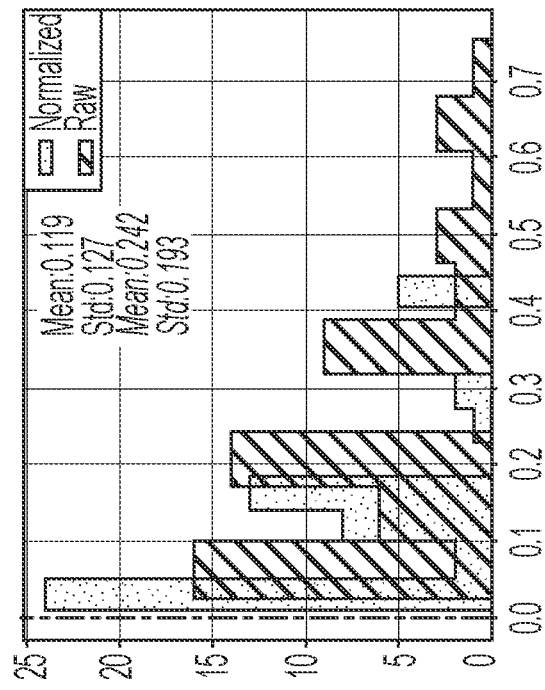
FIG. 38C illustrates the difference distribution for normalized Tm values compared to raw Tm values for Campy 2 ups.

FIG. 38C illustrates the difference distribution for normalized Tm values compared to raw Tm values for Campy 2 ups. As shown in FIG. 38C, for the normalized Tm values for Campy 2 ups, the mean difference was 0.213 and the standard deviation was 0.217, while for raw Tm values for Campy 2 ups, the mean difference was 0.410 and the standard deviation was 0.296.

FIG. 39A is a histogram illustrating distributions of Cdiff ToxA raw Tm values, Cdiff ToxA normalized Tm values, Cdiff ToxB raw Tm values, and Cdiff ToxB normalized Tm values. As shown in FIG. 38A, the predicted raw Tm value for Cdiff ToxA was 79.29, the predicted normalized Tm value for Cdiff ToxA was 79.22, the predicted raw Tm value for Cdiff ToxB was 76.76 and the predicted normalized Tm value for Cdiff ToxB was 76.75.

FIG. 39B illustrates the difference distribution for normalized Tm values compared to raw Tm values for Cdiff ToxB. As shown in FIG. 39B, for the normalized Tm values for Cdiff ToxB, the mean difference was 0.249 and the standard deviation was 0.198, while for raw Tm values for Cdiff ToxB, the mean difference was 0.345 and the standard deviation was 0.250.

FIG. 39C illustrates the difference distribution for normalized Tm values compared to raw Tm values for Cdiff ToxA. As shown in FIG. 39C, for the normalized Tm values for Cdiff ToxA, the mean difference was 0.141 and the standard deviation was 0.160, while for raw Tm values for Cdiff ToxA, the mean difference was 0.381 and the standard deviation was 0.270.

Some assays have multiple target sequences, which can result in distinct Tm distributions for each target sequence. If there is enough separation between these distinct distributions, a prediction of which target sequence was observed could be made from a Tm value with an unknown sequence input. Normalization can improve the performance of a model to predict the sequence (a classification model) by increasing the separation between groups of Tm values from distinct sequences. The measure of distance of support vectors to the classification boundary is used to show an increase in separability.

Figure 40A:
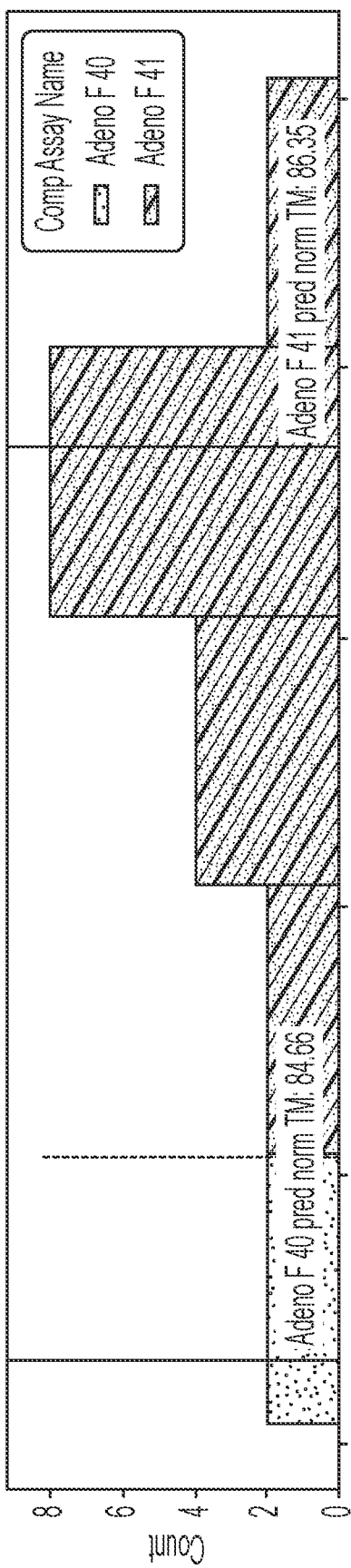
Figure 40B:
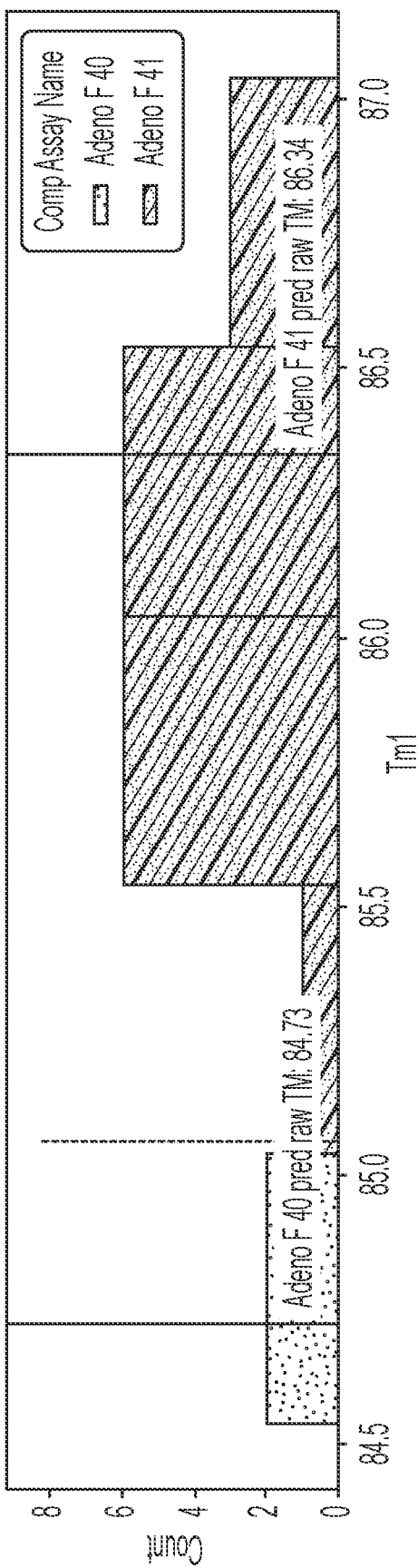
FIG. 40B illustrates raw Tm distributions for Adeno F 40 and Adeno F 41.

FIG. 40A illustrates normalized Tm distributions for Adeno F 40 and Adeno F 41 (two serotypes of Adenovirus), while FIG. 40B illustrates raw Tm distributions for Adeno F 40 and Adeno F 41. As shown in FIG. 40A, the predicted normalized Tm value for Adeno F 40 was 84.66, while the predicted normalized Tm value for Adeno F 41 was 86.35. As shown in FIG. 40B, the raw normalized Tm value for Adeno F 40 was 84.73, while the predicted normalized Tm value for Adeno F 41 was 86.34. As shown in FIG. 40A, the distance of support vector from the classification boundary for the normalized Tm distributions for Adeno F 40 and Adeno F 41 was 0.46, while (as shown in FIG. 40B), the distance of support vector from the classification boundary for the normalized Tm distributions for Adeno F 40 and Adeno F 41 was 0.39.

Figure 41A:
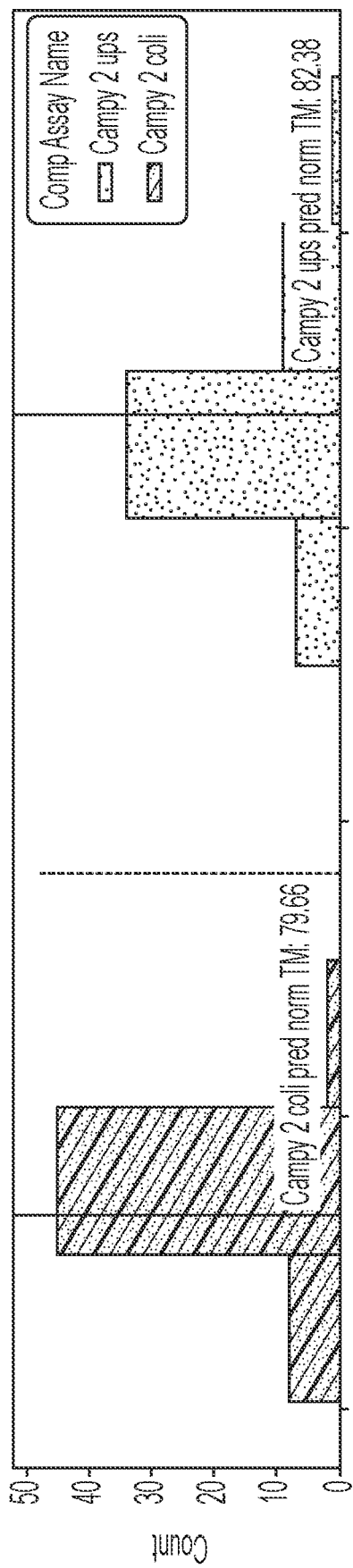
Figure 41B:
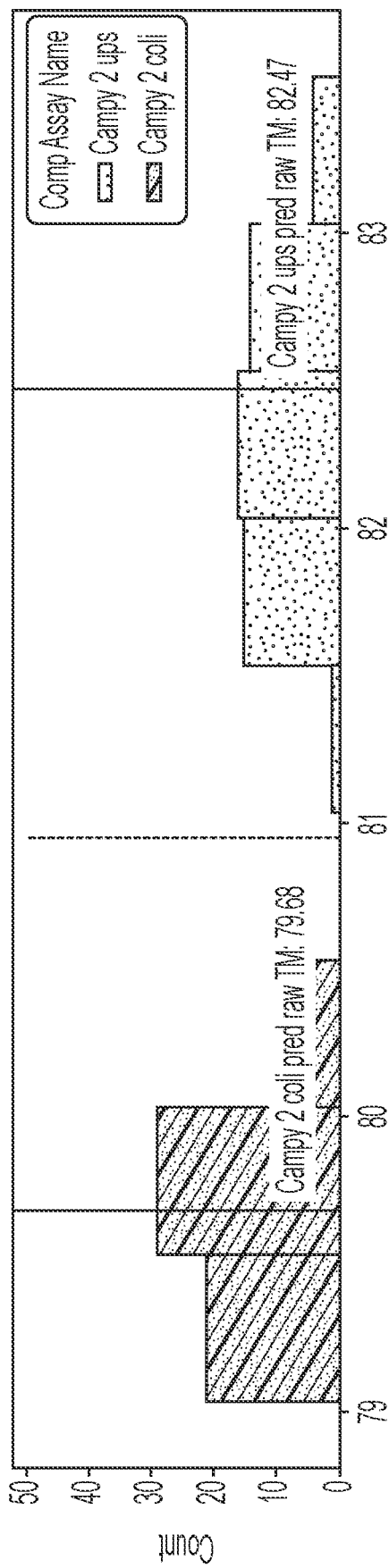
FIG. 41B illustrates raw Tm distributions for Campy 2 ups and Campy 2 coli.

FIG. 41A illustrates normalized Tm distributions for Campy 2 ups and Campy 2 coli, while FIG. 41B illustrates raw Tm distributions for Campy 2 ups and Campy 2 coli. As shown in FIG. 41A, the predicted normalized Tm value for Campy 2 coli was 79.66, while the predicted normalized Tm value for Campy 2 ups was 82.38. As shown in FIG. 41B, the raw normalized Tm value for Campy 2 coli was 79.68, while the predicted normalized Tm value for Campy 2 ups was 82.47. As shown in FIG. 41A, the distance of support vector from the classification boundary for the normalized Tm distributions for Adeno F 40 and Adeno F 41 was 0.71, while (as shown in FIG. 41B), the distance of support vector from the classification boundary for the normalized Tm distributions for Adeno F 40 and Adeno F 41 was 0.51.

FIG. 42A illustrates normalized Tm distributions for Cdiff ToxA and Cdiff ToxB, while FIG. 42B illustrates raw Tm distributions for Cdiff ToxA and Cdiff ToxB. As shown in FIG. 42A, the predicted normalized Tm value for Cdiff ToxB was 76.75, while the predicted normalized Tm value for Cdiff ToxA was 79.22. As shown in FIG. 42B, the raw normalized Tm value for Cdiff ToxB was 76.76, while the predicted normalized Tm value for Cdiff ToxA was 79.29. As shown in FIG. 42A, the distance of support vector from the classification boundary for the normalized Tm distributions for Adeno F 40 and Adeno F 41 was 0.57, while (as shown in FIG. 42B), the distance of support vector from the classification boundary for the normalized Tm distributions for Adeno F 40 and Adeno F 41 was 0.36.

Example 11

While Tm normalization accounts for array-wide effects, Cp normalization can account for assay specific effects. Combining these normalizations can further increase the precision of the Tm measurement. It has been observed that higher concentrations of dsDNA binding dyes (such as LCGreen Plus) lead to increases in Tm. This is thought to be due to DNA bound with the dsDNA binding dye requiring slightly more energy in order for the strands to disassociate. Generally speaking, a lower final concentration of template will lead to higher amounts of bound dye per template strand, resulting in higher Tms. It is possible to estimate final concentration using assay Cp, and therefore normalize the Tms to account for this effect. It is understood that the magnitude of this effect will vary from dye to dye, and the Cp correction may need to be adjusted accordingly.

732 total pouches were run, with 246 alpha, 243 beta, and 243 gamma, each of which are sets of target nucleic acids that should result in amplification of a specific subset of the targets on the panel. The data from these pouches were normalized based on a mean control Tm value, based on previous data. The analyte assay Tm value was shifted by the deviation from the mean control Tm value.

The normalized Tm was calculated as follows, using an Independent of Linear Model:

$$\text{NormTm}_{P,A,i} = \text{Tm}_{P,A,i} + (\text{Control Tm}_{R,C} - \text{Control Tm}_{P,C})$$

where P indicates the pouch, A indicates the analyte assay, i indicates the replicate of the assay, $\text{NormTm}_{P,A,i}$ is the normalized Tm, $\text{Tm}_{P,A,i}$ is the observed Tm, Control $\text{Tm}_{R,C}$ is the reference (R) Tm for the control assay (C), and Control $\text{Tm}_{P,C}$ is the characteristic Tm for the pouch of the control assay. As discussed above, FIG. 11 shows an example graph illustrating normalization independent of a linear model, where "d", the difference between the Tm value for the control and the mean Tm value for the control, is added to the Tm value for the analyte assay based on previous data to normalize the analyte assay Tm.

An example method for normalizing Cp as well as Tm is as follows: Step 1: Apply Tm normalization with control assay(s) using the Independent of Linear Model method discussed above. For example, the observed Tm for Rotoavirus A target 2 ("RotaA 2") replicate is 76.86. This is $\text{Tm}_{P,RotaA\ 2,i}$ where P and i are for an arbitrary pouch and replicate. The observed characteristic PCR2 Tm for RotaA 2 replicate is 75.52. This is $\text{Tm}_{P,PCR2}$. The reference PCR2 Tm for RotaA 2 replicate is 76.1 (mid-point of Tm Range). This is $\text{Tm}_{R,PCR2}$.

$$\text{NormTm}_{P,RotaA\ 2,i} = \text{Tm}_{P,RotaA\ 2,i} + (\text{Tm}_{R,PCR2} - \text{Tm}_{P,PCR2})$$

$$\text{NormTm}_{P,RotaA\ 2,i} = 76.86 + (76.1 - 75.52)$$

$$\text{NormTm}_{P,RotaA\ 2,i} = 77.44$$

Figure 43:
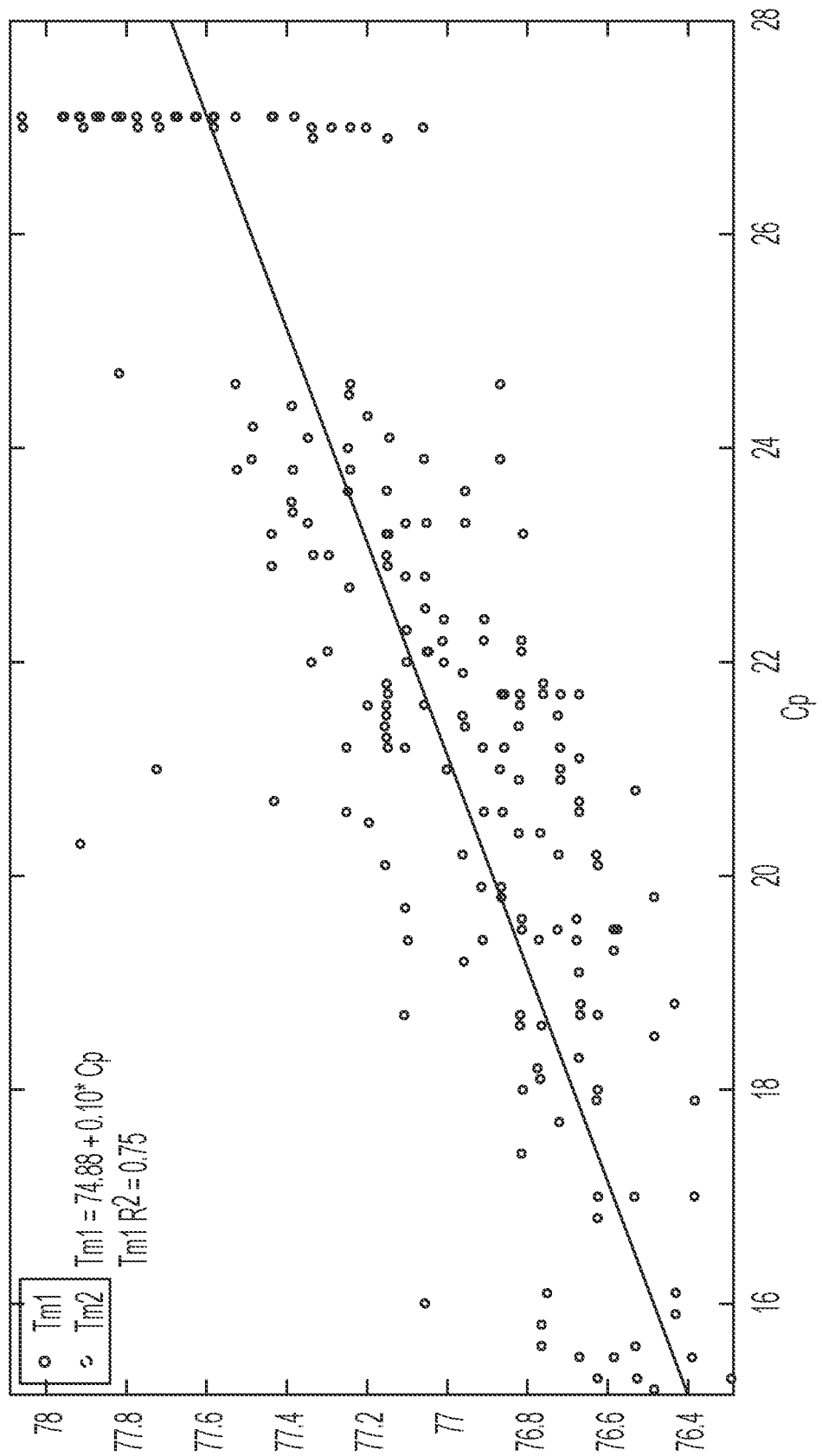
FIG. 43 illustrates a graph of Tm versus Cp for RotaA 2.

Step 2: Determine the effect of Cp on normalized Tm for the analyte assay generally. This is based on a reference set of data from multiple pouches producing a range of Cps for each assay. For instance, FIG. 43 illustrates a graph of Tm versus Cp for RotaA 2. A linear regression model of the data shown in FIG. 43 shows that Tm=74.88+0.10*Cp, with an R2 value of 0.75.

Step 3: Set a reference Cp value for the analyte assay. In the RotaA 2 example, the mean of the data being used is 20.3. This is $\text{RefCp}_{RotaA\ 2}$.

Step 4: Calculate the effect of Cp on the normalized Tm for the analyte assay within a pouch of interest by comparing the expected Tm for the observed analyte assay Cp to the observed normalized Tm for the observed analyte assay Cp. In the RotaA 2 example, the RotaA 2 observed Cp is 23.2. This is $\text{ObsCP}_{P,Rota\ A\ 2,i}$, and $\text{NormTm}_{P,RotaA\ 2,i}$ is 77.44. The estimated Tm of the reference Cp is 76.91. This is $\text{EstTm}_{Ref\ Cp\ (RotaA\ 2)}$. The estimated Tm of the observed Cp is 77.20. This is $\text{EstTm}_{Obs\ Cp\ (RotaA\ 2)}$. The difference between these estimates is $\text{EstTm}_{Ref\ Cp\ (RotaA\ 2)} - \text{EstTm}_{Obs\ Cp\ (RotaA\ 2)} = -0.29$.

Step 5: Apply the calculated effect of Cp on Tm for the analyte assay to the observed normalized Tm. The Cp-normalized RotaA 2 Tm is equal to the normalized RotaA 2 Tm plus the difference between the estimated Tms for the reference and observed Cps, i.e., $$\text{CpNormTm}_{P,RotaA\ 2,i} = \text{NormTm}_{P,RotaA\ 2,i} + (\text{EstTm}_{Ref\ Cp\ (RotaA\ 2)} - \text{EstTm}_{Obs\ Cp\ (RotaA\ 2)}),$$

where P indicates the pouch, A indicates the analyte assay, i indicates the replicate of the assay, Ref Cp is the reference Cp of the assay, and Obs Cp is the observed Cp for the assay replicate (i) in the pouch. Using the values for Rota A 2, the Cp Normalized RotaA 2 Tm is:

$$\text{CpNormTm}_{P,RotaA\ 2,i} = 77.4 + (76.91 - 77.20)$$

$$\text{CpNormTm}_{P,RotaA\ 2,i} = 77.11.$$

Figure 44:
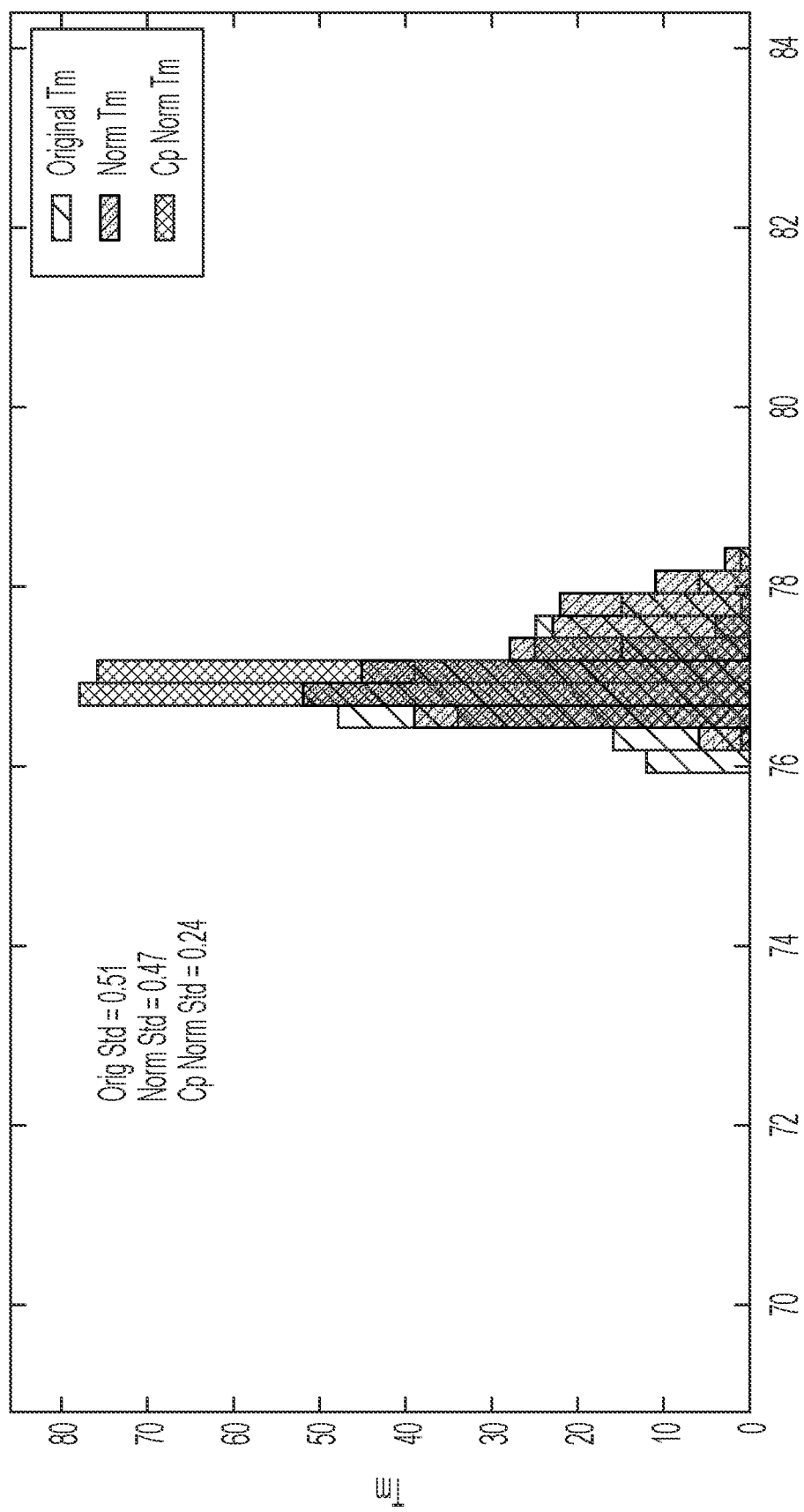
FIG. 44 is a histogram illustrating Rota A 2 Tm value distributions for each normalization method.
Figure 45:
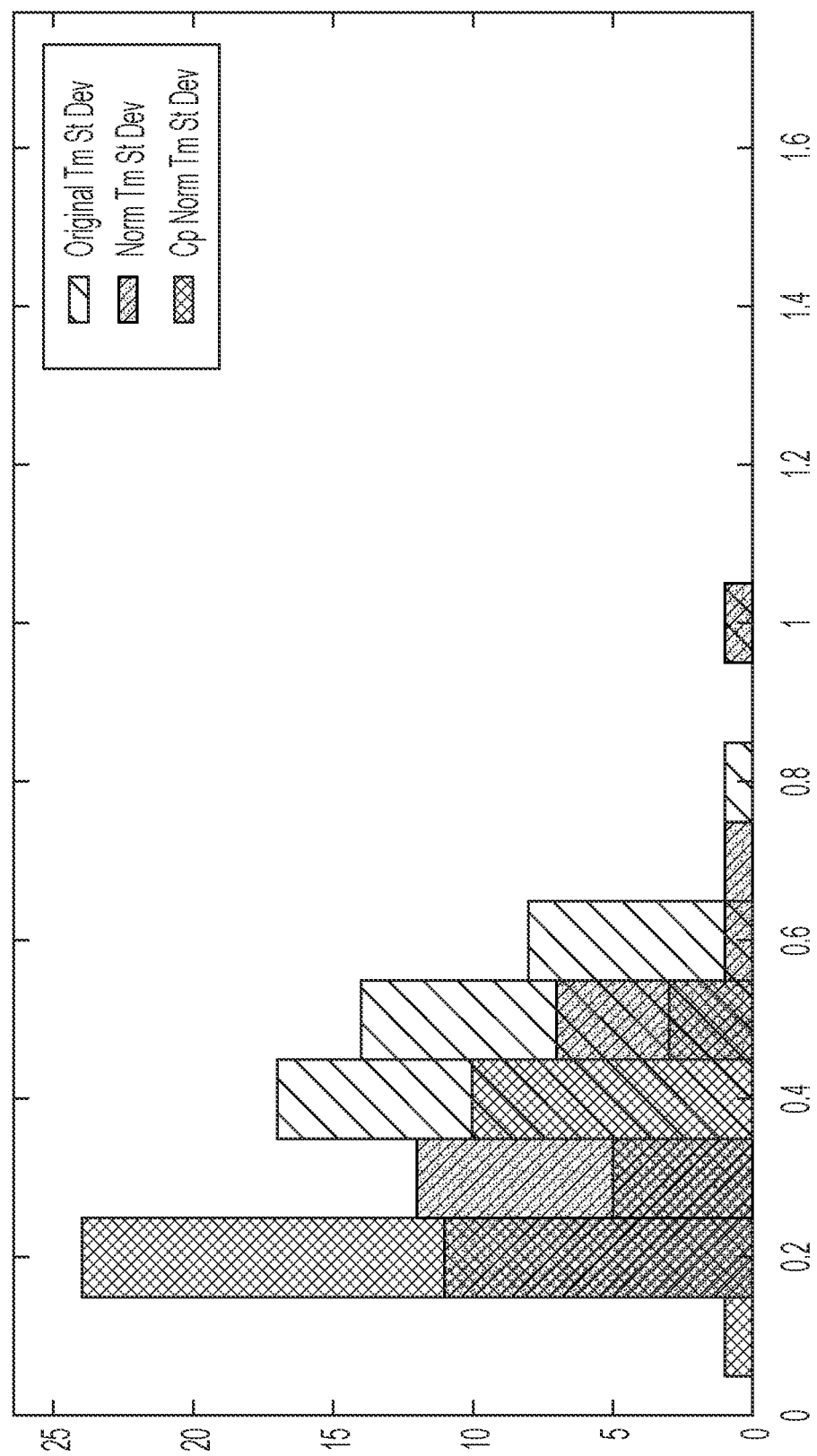
FIG. 45 is a histogram illustrating Rota A 2 Tm standard deviations for each normalization method.

FIG. 44 is a histogram illustrating Rota A 2 Tm value distributions for each normalization method (i.e., raw Tm values, normalized Tm values, and Cp-normalized Tm values). As shown in FIG. 44, the standard deviation for the raw Tm values is 0.51, the standard deviation for normalized Tm values is 0.47, and the standard deviation for Cp-normalized Tm values is 0.24. FIG. 45 is a histogram illustrating Rota A 2 Tm standard deviation distributions for each normalization method (i.e., raw Tm standard deviation values, normalized Tm standard deviation values, and Cp-normalized Tm standard deviation values).

Both the Independent of Linear Model Tm normalization alone, and the additional Cp normalization methods reduce the standard deviation of Tms. The additional Cp normalization method consistently reduces the Tm standard deviation more than non-normalized and the independent of linear model method alone.

Example 12

Tm and Cp based normalization techniques not only reduce the standard deviation of a single sequence across multiple runs but also further separate the distribution of melt profiles of different sequences.

As an example, the assays for influenza A on a panel were divided into two pan assays (FluA-pan1 and FluA-pan2), and two subtype specific assays (FluA-H1-2009 and FluA-H3). When the H1-2009 subtype was run on the panel, both pan assays and the FluA-H1-2009 assay were activated, but not the FluA-H3 assay. The opposite is true for the H3 subtype (i.e., both pan assays and the FluA-H3-2009 assay were activated, but not the FluA-H1 assay). The sequences between the two pan assay primers are known to be different, and therefore have different melting profiles for the pan assays based on which sub-type is present.

A preliminary level of detection (LOD) study was performed where all panel organisms tested at various concentrations. There are a total of 721 Total Pouches runs, but only 29 FluA-H1-2009 and 25 FluA-H3 positives. The runs with positive FluA-H1-2009, and FluA-H3 results were known to have the respective viruses spiked in at various input concentrations, and the sub-typing assay results confirmed this. The average Tm of the replicates for the FluA-pan1 and FluA-pan2 assays was used, rather than the individual replicates themselves.

The true classification of a run is determined by which subtype assay was positive—Class$_P$. Tm Normalization was applied with control assay(s) using the Independent of Linear Model method—NormTm$_{P, FluA-pan1, i}$ and averaged across the replicates (i) to obtain NormTm$_{P, FluA-pan1}$. Cp Normalization was applied based on the assay specific effect of Cp on Tm and averaged across replicates to obtain CpNormTm$_{P, FluA-pan1}$.

A 5-fold cross-validation was performed on a classification model to identify the FluA sub-type based on the raw Tm values, normalized Tm values, and the Tm values normalized for both Cp and Tm. The cross-validated accuracy scores were then compared to determine whether the normalization techniques provided enhanced capabilities of classifying the FluA pan assay results.

The classification model used for this analysis was a regularized (L2) logistic regression model:

$$pr(Class_p = FluA\ H3 \mid Xp_A) = \frac{1}{1 + e^{-(\beta_0 + \beta_1 * Xp_A)}}$$

where $Xp_A$ is $Tmp_A$, $NormTmp_A$, and $CpNormTmp_A$ for the respective models.

Here, the probability of a sample Tm being positive for class p was given as function of the coefficients $\beta_0$ and $\beta_1$. Coefficients $\beta_0$ and $\beta_1$ were determined by optimizing them for the training data set. Independent models were fit for both A=FluA-pan1 and FluA-pan2.

In order to estimate the accuracy of the model without biasing the model results by fitting the model parameters on the same data that the model is evaluated, a 5-fold cross-validation was performed. The data set was randomly split into 5 groups with roughly the same number of observations in each of the groups. The classification model was then fit on four of the five groups with the fifth group being left out. The model was then used to evaluate the data from that fifth group and the predicted classification results from the model are compared against the known classes of the data to get an estimate of the model accuracy. This was repeated so that each of the five groups were withheld during one model fitting, and used to evaluate the model accuracy.

This cross-validation was performed for predicting the sub-type using the raw Tm, NormTm, and CpNormTm for each FluA-pan assay independently. The average of the accuracy across the five folds was used as the estimate of overall model accuracy.

Figure 46:
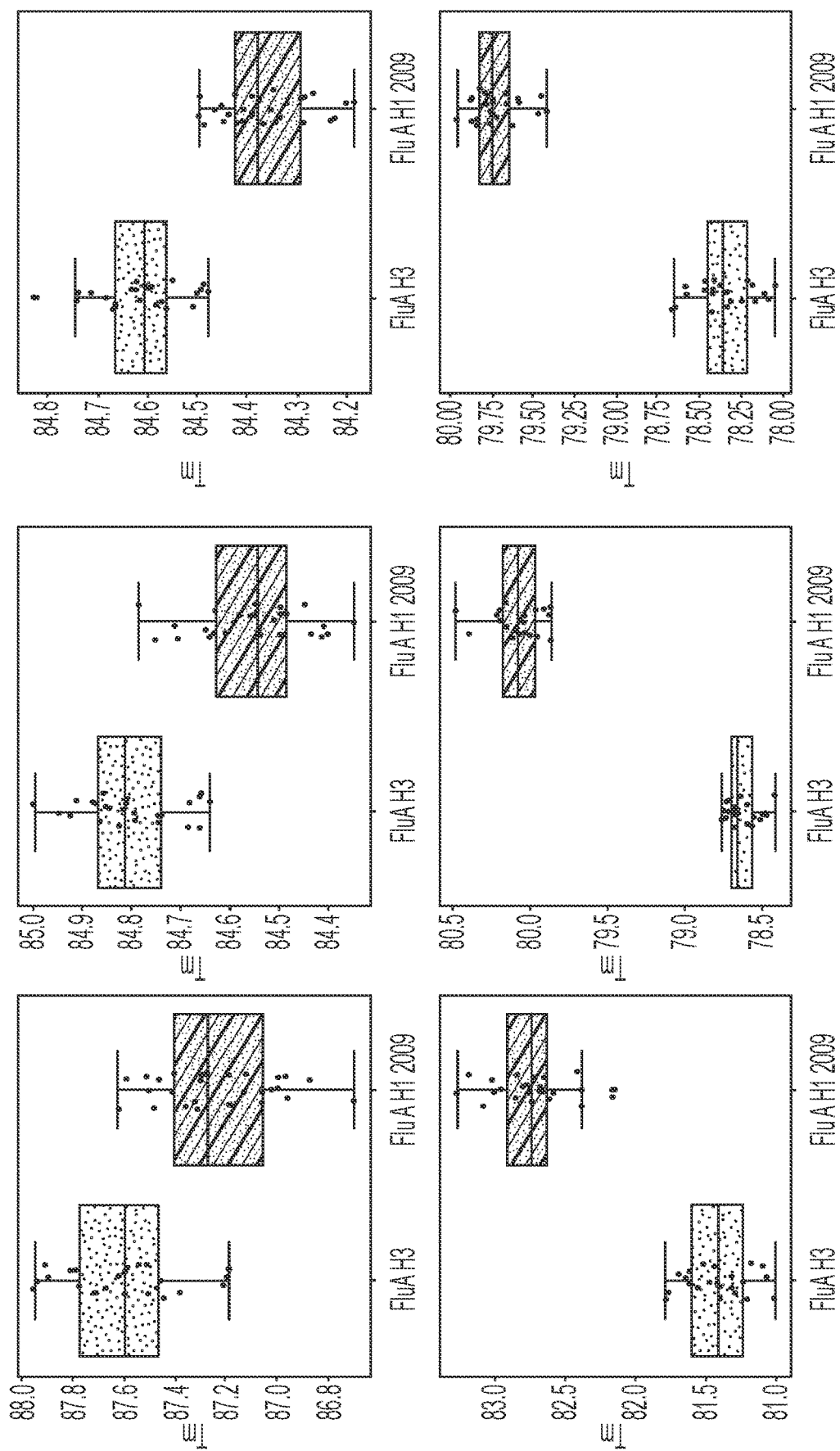
FIG. 46 illustrates raw, Tm-normalized, and Cp-normalized Tm distributions for FluA-pan1 and FluA-pan2 assays of FluA H3 and FluA H1 2009.

FIG. 46 illustrates raw, Tm-normalized, and Cp-normalized Tm distributions for FluA-pan1 and FluA-pan2 assays of FluA H3 and FluA H1 2009. As shown in FIG. 46, the distributions of pouches that ran an H3 subtype vs an H1-2009 subtype improved as Tm normalizations and Cp normalizations were performed. FIG. 47 illustrates the cross-validated accuracy results for raw, Tm-normalized, and Cp-normalized Tm distributions for FluA-pan1 and FluA-pan2 assays. As shown in FIG. 47, accuracy of the model used to distinguish between pouches that ran H3 subtype vs H1-2009 subtype improved as Tm normalizations and Cp normalizations were performed.

Utilizing the discriminatory power of the normalization techniques, it is possible to identify which subtype was run on a panel via the melt profiles of the pan1 and pan2 assays alone. The subtype specific assays were then used as confirmation. The subtype populations of FluA-H1-2009 and FluA-H3 can be distinguished based on the common melt profiles of FluA-pan1 and FluA-pan2. The profiles in FluA-pan2 are different enough to distinguish without normalization, with an accuracy score of 100% across all normalization levels. The profiles in FluA-pan1 are better distinguished when normalization is applied to the melt profiles. An increase in cross-validated accuracy is seen when Tm normalization is applied, and further accuracy increase when Cp and Tm normalizations are applied.

Example 13

Certain embodiments of the present invention may also involve or include a PCR system configured to generate a pouch-specific range of Tm values to be used for calling a sample positive or negative for a target nucleic acid sequence in a given pouch. Illustrative examples of PCR systems are described in U.S. Pat. No. 8,895,295, already incorporated by reference, for use with pouch 510 or similar embodiments. However, it is understood that the embodiments described in U.S. Pat. No. 8,895,295 are illustrative only and other systems may be used according to this disclosure. For example, referring to FIG. 48, a block diagram of an illustrative system 4800 that includes control element 4802, a thermocycling element 4808, and an optical element 4810 according to exemplary aspects of the disclosure is shown.

In at least one embodiment, the system may include at least one PCR reaction mixture housed in sample vessel 4814. In certain embodiments, the sample vessel 4814 may include a PCR reaction mixture configured to permit and/or effect amplification of a template nucleic acid. Certain illustrative embodiments may also include at least one sample block or chamber 4816 configured to receive a plurality of sample vessels 4814. The sample vessel 4814 may include any plurality of sample vessels in individual, strip, plate, or other array format, and, illustratively, may be provided as or received by a sample block or chamber 4816. In one example, one of the sample vessels 4814 may include a control sample containing a (known) control nucleic acid sequence, and another one of the sample vessels 4814 may include an experimental sample of unknown composition.

One or more embodiments may also include at least one sample temperature controlling device 4818 and/or 4820 configured to manipulate and/or regulate the temperature of the sample(s). Such a sample temperature controlling device may be configured to raise, lower, and/or maintain the temperature of the sample(s). In one example, sample controlling device 4818 is a heating system and sample controlling device 4820 is a cooling system. Illustrative sample temperature controlling devices include (but are not limited to) heating and/or cooling blocks, elements, exchangers, coils, radiators, refrigerators, filaments, Peltier devices, forced air blowers, handlers, vents, distributors, compressors, condensers, water baths, ice baths, flames and/or other combustion or combustible forms of heat, hot packs, cold packs, dry ice, dry ice baths, liquid nitrogen, microwave- and/or other wave-emitting devices, means for cooling, means for heating, means for otherwise manipulating the temperature of a sample, and/or any other suitable device configured to raise, lower, and/or maintain the temperature of the sample(s).

The illustrative PCR system 4800 also includes an optical system 4810 configured to detect an amount of fluorescence emitted by the samples 4814 (or portions or reagents thereof). Such an optical system 4810 may include one or more fluorescent channels, as are known in the art, and may simultaneously or individually detect fluorescence from a plurality of samples.

At least one embodiment of the PCR system may further include a CPU 4806 programmed or configured to operate, control, execute, or otherwise advance the heating system 4818 and cooling system 4820 to thermal cycle the PCR reaction mixture, illustratively while optical system 4810 collects fluorescent signal. CPU 4806 may then generate an amplification curve, a melting curve, or any combination, which may or may not be printed, displayed on a screen of the user terminal 4804, or otherwise outputted. In particular, the CPU 4806 may. Optionally, a positive, negative, or other call may be outputted based on the amplification and/or melting curve for example on the screen of the user terminal 4804. Optionally only the calls are outputted, illustratively one call for each target tested.

The CPU 4806 may include a program memory, a microcontroller or a microprocessor (MP), a random-access memory (RAM), and an input/output (I/O) circuit, all of which are interconnected via an address/data bus. The program memory may include an operating system such as Microsoft Windows®, OS X®, Linux®, Unix®, etc. In some embodiments, the CPU 4806 may also include, or otherwise be communicatively connected to, a database or other data storage mechanism (e.g., one or more hard disk drives, optical storage drives, solid state storage devices, etc.). The database may include data such as melting curves, annealing temperatures, denaturation temperatures, expected Tm values for various target nucleic acid sequences and associated ranges of Tm values for calling a sample positive or negative for a target nucleic acid sequence, array-specific data, control sample data, and other data necessary to generate and analyze melting curves. The CPU 4806 may include multiple microprocessors, multiple RAMS, and multiple program memories as well as a number of different types of I/O circuits. The CPU 4806 may implement the RAM(s) and the program memories as semiconductor memories, magnetically readable memories, and/or optically readable memories, for example.

The microprocessors may be adapted and configured to execute any one or more of a plurality of software applications and/or any one or more of a plurality of software routines residing in the program memory, in addition to other software applications. One of the plurality of routines may include a thermocycling routine which may include providing control signals to the heating system 4818 and the cooling system 4820 to heat and cool the samples in the array of sample vessels 4814 respectively, in accordance with the two-step PCR protocol. Another of the plurality of routines may include a fluorescence routine which may include providing control signals to the optical system 4810 to emit a fluorescence signal and detect the amount of fluorescence scattered by the samples 4814 during the thermocycling routine. Yet another of the plurality of routines may include a sample calling routine which may include obtaining fluorescence data (temperature, fluorescence pairs) from the optical system 4810. Another of the plurality of routines may include a routine for generating a control melting curve based on the fluorescence data for a control sample (of the samples 4814) containing a (known) control nucleic acid sequence.

Additionally, another of the plurality of routines may include a routine for identifying a Tm value for the control sample based on the control melting curve, and for comparing the identified Tm value for the control sample to an expected Tm value for the control nucleic acid sequence to calculate a relationship between the expected Tm value for the control nucleic acid sequence and the identified Tm value for the control sample. Furthermore, another of the plurality of routines may include a routine for generating an array-specific range of Tm values for a given target nucleic acid sequence in the same pouch as the control sample by applying the calculated relationship between the expected Tm value for the control nucleic acid sequence and the identified Tm value for the control sample to an expected Tm value for the target nucleic acid sequence. Moreover, in some examples, another of the plurality of routines may include a routine for generating an experimental melting curve based on the fluorescence data for an experimental sample (of the samples 4814) in the same array as the control sample. Furthermore, another of the plurality of routines may include a routine for calling the experimental sample positive or negative for the target nucleic acid sequence based on whether the Tm value of the experimental sample falls within the array-specific range of Tm values for the target nucleic acid sequence, and displaying an indication of the call on the user terminal 4804.

In some embodiments, the CPU 4806 may communicate with the user terminal 4804, the heating system 4818, the cooling system 4820, the optical system 4810, and the sample block 4816 over a communication network 4822-4834 via wired or wireless signals and, in some instances, may communicate over the communication network via an intervening wireless or wired device, which may be a wireless router, a wireless repeater, a base transceiver station of a mobile telephony provider, etc. The communication network may be a wireless communication network such as a fourth- or third-generation cellular network (4G or 3G, respectively), a Wi-Fi network (802.11 standards), a WiMAX network, a wide area network (WAN), a local area network (LAN), the Internet, etc. Furthermore, the communication network may be a proprietary network, a secure public Internet, a virtual private network and/or some other type of network, such as dedicated access lines, plain ordinary telephone lines, satellite links, combinations of these, etc. Where the communication network comprises the Internet, data communication may take place over the communication network via an Internet communication protocol. Still further, the communication network may be a wired network where data communication may take place via Ethernet or a Universal Serial Bus (USB) connection.

In some embodiments, the CPU 4806 may be included within the user terminal 4804. In other embodiments, the CPU 4806 may communicate with the user terminal 4804 via a wired or wireless connection (e.g., as a remote server) to display melting curves, calls, etc. on the user terminal 4804. The user terminal 4804 may include a user interface, a communication unit, and a user-input device such as a "soft" keyboard that is displayed on the user interface of the user terminal 4804, an external hardware keyboard communicating via a wired or a wireless connection (e.g., a Bluetooth keyboard), an external mouse, or any other suitable user-input device in addition to the CPU 4806 or another CPU similar to the CPU 4806.

Additional examples of illustrative features, components, elements, and or members of illustrative PCR systems and/or thermal cyclers (thermocyclers) are known in the art and/or described above or in U.S. Patent Application No. 2014-0273181, the entirety of which is herein incorporated by reference.

Aspects

Embodiments of the techniques described in the present disclosure may include any number of the following aspects, either alone or combination:

1. A method for generating an array-specific range of Tm values to be used for calling a sample positive or negative for a target nucleic acid sequence in a given array, the method comprising: providing, in an array, a control sample well with a control sample containing a control nucleic acid sequence, primers configured for amplifying the control nucleic acid sequence, a fluorescent dye, and components for amplification; amplifying the control sample by thermal cycling the control sample well; measuring, by an optical system, fluorescent data during or subsequent to the amplification of the control sample; generating, by a processor, a control melting curve using the fluorescent data; identifying, by the processor, based on the control melting curve, a Tm value for the control sample; comparing, by the processor, the identified Tm value for the control sample to an expected Tm value for the control nucleic acid sequence; calculating, by the processor, based on the comparing, a relationship between the identified Tm value for the control sample and the expected Tm value for the control nucleic acid sequence; and generating, by the processor, the array-specific range of Tm values for the target nucleic acid sequence by applying the calculated relationship between the expected Tm value for the control nucleic acid sequence and the identified Tm value for the control sample to a pre-determined range of Tm values for the target nucleic acid sequence.

2. The method of aspect 1, further comprising: providing, in the array, an experimental sample well with an experimental sample, primers configured for amplifying the target nucleic acid sequence, the fluorescent dye, and components for amplification; amplifying the experimental sample by thermal cycling the experimental sample well; measuring, by an optical system, fluorescent data during or subsequent to the amplification of the experimental sample; generating, by the processor, an experimental melting curve using the fluorescent data; identifying, by the processor, based on the experimental melting curve, a Tm value for the experimental sample in the array; and calling, by the processor, the experimental sample positive or negative for the target nucleic acid sequence based on whether the Tm value of the experimental sample falls within the array-specific range of Tm values for the target nucleic acid sequence.

3. The method of aspect 2, the method further comprising: comparing, by the processor, the Tm value for the experimental sample in the array to one or more known Tm values associated with one or more respective nucleic acid sequences; and determining, by the processor, which of the one or more nucleic acid sequences is most likely to correspond to the experimental sample based on the comparison.

4. The method of any of aspects 2 or 3, the method further comprising: comparing, by the processor, the Tm value for the experimental sample in the array to one or more known Tm values associated with one or more respective nucleic acid sequences; and determining, by the processor, based on the comparison, that the Tm value for the experimental sample in the array differs from each of the one or more known Tm values by greater than a threshold Tm value amount; and determining, by the processor, that the experimental sample in the array corresponds to a novel nucleic acid sequence that is distinct from any of the one or more nucleic acid sequences.

5. The method of any of aspects 2-4, the method further comprising: determining, by the processor, a number of positive calls for the target nucleic acid sequence in an institution population for an institution associated with the experimental sample; determining, by the processor, a number of negative calls for the target nucleic acid sequence in the institution population; determining, by the processor, based on the number of positive calls and negative calls in the institution population, a first rate of positive calls for the target nucleic acid sequence in the institution population; obtaining, by the processor, a number of positive calls for the target nucleic acid sequence in a community population for a community associated with the experimental sample; obtaining, by the processor, a number of negative calls for the target nucleic acid sequence in the community population; determining, by the processor, based on the number of positive calls and negative calls in the community population, a second rate of positive calls for the target nucleic acid sequence in the community population; determining, based on comparing the first rate to the second rate, whether a pathogen associated with the target nucleic acid sequence was likely acquired from the institution or from the community.

6. The method of aspect 5, wherein the institution is a hospital or a hospital system.

7. The method of any of aspects 1-6, wherein the array-specific range of Tm values for the target nucleic acid sequence is a normalized range of Tm values for the target nucleic acid sequence.

8. The method of aspect 7, wherein the array-specific range of Tm values for the target nucleic acid sequence is normalized based on a linear relationship between previous Tm values of the target nucleic acid sequence and previous values of the control nucleic acid sequence from previous array runs.

9. The method of any of aspects 1-8, wherein the pre-determined range of Tm values for the target nucleic acid sequence is calculated based on previous identified Tm values for the target nucleic acid sequence.

10. The method of any of aspects 1-10, wherein the array-specific range of Tm values for the target nucleic acid sequence is narrower than the pre-determined range of Tm values for the target nucleic acid sequence.

11. The method of any of aspects 2-10, wherein the control sample well and experimental sample well are thermal cycled during the same array run.

12. The method of any of aspects 2-11, further comprising: obtaining, by the processor, a general relationship between Cp and Tm for the target nucleic acid sequence based on a reference dataset including a plurality of Cp values and Tm values for the target nucleic acid sequence from a respective plurality of arrays; obtaining, by the processor, a reference Cp value for the target nucleic acid sequence; calculating, by the processor, a first estimated Tm for the target nucleic acid sequence by applying the general relationship to the reference Cp value; identifying, by the processor, an observed Cp value for the experimental sample in the array; calculating, by the processor, a second estimated Tm for the target nucleic acid sequence by applying the general relationship to the observed Cp value for the observed experimental sample; calculating, by the processor, an array-specific relationship between Cp and Tm for the target nucleic acid sequence by comparing the first estimated Tm to the second estimated Tm for the target nucleic acid sequence; and generating, by the processor, a Cp-normalized array-specific range of Tm values for the target nucleic acid sequence by applying the array-specific relationship between Cp and Tm for the target nucleic acid sequence to the generated array-specific range of Tm values for the target nucleic acid sequence.

13. A system for generating an array-specific range of Tm values to be used for calling a sample positive or negative for a target nucleic acid sequence in a given array, the system comprising: an array housing a plurality of sample wells, including a control sample well configured to house a control sample containing a control nucleic acid sequence; one or more temperature controlling devices configured to amplify the control sample by thermal cycling the control sample well; an optical system configured to detect an amount of fluorescence emitted by the control sample; and a controller configured to: receive, from the optical system, data indicative of the amount of fluorescence emitted by the control sample during or subsequent to the amplification; generate a control melting curve using the data indicative of the amount of fluorescence emitted by the control sample during or subsequent to the amplification; identify, based on the control melting curve, a Tm value for the control sample; compare the identified Tm value for the control sample to an expected Tm value for the control nucleic acid sequence; calculate, based on the comparing, a relationship between the identified Tm value for the control sample and the expected Tm value for the control nucleic acid sequence; and generate the array-specific range of Tm values for the target nucleic acid sequence by applying the calculated relationship between the expected Tm value for the control nucleic acid sequence and the identified Tm value for the control sample to a pre-determined range of Tm values for the target nucleic acid sequence.

14. The system of aspect 13, wherein the array is part of a closed system sample vessel that also includes a sample preparation zone.

15. The system of any of aspect 13 or aspect 14, wherein the array further houses an experimental sample well configured to house an experimental sample, wherein the one or more temperature controlling devices are further configured to amplify the experimental sample by thermal cycling the experimental sample well, wherein the optical system is further configured to detect an amount of fluorescence emitted by the experimental sample; wherein the controller is further configured to: receive, from the optical system, data indicative of the amount of fluorescence emitted by the experimental sample during or subsequent to the amplification; generate an experimental melting curve using the data indicative of the amount of fluorescence emitted by the experimental sample during or subsequent to the amplification; identify, based on the experimental melting curve, a Tm value for the experimental sample; and call the experimental sample positive or negative for the target nucleic acid sequence based on whether the Tm value of the experimental sample falls within the array-specific range of Tm values for the target nucleic acid sequence.

16. The system of aspect 15, wherein controller is further configured to: compare the Tm value for the experimental sample in the array to one or more known Tm values associated with one or more respective nucleic acid sequences; and determine which of the one or more nucleic acid sequences is most likely to correspond to the experimental sample based on the comparison.

17. The system of any of aspect 15 or aspect 16, wherein the controller is further configured to: compare the Tm value for the experimental sample in the array to one or more known Tm values associated with one or more respective nucleic acid sequences; and determine, based on the comparison, that the Tm value for the experimental sample in the array differs from each of the one or more known Tm values by greater than a threshold Tm value amount; and determine that the experimental sample in the array corresponds to a novel nucleic acid sequence that is distinct from any of the one or more nucleic acid sequences based on the determination that the Tm value for the experimental sample in the array differs from each of the one or more known Tm values by greater than a threshold Tm value amount.

18. The system of any of aspects 15-17, wherein the controller is further configured to: determine a number of positive calls for the target nucleic acid sequence in an institution population for an institution associated with the experimental sample; determine a number of negative calls for the target nucleic acid sequence in the institution population; determine, based on the number of positive calls and negative calls in the institution population, a first rate of positive calls for the target nucleic acid sequence in the institution population; obtain a number of positive calls for the target nucleic acid sequence in a community population for a community associated with the experimental sample; obtain a number of negative calls for the target nucleic acid sequence in the community population; determine based on the number of positive calls and negative calls in the community population, a second rate of positive calls for the target nucleic acid sequence in the community population; determine, based on comparing the first rate to the second rate, whether a pathogen associated with the target nucleic acid sequence was likely acquired from the institution or from the community.

19. The system of aspect 18, wherein the institution is a hospital or a hospital system.

20. The system of any of aspects 13-19, wherein the array-specific range of Tm values for the target nucleic acid sequence is a normalized range of Tm values for the target nucleic acid sequence.

21. The system of aspect 20, wherein the array-specific range of Tm values for the target nucleic acid sequence is normalized based on a linear relationship between previous Tm values of the target nucleic acid sequence and previous values of the control nucleic acid sequence from previous array runs.

22. The system of any of aspects 13-21, wherein the pre-determined range of Tm values for the target nucleic acid sequence is calculated based on previous identified Tm values for the target nucleic acid sequence.

23. The system of any of aspects 13-22, wherein the array-specific range of Tm values for the target nucleic acid sequence is narrower than the pre-determined range of Tm values for the target nucleic acid sequence.

24. The system of any of aspects 15-23, wherein the control sample well and experimental sample well are thermal cycled during the same array run.

25. The system of any of aspects 15-24, wherein the controller is further configured to: obtain a general relationship between Cp and Tm for the target nucleic acid sequence based on a reference dataset including a plurality of Cp values and Tm values for the target nucleic acid sequence from a respective plurality of arrays; obtain a reference Cp value for the target nucleic acid sequence; identify an observed Cp value for the experimental sample in the array; calculate a first estimated Tm for the target nucleic acid sequence by applying the general relationship to the reference Cp value; calculate a second estimated Tm for the target nucleic acid sequence by applying the general relationship to the observed Cp value for the experimental sample; calculate an array-specific relationship between Cp and Tm for the target nucleic acid sequence by comparing the first estimated Tm to the second estimated Tm for the target nucleic acid sequence; and generate a Cp-normalized array-specific range of Tm values for the target nucleic acid sequence by applying the array-specific relationship between Cp and Tm for the target nucleic acid sequence to the generated array-specific range of Tm values for the target nucleic acid sequence.

26. A computing device for generating an array-specific range of Tm values to be used for calling a sample positive or negative for a target nucleic acid sequence in a given array comprising: one or more processors; and a non-transitory computer-readable memory coupled to the one or more processors and storing thereon instructions that, when executed by the one or more processors, cause the computing device to: provide control signals to a temperature controlling device to amplify a control sample containing a control nucleic acid sequence by thermal cycling a control sample well housing the control sample, wherein the control sample well is housed in an array; receive, from an optical system, data indicative of the amount of fluorescence emitted by the control sample during or subsequent to the amplification; generate a control melting curve using the data indicative of the amount of fluorescence emitted by the control sample during or subsequent to the amplification; identify, based on the control melting curve, a Tm value for the control sample; compare the identified Tm value for the control sample to an expected Tm value for the control nucleic acid sequence; calculate, based on the comparing, a relationship between the identified Tm value for the control sample and the expected Tm value for the control nucleic acid sequence; and generate the array-specific range of Tm values for the target nucleic acid sequence by applying the calculated relationship between the expected Tm value for the control nucleic acid sequence and the identified Tm value for the control sample to a pre-determined range of Tm values for the target nucleic acid sequence.

27. The computing device of aspect 26, wherein the instructions further cause the computing device to: provide control signals to the temperature controlling device to amplify an experimental sample containing an experimental nucleic acid sequence by thermal cycling an experimental sample well housing the experimental sample, wherein the experimental sample well is also housed in the array; receive, from the optical system, data indicative of the amount of fluorescence emitted by the experimental sample during or subsequent to the amplification; generate an experimental melting curve using the data indicative of the amount of fluorescence emitted by the experimental sample during or subsequent to the amplification; identify, based on the experimental melting curve, a Tm value for the experimental sample; and call the experimental sample positive or negative for the target nucleic acid sequence based on whether the Tm value for the experimental sample falls within the array-specific range of Tm values for the target nucleic acid sequence.

28. The computing device of aspect 27, wherein the instructions further cause the computing device to: compare the Tm value for the experimental sample in the array to one or more known Tm values associated with one or more respective nucleic acid sequences; and determine which of the one or more nucleic acid sequences is most likely to correspond to the experimental sample based on the comparison.

29. The computing device of any of aspects 27 or 28, wherein the instructions further cause the computing device to: compare the Tm value for the experimental sample in the array to one or more known Tm values associated with one or more respective nucleic acid sequences; and determine, based on the comparison, that the Tm value for the experimental sample in the array differs from each of the one or more known Tm values by greater than a threshold Tm value amount; and determine that the experimental sample in the array corresponds to a novel nucleic acid sequence that is distinct from any of the one or more nucleic acid sequences based on the determination that the Tm value for the experimental sample in the array differs from each of the one or more known Tm values by greater than a threshold Tm value amount.

30. The computing device of any of aspects 27-29, wherein the experimental sample is called positive for the target nucleic acid sequence, and wherein the instructions further cause the computing device to: determine a number of positive calls for the target nucleic acid sequence in an institution population for an institution associated with the experimental sample; determine a number of negative calls for the target nucleic acid sequence in the institution population; determine, based on the number of positive calls and negative calls in the institution population, a first rate of positive calls for the target nucleic acid sequence in the institution population; obtain a number of positive calls for the target nucleic acid sequence in a community population for a community associated with the experimental sample; obtain a number of negative calls for the target nucleic acid sequence in the community population; determine based on the number of positive calls and negative calls in the community population, a second rate of positive calls for the target nucleic acid sequence in the community population; and determine, based on comparing the first rate to the second rate, whether a pathogen associated with the target nucleic acid sequence was likely acquired from the institution or from the community.

31. The computing device of aspect 30, wherein the institution is a hospital or a hospital system.

32. The computing device of any of aspects 26-31, wherein the array-specific range of Tm values for the target nucleic acid sequence is a normalized range of Tm values for the target nucleic acid sequence.

33. The computing device of aspect 32, wherein the array-specific range of Tm values for the target nucleic acid sequence is normalized based on a linear relationship between previous Tm values of the target nucleic acid sequence and previous values of the control nucleic acid sequence from previous array runs.

34. The computing device of any of aspects 26-33, wherein the array-specific range of Tm values for the target nucleic acid sequence is narrower than the pre-determined range of Tm values for the target nucleic acid sequence.

35. The computing device of any of aspects 27-34, wherein the control sample well and experimental sample well are thermal cycled during the same array run.

36. The computing device of any of aspects 27-35, wherein the instructions further cause the computing device to: determine a general relationship between Cp and Tm for the target nucleic acid sequence based on a reference dataset including a plurality of Cp values and Tm values for the target nucleic acid sequence from a respective plurality of arrays; obtain a reference Cp value for the target nucleic acid sequence; calculate a first estimated Tm for the target nucleic acid sequence by applying the general relationship to the reference Cp value; identify an observed Cp value for the experimental sample in the array; calculate a second estimated Tm for the target nucleic acid sequence by applying the general relationship to the observed Cp value; calculate an array-specific relationship between Cp and Tm for the target nucleic acid sequence by comparing the first estimated Tm to the second estimated Tm for the target nucleic acid sequence; and generate a Cp-normalized array-specific range of Tm values for the target nucleic acid sequence by applying the array-specific relationship between Cp and Tm for the target nucleic acid sequence to the generated array-specific range of Tm values for the target nucleic acid sequence.

37. A method for training an algorithm to identify a nucleic acid sequence associated with a sample in an array, the method comprising: (i) providing, in an array, a control sample well with a control sample containing a control nucleic acid sequence, primers configured for amplifying the control nucleic acid sequence, a fluorescent dye, and components for amplification; (ii) amplifying the control sample by thermal cycling the control sample well; (iii) measuring, by an optical system, fluorescent data during or subsequent to the amplification; (iv) generating, by a processor, a control melting curve using the fluorescent data; (v) identifying, by the processor, based on the control melting curve, a Tm value for the control sample; (vi) repeating steps (i)-(iv) for a plurality of samples containing a respective plurality of known target nucleic acid sequences; (vii) storing, by the processor, the identified Tm values for each known sample as training data; and (viii) training, by the processor, an algorithm, using the training data, to predict a nucleic acid sequence contained in a sample based on the Tm value for the sample.

38. The method of aspect 37, wherein the algorithm is a machine learning algorithm.

39. The method of any of aspects 37 or 38, further comprising: receiving, by the processor, a Tm value for an unknown sample; applying, by the processor, the trained algorithm to the unknown sample; predicting, by the processor, a nucleic acid sequence contained in the unknown sample based on applying the trained algorithm to the unknown sample.

40. A method for decreasing concentration effects on Tm, comprising: providing, in an array, a sample well with an experimental sample containing a target nucleic acid sequence, primers configured for amplifying the target nucleic acid sequence, a fluorescent dye, and components for amplification; amplifying the target nucleic acid by thermal cycling the control sample well; measuring, by an optical system, fluorescent data to generate a Cp and Tm of the target nucleic acid; obtaining, by the processor, a general relationship between Cp and Tm for the target nucleic acid sequence; obtaining, by the processor, a reference Cp value for the target nucleic acid sequence; calculating, by the processor, a first estimated Tm for the target nucleic acid sequence by applying the general relationship to the reference Cp value; identifying, by the processor, an observed Cp value for the experimental sample in the array; calculating, by the processor, a second estimated Tm for the target nucleic acid sequence by applying the general relationship to the observed Cp value; calculating, by the processor, an array-specific relationship between Cp and Tm for the target nucleic acid sequence by comparing the first estimated Tm to the second estimated Tm for the target nucleic acid sequence; and generating, by the processor, a Cp-normalized array-specific range of Tm values for the target nucleic acid sequence by applying the array-specific relationship between Cp and Tm for the target nucleic acid sequence to a pre-determined range of Tm values for the experimental sample.

The method of aspect 40, wherein the general relationship between Cp and Tm for the target nucleic acid sequence is based on a reference dataset including a plurality of Cp values and Tm values for the target nucleic acid sequence from a respective plurality of arrays.

41. The method of aspect 40, further comprising: calling, by the processor, the experimental sample positive or negative for the target nucleic acid sequence based on whether the Tm value of the experimental sample falls within the Cp-normalized array-specific range of Tm values for the target nucleic acid sequence.

42. A method for generating an array-specific range of Tm values to be used for calling a sample positive or negative for a target nucleic acid sequence in a given array, the method comprising: providing, in an array, a control sample well with a control sample containing a control nucleic acid sequence, primers configured for amplifying the control nucleic acid sequence, a fluorescent dye, and components for amplification; amplifying the control sample by thermal cycling the control sample well; measuring, by an optical system, fluorescent data during or subsequent to the amplification of the control sample; generating, by a processor, a control melting curve using the fluorescent data; identifying, by the processor, based on the control melting curve, a Tm value for the control sample; comparing, by the processor, the identified Tm value for the control sample to an expected Tm value for the control nucleic acid sequence; and calculating, by the processor, based on the comparing, a relationship between the identified Tm value for the control sample and the pre-determined Tm value for the control nucleic acid sequence.

43. The method of aspect 42, further comprising: providing, in the array, an experimental sample well with an experimental sample, primers configured for amplifying the target nucleic acid sequence, the fluorescent dye, and components for amplification; amplifying the experimental sample by thermal cycling the experimental sample well; measuring, by an optical system, fluorescent data during or subsequent to the amplification of the experimental sample; generating, by the processor, an experimental melting curve using the fluorescent data; identifying, by the processor, based on the experimental melting curve, a Tm value for the experimental sample in the array; applying, by the processor, the calculated relationship between the expected Tm value for the control nucleic acid sequence and the identified Tm value for the control sample to the identified Tm value for the experimental sample in the array to obtain a corrected Tm value for the experimental sample; and calling, by the processor, the experimental sample positive or negative for the target nucleic acid sequence based on whether the corrected Tm value of the experimental sample falls within a pre-determined range of Tm values for the target nucleic acid sequence.

44. The method of aspect 43, the method further comprising: comparing, by the processor, the Tm value for the experimental sample in the array to one or more known Tm values associated with one or more respective nucleic acid sequences; and determining, by the processor, which of the one or more nucleic acid sequences is most likely to correspond to the experimental sample based on the comparison.

45. The method of any of aspects 43 or 44, the method further comprising: comparing, by the processor, the Tm value for the experimental sample in the array to one or more known Tm values associated with one or more respective nucleic acid sequences; and determining, by the processor, based on the comparison, that the Tm value for the experimental sample in the array differs from each of the one or more known Tm values by greater than a threshold Tm value amount; and determining, by the processor, that the experimental sample in the array corresponds to a novel nucleic acid sequence that is distinct from any of the one or more nucleic acid sequences.

46. The method of any of aspects 43-45, the method further comprising: determining, by the processor, a number of positive calls for the target nucleic acid sequence in an institution population for an institution associated with the experimental sample; determining, by the processor, a number of negative calls for the target nucleic acid sequence in the institution population; determining, by the processor, based on the number of positive calls and negative calls in the institution population, a first rate of positive calls for the target nucleic acid sequence in the institution population; obtaining, by the processor, a number of positive calls for the target nucleic acid sequence in a community population for a community associated with the experimental sample; obtaining, by the processor, a number of negative calls for the target nucleic acid sequence in the community population; determining, by the processor, based on the number of positive calls and negative calls in the community population, a second rate of positive calls for the target nucleic acid sequence in the community population; determining, based on comparing the first rate to the second rate, whether a pathogen associated with the target nucleic acid sequence was likely acquired from the institution or from the community.

47. The method of aspect 46, wherein the institution is a hospital or a hospital system.

48. The method of any of aspects 43-47, wherein the pre-determined range of Tm values for the target nucleic acid sequence is calculated based on previous identified Tm values for the target nucleic acid sequence.

49. The method of any of aspects 43-48, wherein the control sample well and experimental sample well are thermal cycled during the same array run.

50. The method of any of aspects 2-11, further comprising: obtaining, by the processor, a general relationship between Cp and Tm for the target nucleic acid sequence based on a reference dataset including a plurality of Cp values and Tm values for the target nucleic acid sequence from a respective plurality of arrays; obtaining, by the processor, a reference Cp value for the target nucleic acid sequence; calculating, by the processor, a first estimated Tm for the target nucleic acid sequence by applying the general relationship to the reference Cp value; identifying, by the processor, an observed Cp value for the experimental sample in the array; calculating, by the processor, a second estimated Tm for the target nucleic acid sequence by applying the general relationship to the observed Cp value for the observed experimental sample; calculating, by the processor, an array-specific relationship between Cp and Tm for the target nucleic acid sequence by comparing the first estimated Tm to the second estimated Tm for the target nucleic acid sequence; and generating, by the processor, a Cp-normalized array-specific corrected Tm value for the target nucleic acid sequence by applying the array-specific relationship between Cp and Tm for the target nucleic acid sequence to the corrected Tm value for the target nucleic acid sequence.

Although the invention has been described in detail with reference to preferred embodiments, variations and modifications exist within the scope and spirit of the invention as described and defined in the following claims.

What is claimed is:

1. A method for generating an array-specific Tm window to be used for calling a sample positive or negative for a target nucleic acid sequence in a given array, the method comprising:
    providing, in an array of a closed system, a control sample well with a control sample containing a control nucleic acid sequence, primers configured for amplifying the control nucleic acid sequence, a fluorescent dye, and components for amplification;
    amplifying the control sample by thermal cycling the control sample well;
    measuring, by an optical system, fluorescent data and temperature data during or subsequent to the amplification of the control sample;
    generating, by a processor, a control melting curve by plotting the fluorescent data measured during or subsequent to the amplification of the control sample as a function of the temperature data measured during or subsequent to the amplification of the control sample;
    identifying, by the processor, based on the control melting curve, a Tm value for the control sample in the closed system;
    comparing, by the processor, the identified Tm value for the control sample in the closed system to an expected Tm value for the control nucleic acid sequence;
    calculating, by the processor, based on the comparing, a relationship between the identified Tm value for the control sample in the closed system and the expected Tm value for the control nucleic acid sequence;
    generating, by the processor, the array-specific Tm window for the target nucleic acid sequence in the closed system by applying the calculated relationship between the expected Tm value for the control nucleic acid sequence and the identified Tm value for the control sample in the closed system to a pre-determined Tm window for the target nucleic acid sequence;
    providing, in the array of the closed system, an experimental sample well with an experimental sample, primers configured for amplifying the target nucleic acid sequence, the fluorescent dye, and components for amplification;
    amplifying the experimental sample by thermal cycling the experimental sample well, wherein the control sample well and experimental sample well are distinct from one another and are thermal cycled during a same array run of the closed system;
    measuring, by an optical system, fluorescent data and temperature data during or subsequent to the amplification of the experimental sample;
    generating, by the processor, an experimental melting curve by plotting the fluorescent data measured during or subsequent to the amplification of the experimental sample as a function of the temperature data measured during or subsequent to the amplification of the experimental sample;
    identifying, by the processor, based on the experimental melting curve, a Tm value for the experimental sample in the array of the closed system; and
    calling, by the processor, the experimental sample positive or negative for the target nucleic acid sequence based on whether the Tm value of the experimental sample falls within the array-specific Tm window for the target nucleic acid sequence in the closed system.

2. The method of claim 1, the method further comprising:
comparing, by the processor, the Tm value for the experimental sample in the array of the closed system to one or more known Tm values associated with one or more respective nucleic acid sequences; and
determining, by the processor, which of the one or more nucleic acid sequences is most likely to correspond to the experimental sample based on the comparing.

3. The method of claim 1, the method further comprising:
comparing, by the processor, the Tm value for the experimental sample in the array of the closed system to one or more known Tm values associated with one or more respective nucleic acid sequences;
determining, by the processor, based on the comparing, that the Tm value for the experimental sample in the array of the closed system differs from each of the one or more known Tm values by greater than a threshold Tm value amount; and
determining, by the processor, that the experimental sample in the array of the closed system corresponds to a novel nucleic acid sequence that is distinct from any of the one or more nucleic acid sequences.

4. The method of claim 1, wherein the experimental sample is obtained from an individual associated with an institution and associated with a community the method further comprising:
determining, by the processor, a number of positive calls for the target nucleic acid sequence in other experimental samples associated with other individuals of the institution;
determining, by the processor, a number of negative calls for the target nucleic acid sequence in the other experimental samples associated with the other individuals of the institution;
determining, by the processor, based on the number of positive calls and negative calls in the other experimental samples associated with the other individuals of the institution, a first rate of positive calls for the target nucleic acid sequence in the other experimental samples associated with the other individuals of the institution;
obtaining, by the processor, a number of positive calls for the target nucleic acid sequence in other experimental samples associated with other individuals of the community;
obtaining, by the processor, a number of negative calls for the target nucleic acid sequence in the other experimental samples associated with the other individuals of the community;
determining, by the processor, based on the number of positive calls and negative calls in the other experimental samples associated with the other individuals of the community, a second rate of positive calls for the target nucleic acid sequence in the other experimental samples associated with the other individuals of the community; and
determining, based on comparing the first rate to the second rate, whether a pathogen associated with the target nucleic acid sequence was likely acquired from the institution or from the community.

5. The method of claim 4, wherein the institution is a hospital or a hospital system.

6. The method of claim 1, wherein the array-specific Tm window for the target nucleic acid sequence in the closed system is a normalized Tm window for the target nucleic acid sequence in the closed system.

7. The method of claim 6, wherein the array-specific Tm window for the target nucleic acid sequence in the closed system is normalized based on a linear relationship between previous Tm values of the target nucleic acid sequence and previous values of the control nucleic acid sequence from previous array runs of the closed system.

8. The method of claim 1, wherein the pre-determined Tm window for the target nucleic acid sequence is calculated based on previous identified Tm values for the target nucleic acid sequence.

9. The method of claim 1, wherein the array-specific Tm window for the target nucleic acid sequence in the closed system is narrower than the pre-determined Tm window for the target nucleic acid sequence.

10. The method of claim 1, further comprising:
obtaining, by the processor, a general relationship between Cp and Tm for the target nucleic acid sequence based on a reference dataset including a plurality of Cp values and Tm values for the target nucleic acid sequence from a respective plurality of arrays;
obtaining, by the processor, a reference Cp value for the target nucleic acid sequence;
calculating, by the processor, a first estimated Tm for the target nucleic acid sequence by applying the general relationship to the reference Cp value;
identifying, by the processor, an observed Cp value for the experimental sample in the array of the closed system;
calculating, by the processor, a second estimated Tm for the target nucleic acid sequence by applying the general relationship to the observed Cp value for the experimental sample;
calculating, by the processor, an array-specific relationship between Cp and Tm for the target nucleic acid sequence by comparing the first estimated Tm to the second estimated Tm for the target nucleic acid sequence; and
generating, by the processor, a Cp-normalized array-specific Tm window for the target nucleic acid sequence in the closed system by applying the array-specific relationship between Cp and Tm for the target nucleic acid sequence to the generated array-specific Tm window for the target nucleic acid sequence in the closed system.

* * * * *